(12) United States Patent
Takata

(10) Patent No.: US 9,244,214 B2
(45) Date of Patent: Jan. 26, 2016

(54) DISPLAY DEVICE AND TELEVISION RECEIVER

(75) Inventor: Yoshiki Takata, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 611 days.

(21) Appl. No.: 13/578,823

(22) PCT Filed: Jan. 24, 2011

(86) PCT No.: PCT/JP2011/051172
§ 371 (c)(1),
(2), (4) Date: Aug. 14, 2012

(87) PCT Pub. No.: WO2011/105146
PCT Pub. Date: Sep. 1, 2011

(65) Prior Publication Data
US 2012/0320270 A1    Dec. 20, 2012

(30) Foreign Application Priority Data
Feb. 24, 2010    (JP) ................................. 2010-038752

(51) Int. Cl.
*G02F 1/1335*    (2006.01)
*F21V 8/00*    (2006.01)

(52) U.S. Cl.
CPC ............ *G02B 6/0073* (2013.01); *G02B 6/0023* (2013.01); *G02B 6/0068* (2013.01); *G02F 1/133514* (2013.01); *G02F 1/133603* (2013.01); *G02F 1/133604* (2013.01); *G02F 1/133605* (2013.01); *G02F 2001/133614* (2013.01)

(58) Field of Classification Search
CPC .................... G02F 1/133605; G02F 1/133604; G02F 1/133514; G02F 2201/52
See application file for complete search history.

(56) References Cited

U.S. PATENT DOCUMENTS

2006/0039152 A1    2/2006    Ito
2009/0091256 A1    4/2009    Ito
(Continued)

FOREIGN PATENT DOCUMENTS

| JP | 2006-058332 A | 3/2006 |
| JP | 2007-141737 A | 6/2007 |
| JP | 2007-149909 A | 6/2007 |
| JP | 2009-076456 A | 4/2009 |
| JP | 2010-039248 A | 2/2010 |

(Continued)

OTHER PUBLICATIONS

Official Communication issued in International Patent Application No. PCT/JP2011/051172, mailed on Feb. 15, 2011.

*Primary Examiner* — Phu Vu
(74) *Attorney, Agent, or Firm* — Keating & Bennett, LLP

(57) ABSTRACT

A display device properly corrects chromaticity of display images with achieving high brightness. A liquid crystal display device 10 includes a liquid crystal panel 11 and a backlight unit 12. The liquid crystal display device 10 includes a pair of boards 11a, 11b and a liquid crystal layer 11c formed of liquid crystals that change their optical characteristics by implication of an electric field. The backlight unit 12 exits light toward the liquid crystal panel 11. One of the boards 11a, 11b of the liquid crystal panel 11 includes a color filter 19 including color portions R, G, B, Y each in red, green, blue, yellow. The backlight unit 12 includes LEDs 24 as a light source and each of the LEDs includes an LED chip 24a as a light emission source and a phosphor that is excited by light from the LED chip 24a and emits light. The phosphor includes at least a YAG-based phosphor.

31 Claims, 28 Drawing Sheets

(56) References Cited

U.S. PATENT DOCUMENTS

2009/0141221 A1 6/2009 Taguchi et al.
2010/0067214 A1* 3/2010 Hoelen et al. .................. 362/84

FOREIGN PATENT DOCUMENTS

| WO | 2007/108239 A1 | 9/2007 |
| WO | 2008/047290 A1 | 4/2008 |

* cited by examiner

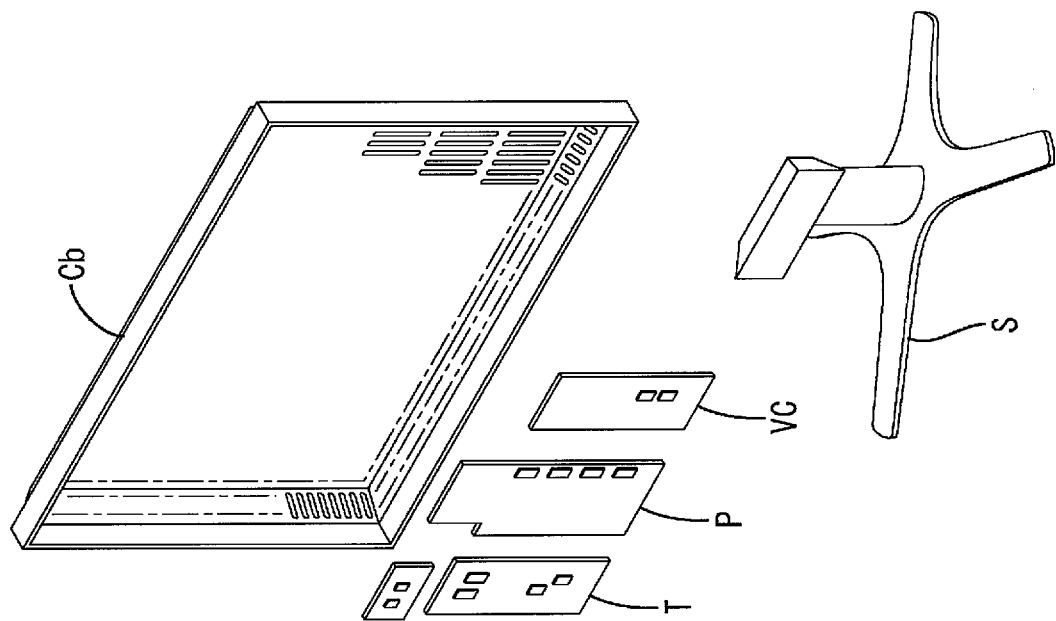
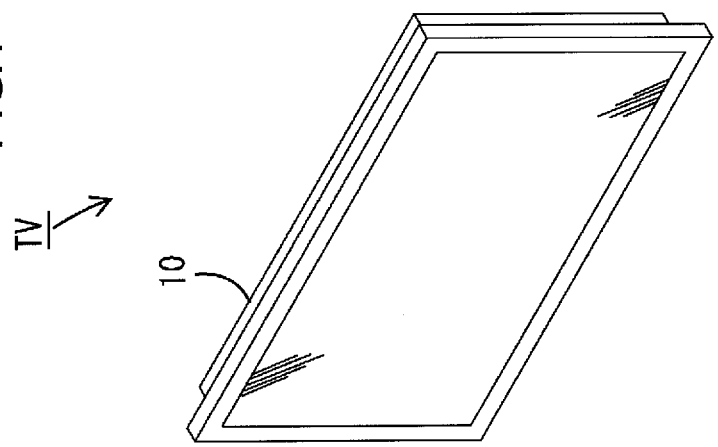
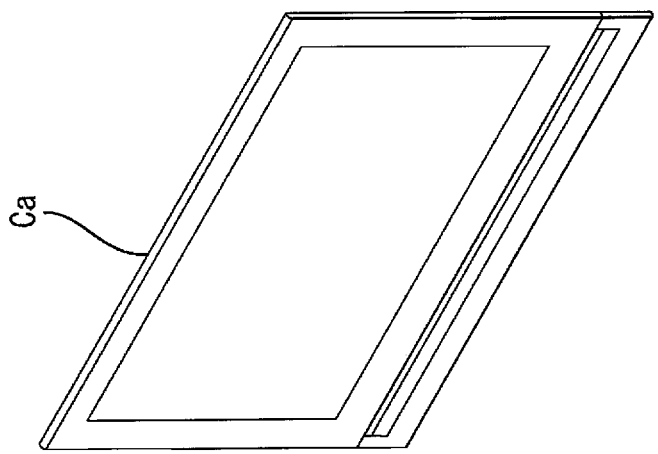
FIG.1

FIG.2
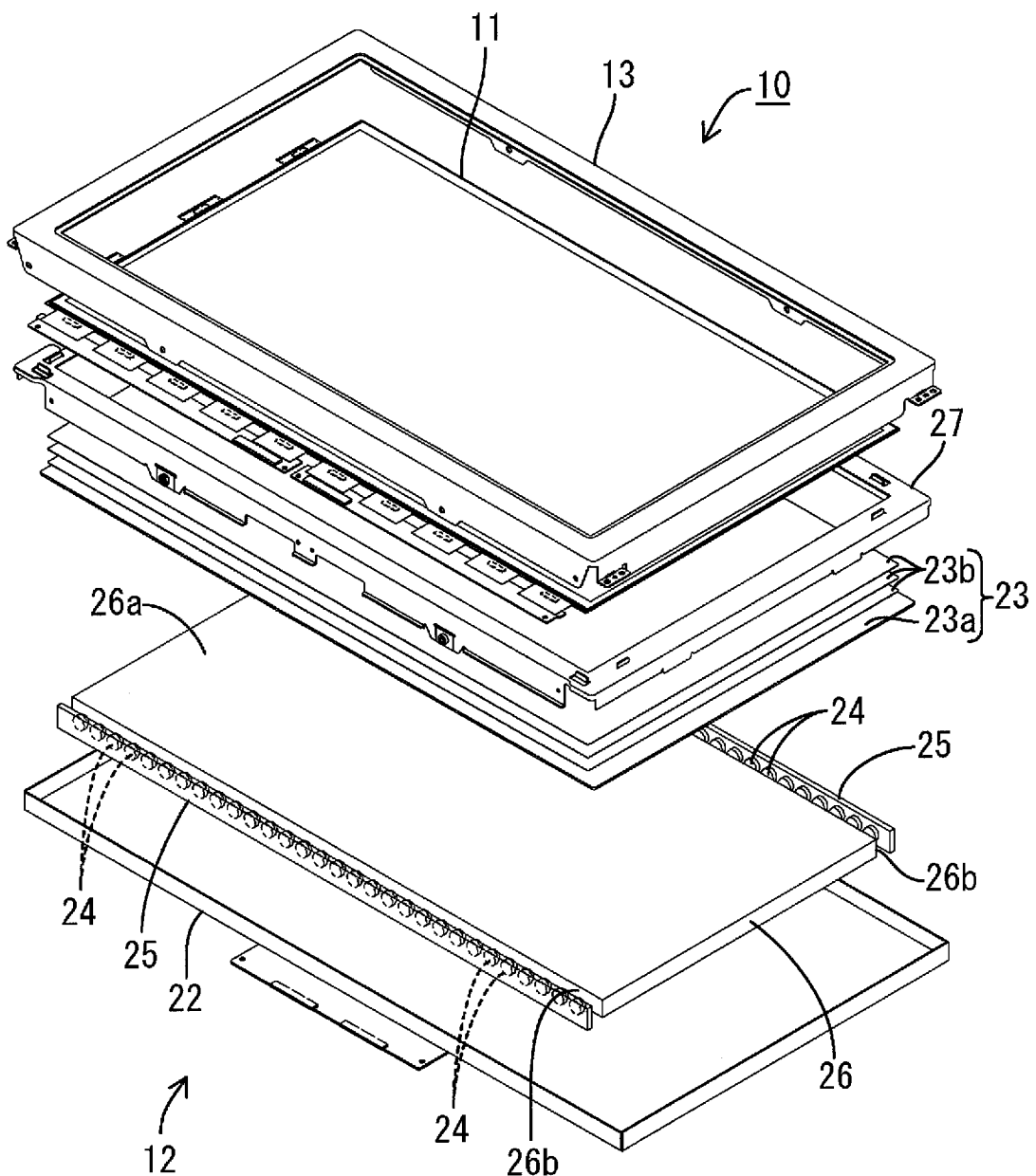
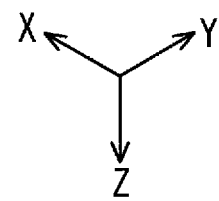

FIG.18
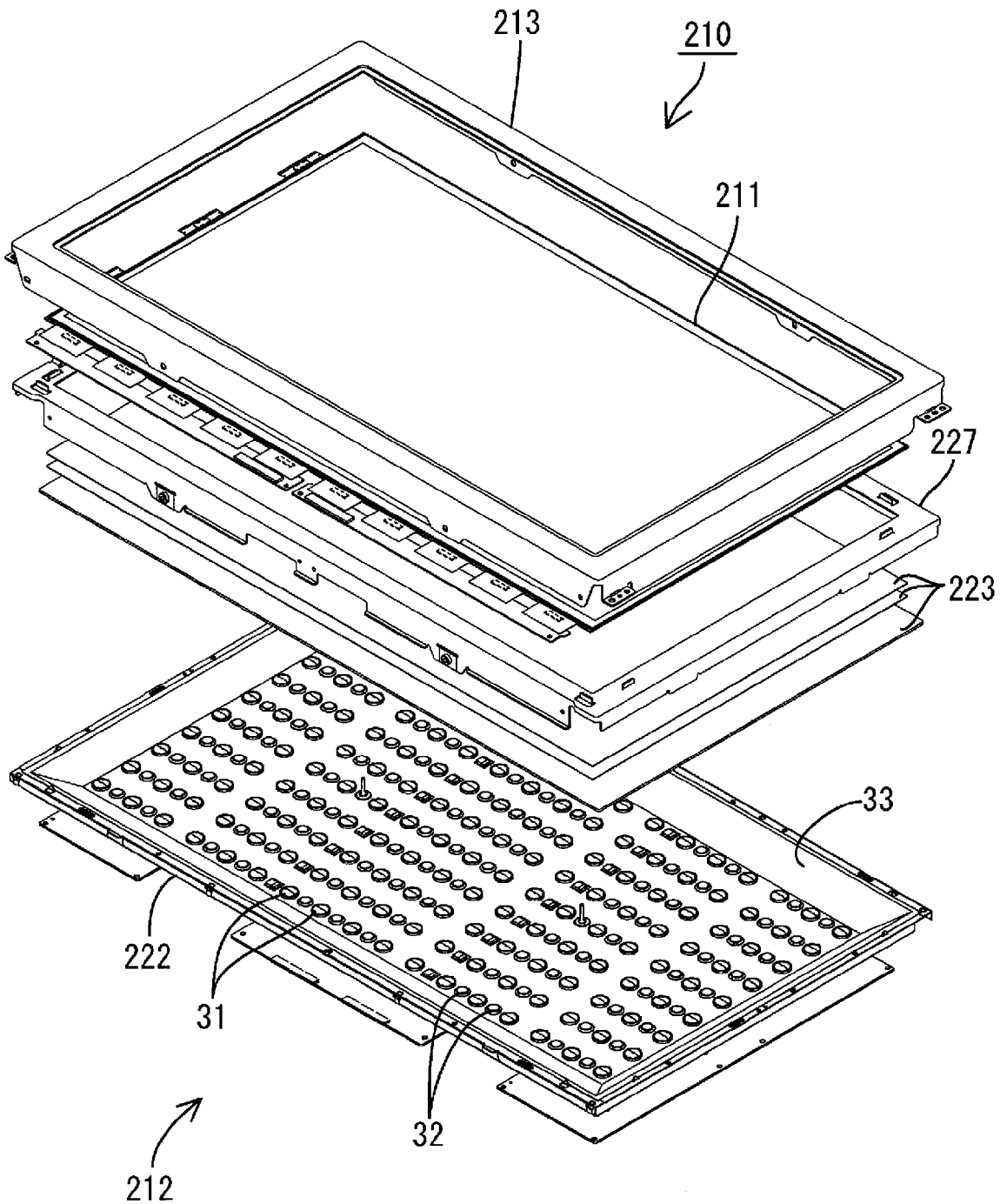
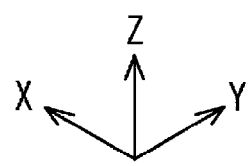

DISPLAY DEVICE AND TELEVISION RECEIVER

TECHNICAL FIELD

The present invention relates to a display device and a television receiver.

BACKGROUND ART

A liquid crystal panel that is a main component of a liquid crystal display device includes a pair of glass substrates and liquid crystals sealed between the glass substrates. One of the glass substrates is an array substrate on which TFTs are arranged. The TFTs are active elements. The other glass substrate is a CF substrate on which color filters are arranged. On an inner surface of the CF substrate opposite the array substrate, color filters including a plurality of color portions in red, green and blue arranged according to pixels of the array board. Light blocking layers are arranged between the color portions so that colors are not mixed. Light emitted from a backlight unit and passed through the liquid crystals. The red, the green and the blue color portions of the color filters selectively pass light in specific wavelengths corresponding to the colors. As a result, images are displayed on the liquid crystal panel.

To improve the display quality of the liquid crystal display device, an improvement in color reproducibility may be effective. For the improvement, color portions of the color filters may be provided in another color such as cyan (or greenish blue) in addition to the three primary colors of light, which are red, green and blue. An example is disclosed in Patent Document 1.

Patent Document 1: Japanese Unexamined Patent Publication No. 2006-58332

Problem to be Solved by the Invention

When the portions of the color filters are provided in another color in addition to the three primary colors of light, display images is more likely to be affected by the added color. To reduce such an effect, amounts of light passing through the color portions may be controlled through TFTs driven for respective pixels of a liquid crystal panel. With this configuration, chromaticity of the display images can be corrected. However, the amounts of light passing through the color portions tend to decrease according to the correction of the chromaticity. Therefore, brightness may decrease.

In view of such a problem, the inventor of this application has reached an idea. Namely, the inventor has assumed that chromaticity of display images can be corrected without a reduction in brightness by adjusting chromaticity of light sources in a backlight unit for illuminating a liquid crystal panel. Furthermore, a color different from cyan may be considered as an additional color for a multiple primary color-type liquid crystal panel other than three primary colors. In chromaticity adjustment, what type of light sources is preferable has not been sufficiently examined.

DISCLOSURE OF THE PRESENT INVENTION

The present invention was made in view of the foregoing circumstances. An object of the present invention is to properly correct chromaticity of display images while brightness is maintained at a high level.

Means for Solving the Problem

A display device of the present invention includes a display panel and a lighting device. The display panel includes a pair of boards, a material provided between the boards, and a color filter provided in one of the boards and including color portions each in blue, green, red, yellow. The material changes its optical characteristics by implication of an electric field. The lighting device includes LEDs as a light source and the LEDs exit light toward the display panel. Each LED includes an LED element as a light emission source and a phosphor that is excited by light from the LED element and emits light. The phosphor includes at least a YAG-based phosphor.

The color filters are formed on one of the boards of the liquid crystal panel and the color filters include the yellow color portion in addition to the red color portion, the green color portion and the blue color portion. This increases a color reproducibility range or a color range that can be perceived by human beings and improves color reproducibility of physical colors existing in the natural world. This improves display quality. Among the color portions of the color filters, the light transmitting through the yellow color portion has a wavelength close to the peak of the visual sensitivity and therefore the light tends to be sensed by eyes of human beings as bright light having high brightness with small energy. Accordingly, sufficient brightness is obtained with suppressing the amount of output from the light source and this reduces consumption power of the light source and improves an environmental property. Namely, high brightness is obtained and this achieves clear contrast. This further improves the display quality.

If the color filter includes a yellow color portion, light exiting from the liquid crystal panel or the whole display image tends to be yellowish. To prevent this, the amount of light transmitting through each of the color portions may be controlled to correct the chromaticity of the display image. However, this tends to reduce the amount of light transmitting through the color portion according to the correction of the chromaticity and this may deteriorate brightness. As a result of the present inventors' earnest studies, it is concluded that the chromaticity of the display image is corrected by adjusting the chromaticity of light from the light source used in the lighting device without deteriorating the brightness. According to this result, the LEDs are used as the light source in the present technology. Compared to other types of light sources such as cold cathode tubes, the LED maintains relatively high brightness if the chromaticity is adjusted corresponding to the liquid crystal panel having the yellow color portion. The high brightness is maintained because the LED and the liquid crystal panel including the yellow color portion have a compatible spectroscopic property. Accordingly, the chromaticity of the display image is effectively corrected without deteriorating the brightness.

The present inventors further execute studies about the configuration of the LED used for the light source. As a result of the studies, the inventors specify a LED that achieves higher brightness. In the present technology, the LED includes the LED element that is a light emission source and the phosphors that are excited by the light from the LED element and emit light, and the phosphor includes at least a YAG-based phosphor. Therefore, brightness of the LED is improved and brightness of the transmitted light is also improved compared to an LED including a phosphor that is not the YAG-based phosphor (for example, β-SiAlON). In the present technology, the color filter of the liquid crystal panel includes the yellow color portion to achieve high brightness and improved color reproducibility as described before. Combination of the color filter including the yellow color portion and the LED having high brightness achieves synergetic effects of higher brightness of transmitted light. This implies that sufficient brightness is obtained even with suppressing the amount of output from the LED. This further reduces consumption power of the LED and achieves a good environmental property.

A YAG-based phosphor expressed by Y3AL5O12 is an yttrium-aluminum complex oxide having a garnet structure. The YAG-based phosphor includes rare-earth element (e.g., Ce, Tb, Eu, Nd) as an activator. The YAG-based phosphor may be provided by replacing all or a part of the Y site of Y3Al5O12 with Gd or Tb. The YAG-based phosphor may be provided by replacing a part of the Al site with Ga. Through the replacement, the main emission wavelength of the YAG-base phosphor can be adjusted.

The YAG-based phosphor may be Y3Al5O12:Ce, Y3Al5O12:Tb, (Y,Gd)3Al5O12:Ce, Y3(Al,Ga)5O12:Ce, Y3(Al,Ga)5O12:Tb, (Y,Gd)3(Al,Ga)5O12:Ce, (Y,Gd)3(Al, Ga)5O12:Tb, Tb3Al5O12:Ce.

The present technology may be preferably have following configurations.

(1) The YAG-based phosphor may have a main emission wavelength from 500 nm to 570 nm. If the main emission wavelength of the YAG-based phosphor is less than 500 nm, that is, if the main emission wavelength is in the cyan wavelength region or in the blue wavelength region, sufficient brightness may not be obtained. Also in such a case, if the LED element emitting blue light is used, it may be quite difficult to adjust chromaticity. If the main emission wavelength of the YAG-based phosphor is greater than 570 nm, that is, if the main emission wavelength is in the yellow wavelength region or in the red wavelength region, sufficient brightness may not be obtained. Also in such a case, it may be quite difficult to adjust chromaticity of light from the LED corresponding to the liquid crystal panel including the color filter having a yellow color portion. As described above, the YAG-based phosphor having the main emission wavelength that is in the green wavelength region is used, and this makes easy to adjust chromaticity with achieving high brightness and color reproducibility.

(2) The YAG-based phosphor may have a main emission wavelength from 519 nm to 554 nm. If the main emission wavelength of the YAG-based phosphor is less than 519 nm, sufficient brightness may not be obtained and the main emission wavelength is shifted to the cyan side (the blue side). Therefore, it may be difficult to adjust the chromaticity if a LED element emitting blue light is used as the LED element. If the main emission wavelength of the YAG-based phosphor is greater than 554 nm, sufficient brightness is not obtained and the main emission wavelength is shifted to the yellow side (the red side). Therefore, it may be difficult to adjust the chromaticity of the LED corresponding to the liquid crystal panel including the color filter including the yellow color portion. In the present technology, the YAG-based phosphor having the main emission wavelength ranging from 519 nm to 554 nm is used and this ensures easy chromaticity adjustment of the LED and achieves high brightness and improved color reproducibility.

(3) The YAG-based phosphor may have a main emission wavelength from 519 nm to 539 nm. If the main emission wavelength of the YAG-based phosphor is greater than 539 nm, the brightness is relatively decreased and it may be difficult to adjust chromaticity in a case that the phosphor includes a red phosphor that emits red light to improve the color reproducibility. In the present technology, the YAG-based phosphor having the main emission wavelength ranging from 519 nm to 539 nm is used. This further improves brightness and also improves the color reproducibility with the phosphor including a red phosphor that emits red light and also ensures easy chromaticity adjustment.

(4) The YAG-based phosphor may have a main emission wavelength of 539 nm. With this configuration, comparing the YAG-phosphor having a main emission wavelength less than 539 nm, relatively higher brightness and sufficient color reproducibility are obtained.

(5) The YAG-based phosphor may have a main emission wavelength of 519 nm. With this configuration, comparing the YAG-phosphor having a main emission wavelength greater than 519 nm, relatively higher color reproducibility and sufficient brightness are obtained.

(6) The phosphor may include a red phosphor that is excited by light emitted from the LED element and emits red light. The red phosphor may be used in combination with the YAG-based phosphor having the main emission wavelength ranging from 510 nm to 539 nm. This ensures easy chromaticity adjustment and achieves improved color reproducibility.

(7) The red phosphor may be a CaAlSiN-based phosphor. Therefore, CaAlSiN that is nitride may emit red light with higher efficiency compared to a case using a red phosphor of sulfide or oxide.

(8) The CaAlSiN-based phosphor of the red phosphor may be expressed by CaAlSiN3:Eu. With this configuration, red light is emitted with high efficiency.

(9) The red color portion in red may have a film thickness that is relatively greater than a film thickness of each of the blue color portion in blue and the green color portion in green. With such a configuration, compared to a case in which the film thicknesses of the color portions are equal to each other, the amount of transmission light related to red is reduced and the gamut of transmitted light related to red is enlarged. This further improves color reproducibility.

(10) The blue color portion in blue and the green color portion in green may have substantially an equal film thickness. With this configuration, the blue color portion in blue and the green color portion in green may have substantially an equal capacitance generated between the boards. Therefore, optical characteristics of the material provided between the boards are controlled easily by impression of an electric field. Accordingly, transmission of light passing through the blue color portion in blue and the green color portion in green is easily controlled. This simplifies a design of a circuit related to the display panel.

(11) The yellow color portion in yellow may have a film thickness that is substantially equal to the film thickness of each of the blue color portion in blue and the green color portion in green. With this configuration, the capacitance generated between the boards is substantially equal to each other in the blue color portion in blue, the green color portion in green and the yellow color portion in yellow. This simplifies a design of a circuit related to the display panel.

(12) The red color portion in red may have a film thickness of 250% or less of a film thickness of each of the blue color portion in blue and the green color portion in green. If a ratio of the film thickness of the red color portion in red to that of each of the blue color portion in blue and the green color portion in green is greater than 250%, the capacitance generated between the boards in each of the blue color portion in blue and the green color portion in green is extremely different from the capacitance in the red color portion in red. Therefore, optical characteristics of the material provided between the boards are not properly controlled by implication of an electric field. The film thicknesses are adjusted such that the film thickness ratio is 250% or less. Accordingly, the optical characteristics of the material provided between the boards are properly controlled by implication of an electric field and high color reproducibility is obtained.

(13) The red color portion in red may have a film thickness of 142.8% to 214.3% of the film thickness of each of the blue color portion in blue and the green color portion in green. If the film thickness of the red color portion in red is less than 142.8% of the film thickness of the blue color portion in blue and the green color portion in green, difference in the film thickness between the blue and green color portions and the red color portion is too small. The gamut of the transmitted light related to red may not be sufficiently enlarged and the color reproducibility may not be sufficiently improved. If the percentage of the film thickness of the red color portion to that of the blue and green color portions is greater than 214.3%, the above-described problem of the capacitance is easily caused. In the present technology, the percentage of the film thickness is from 142.8% to 214.3%. Accordingly, the optical characteristic of the material that is provided between the boards can be controlled properly by implication of an electric field and the color reproducibility is further improved.

(14) Each of the blue color portion in blue and the green color portion in green may have a film thickness of 2.1 μm and the red color portion in red may have a film thickness of 3.0 μm to 4.5 μm. With the above-described film thicknesses of the color portions, the optical characteristics of the material provided between the boards can be controlled further effectively by the implication of an electric field and the color reproducibility is further improved.

(15) Each of the color portions may be substantially equal to each other. With this configuration, the capacitance generated between the substrates is substantially equal to each other in each of the color portions of the color filter. Therefore, the optical characteristics of the material provided between the boards can be easily controlled by implication of an electric field.

(16) Each of the color portions may contain pigments in a dispersed manner and a density of pigments in the red color portion in red may be higher than that in each of the blue color portion in blue and the green color portion in green. Thus, the density of the pigments contained in the red color portion in red is relatively higher than the density of pigments contained in each of the blue color portion in blue and the green color portion in green. In such a case, compared to a case in which the density of pigments is same in each of the color portions, the amount of transmission light in the transmitted light related to red decreases and the gamut related to red is enlarged. This achieves improved color reproducibility.

(17) Each of the color portions may have substantially an equal film thickness. With such a configuration, the capacitance generated between the boards is substantially equal to each other in each of the color portions of the color filter. Accordingly, the optical characteristics of the material that is provided between the boards can be easily controlled by the implication of an electric field. The light transmission of light transmitting through each of the color portions is easily controlled. This simplifies a design of a circuit related to the display panel with achieving high color reproducibility.

(18) The YAG-based phosphor may have a main emission wavelength of 554 nm. With this configuration, compared to a case in which the main emission wavelength of the YAG-based phosphor is smaller than 554 nm, the main emission wavelength is shifted to a yellow side (a red side). Therefore, the chromaticity can be adjusted without additionally including a red phosphor that emits red light as the phosphor. This reduces a manufacturing cost.

(19) The LED element may have a main emission wavelength from 420 nm to 500 nm. With this configuration, in correcting chromaticity of display images on the display panel including color portions of three primary colors and a yellow color portion, it is preferable to adjust light from the LED to be bluish light that is a complementary color for yellow. The LED of the present technology includes the LED element that emits light having a blue wavelength region. Therefore, blue light is emitted with quite high efficiency. Accordingly, in adjusting chromaticity of light from the LED to bluish light, brightness is less likely to be deteriorated and high brightness is maintained.

(20) The LED element may have a main emission wavelength of 451 nm. With this configuration, the YAG-phosphor is excited with high efficiency and accordingly, higher brightness is obtained.

(21) An area ratio of each of the color portions may be equal to each other. If an area ratio of each of the color portions is different from each other to adjust chromaticity of blue in the transmitted light, a special manufacturing device that is exclusive for manufacturing the display panel is necessary to be prepared. In the present technology, similar to the display panel including the color filter having the color portions of general three colors of red, green and blue, the area ratio of each of the color portions of four colors is equal to each other. Therefore, a manufacturing device for manufacturing the three-color type display panel can be used for a four-color type display panel. This sufficiently reduces a manufacturing cost of the display panel including the color filter having the four color portions.

(22) The color filter may be configured such that chromaticity of blue in light that is emitted from the LED and transmitted through each of the color portions is outside of a common gamut of an NTSC gamut in an NTSC standard and an EBU gamut in an EBU standard in at least one of a CIE1931 chromaticity diagram and a CIE1976 chromaticity diagram. With this configuration, the gamut related to blue in the transmitted light occupies most of the common gamut and this ensures sufficient color reproducibility.

The NTSC gamut in the NTSC standard is defined as follows. The NTSC gamut is a triangular region with vertices of three primary colors expressed by (x, y) coordinates in the CIE 1931 chromaticity diagram, which are (0.14, 0.08), (0.21, 0.71), and (0.67, 0.33). In the CIE 1976 chromaticity diagram, the vertices of the triangular region are expressed by (u', v') coordinates of (0.0757, 0.5757), (0.1522, 0.1957), and (0.4769, 0.5285).

The EBU gamut in the EBU standard is defined as follows. The EBU gamut is a triangular region with vertices of three primary colors expressed by (x, y) coordinates in the CIE 1931 chromaticity, which are (0.15, 0.06), (0.3, 0.6), and (0.64, 0.33). In the CIE 1976 chromaticity diagram, the vertices of the triangular region are expressed by (u', v') coordinates of (0.1250, 0.5625), (0.1754, 0.1579), and (0.4507, 0.5229).

The common gamut is defined as follows. The common gamut is a quadrilateral region with four points expressed by x-y coordinates in the CIE 1931 chromaticity diagram, which are (0.1579, 0.0884), (0.3, 0.6), (0.4616, 0.2317), and (0.64, 0.33). Furthermore, the quadrilateral region of the common region is defined by the four points expressed by u'-v' coordinates in the CIE 1976 chromaticity diagram, which are (0.125, 0.5625), (0.1686, 0.2125), (0.3801, 0.4293), and (0.4507, 0.5229).

(23) The color filter may be configured such that the chromaticity of blue in the transmitted light is outside of the EBU gamut in at least one of the CIE1931 chromaticity diagram and the CIE1976 chromaticity diagram. With this configuration, the gamut related blue in the transmitted light is further enlarged and this further improves color reproducibility.

(24) The color filter may be configured such that chromaticity of red in light that is emitted from the LED and transmitted through each of the color portions is outside of a common gamut of an NTSC gamut in an NTSC standard and an EBU gamut in an EBU standard in at least one of a CIE1931 chromaticity diagram and a CIE1976 chromaticity diagram. With this configuration, the gamut related to red in the transmitted light occupies most of the common gamut and this ensures sufficient color reproducibility.

(25) The color filter may be configured such that chromaticity of green in light that is emitted from the LED and transmitted through each of the color portions is outside of a common gamut of an NTSC gamut in an NTSC standard and an EBU gamut in an EBU standard in at least one of a CIE1931 chromaticity diagram and a CIE1976 chromaticity diagram. With this configuration, the gamut related to green in the transmitted light occupies most of the common gamut and this ensures sufficient color reproducibility.

(26) The color filter may be configured such that chromaticity of yellow in light that is emitted from the LED and transmitted through each of the color portions is outside of a common gamut of an NTSC gamut in an NTSC standard and an EBU gamut in an EBU standard in at least one of a CIE1931 chromaticity diagram and a CIE1976 chromaticity diagram. With this configuration, the gamut related to yellow in the transmitted light occupies most of the common gamut and this ensures sufficient color reproducibility.

(27) The gamut of the exited light may occupy 70% or more in the NTSC gamut in the NTSC standard. With this configuration, sufficient color reproducibility is ensured in displaying images and good display quality can be obtained.

(28) The lighting device may further include a light guide member made of synthetic resin and having an end portion. The light guide member may be provided such that the end portion faces the LEDs and light emitted from the LEDs may transmit through the light guide member and is guided to the display panel. The light guide member made of synthetic resin generally has high transparency and is slightly yellowish. Therefore, light that is emitted from the LED and transmits through the light guide member also is slightly yellowish. Even in such a case, the chromaticity of light from the LED is adjusted to correspond to the display panel including the yellow color portion and the yellowish light guide member. Accordingly, the chromaticity of display images can be corrected properly without deteriorating brightness.

(29) The lighting device may further include a lens covering a light exit side of the LED and diffusing light. The light guide member may include an elongated light entrance surface on a side close to the LEDs. The lens may be provided to face the light entrance surface of the light guide member and the lens may be curved along a longitudinal direction of the light entrance surface so as to be projected toward the light guide member. With this configuration, light emitted from the LED is directed to a wide range in a longitudinal direction of the light entrance surface by the lens. Therefore, dark portions that may be formed on the light entrance surface of the light guide member is less likely to be formed. Even if a distance between the LED and the light guide member is small and the number of the LEDs is small, light having even brightness enters an entire area of the light entrance surface of the light guide member.

(30) The lighting device may further include a reflection sheet provided between the LED and the light guide member and along the longitudinal direction of the light entrance surface. With this configuration, light that scatters from the lens to outside of the light guide member reflects off the reflection sheet and enters the light guide member. This increases light entrance efficiency of the light that is emitted from the LED and enters the light guide member.

(31) The lighting device may further include a chassis and an optical member. The chassis may houses the LEDs and include a bottom portion provided on a side opposite to the light exit side with respect to the LEDs. The optical member may be provided on the light exit side from the bottom portion and the LEDs so as to face the bottom portion and the LEDs. With this configuration, light emitted from the LED is irradiated to the optical member that is provided on the light exit side form the bottom portion and the LEDs so as to face the bottom portion and the LEDs. Therefore, the light transmits through the optical member and is subsequently exited to the display panel.

(32) The lighting device may further include a diffuser lens provided on the light exit side of the LED and diffusing light from the LED. With this configuration, light emitted from the LED is exited with being diffused by the diffuser lens. Accordingly, unevenness is less likely to be caused in exited light and the number of the LEDs is reduced and this reduces a cost.

(33) The display panel may be a liquid crystal panel including liquid crystals as substances that vary optical characteristics according to an application of electric field. With this configuration, the display device can be used for various devices such as a television or a display of a personal computer, and especially preferably used for a device having a large screen.

Next, to solve the problems described earlier, a television receiver according to the present invention includes the above display device and a receiver configured to receive television signals.

The display device of the television receiver configured to display television images according to the television signals can properly correct the chromaticity of the display images while the brightness is maintained at a high level. Therefore, the television images can be provided with high display quality.

The television receiver may include an image converter circuit configured to convert the television signals output from the receiver into blue, green, red and yellow image signals. The television signals may be converted into the color signals corresponding to the color portions in blue, green, red and blue, respectively, by the image converter circuit. Therefore, the television images can be displayed with high display quality.

Advantageous Effect of the Invention

According to the present invention, the chromaticity of display images can be properly corrected while the brightness is maintained at a high level.

BRIEF DESCRIPTION OF THE DRAWINGS

FIG. 1 is an exploded perspective view illustrating a general construction of a television receiver according to a first embodiment of the present invention.

FIG. 2 is an exploded perspective view illustrating a general construction of a liquid crystal display device included in the television receiver.

FIG. 18 is an exploded perspective view of a liquid crystal display device according to the fourth embodiment of the present invention.

MODE FOR CARRYING OUT THE INVENTION

First Embodiment

A first embodiment of the present invention will be explained with reference to FIGS. 1 to 14. In this embodiment, a liquid crystal display device 10 will be illustrated. X-axis, Y-axis and Z-axis are indicated in some drawings. The axes in each drawing correspond to the respective axes in other drawings. The upper side and the lower side in FIGS. 6 and 7 correspond to the front side and the rear side, respectively.

As illustrated in FIG. 1, a television receiver TV of this embodiment includes the liquid crystal display device 10, front and rear cabinets Ca, Cb that house the liquid crystal display device 10 therebetween, a power source P, a tuner (a receiver) T, an image converter circuit board VC, and a stand S. An overall shape of the liquid crystal display device (a display device) 10 is a landscape rectangular. The liquid crystal display device 10 is held with the long-side direction thereof substantially aligned with the horizontal direction (the X-axis direction) and the short-side direction thereof substantially aligned with the vertical direction (the Y-axis direction). As illustrated in FIG. 2, the liquid crystal display device 10 includes a liquid crystal panel 11 as a display panel, and a backlight unit (a lighting unit) 12 as an external light source. They are integrally held by a bezel 13 having a frame-like shape. The image converter circuit board VC is configured to convert television image signals from the tuner T into image signals for the liquid crystal display device 10.

Figure 3:
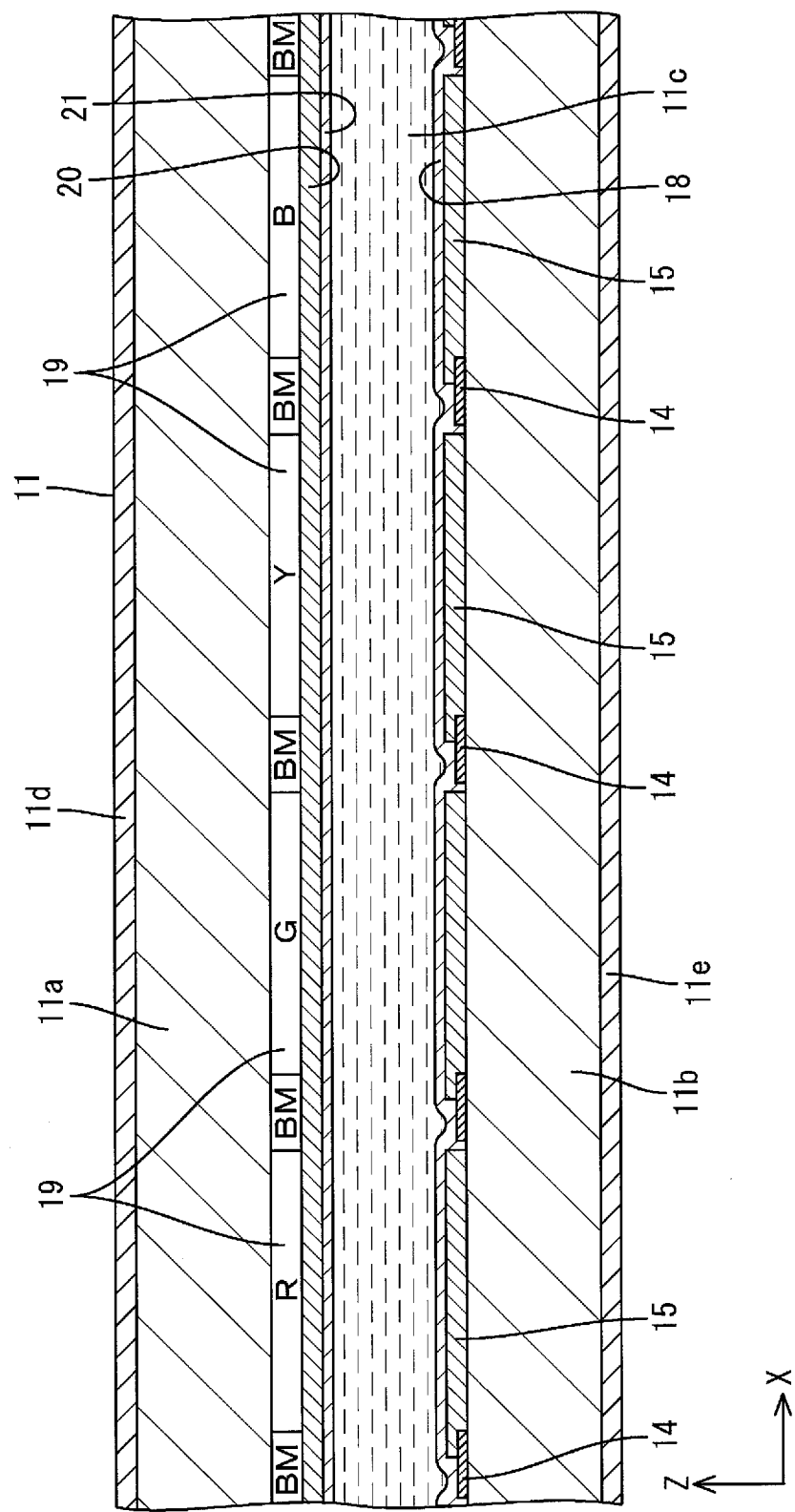
FIG. 3 is a cross-sectional view illustrating a cross-sectional configuration of the liquid crystal display device along the long-side direction (a cross-sectional configuration of color portions according to example 5 and first, second, and sixth embodiments).

A configuration of the liquid crystal panel 11 included in the liquid crystal display device 10 will be explained in detail. The liquid crystal panel 11 has a landscape rectangular overall shape. As illustrated in FIG. 3, the liquid crystal panel 11 includes a pair of transparent glass substrates 11a, 11b (capable of light transmission) and a liquid crystal layer 11c. The liquid crystal layer 11c is provided between the substrates 11a and 11b. The liquid crystal layer 11c includes liquid crystals having optical characteristics that vary according to electric fields applied thereto. The substrates 11a and 11b are bonded together with a predetermined gap therebetween with sealant that is not illustrated. The long-side direction and the short-side direction of the liquid crystal panel 11 are aligned with the X-axis direction and the Y-axis direction, respectively.

Figure 4:
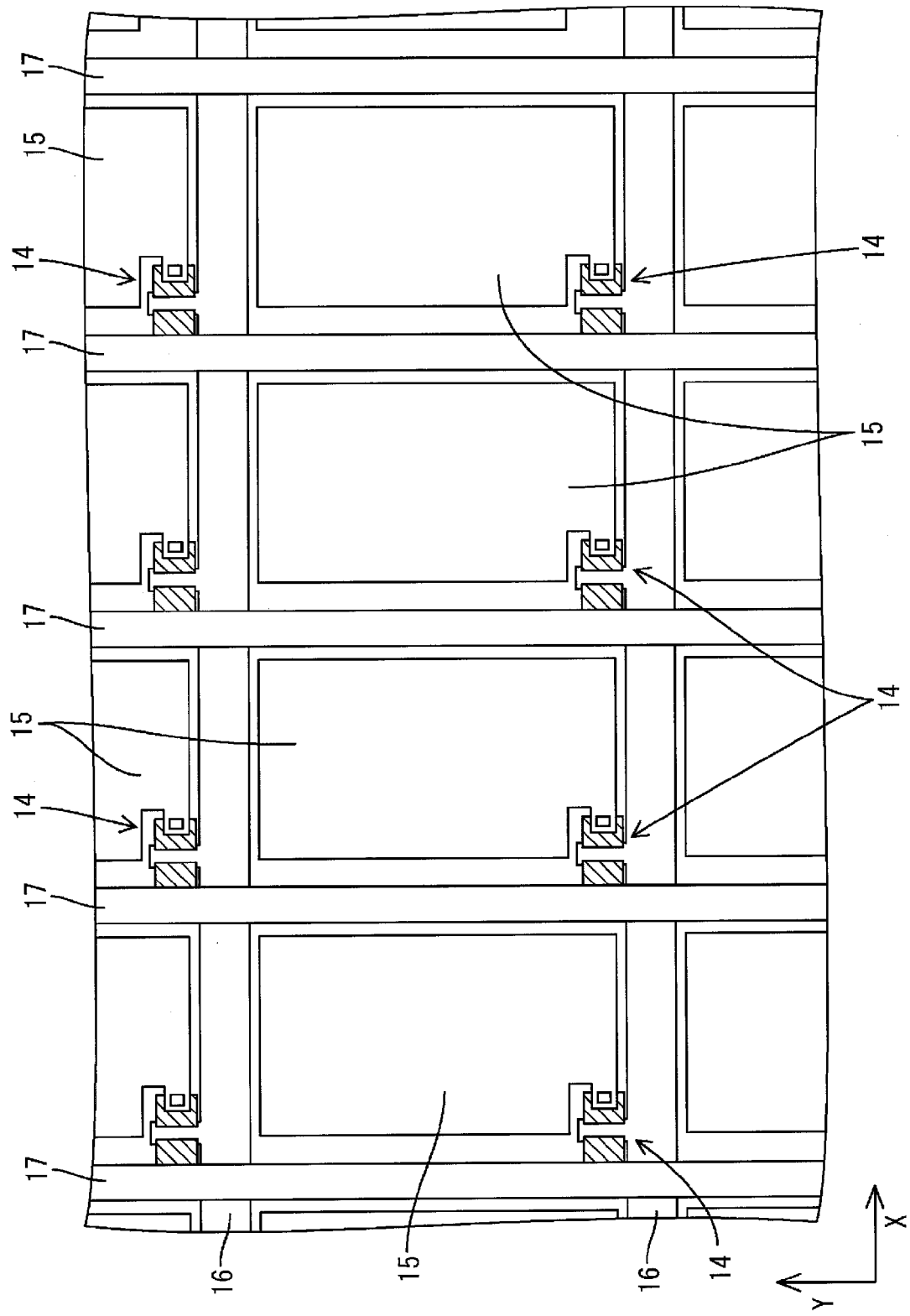
FIG. 4 is a magnified view of an array board illustrating a plan-view configuration.

One of the substrates 11a, 11b on the front side is the CF substrate 11a and the other one of the substrates 11a, 11b on the rear side is the array board 11b. On the inner surface of the array board 11b, that is, a surface on the liquid crystal layer 11c side (opposite to the CF board 11a), a number of thin film transistors (TFTs) 14 and pixel electrodes 15 are arranged in a matrix as illustrated in FIG. 4. The TFTs 14 are switching elements. Furthermore, gate lines 16 and source lines 17 arranged perpendicular to each other and around the TFTs 14 and the pixel electrodes 15. Each pixel electrode 15 has a rectangular shape with the long-side direction and the short-side direction aligned with the Y-axis direction and the X-axis direction, respectively. The pixel electrode 15 is a transparent electrode made of indium tin oxide (ITO) or zinc oxide (ZnO). The gate lines 16 and the source lines 17 are connected to gate lines and source lines of the respective TFTs 14. The pixel electrodes 15 are connected to drain electrodes of the respective TFTs 14. An alignment film 18 is arranged on the liquid crystal layer 11c sides of the TFTs 14 and the pixel electrodes 15. The alignment film 18 is provided for alignment of liquid crystal molecules. In end portions of the array board 11b, terminals extended from the gate lines 16 and the source lines 17 are provided. A driver IC for driving the liquid crystal panel 11 is pressure bonded to the terminals via an anisotropic conductive film (ACF). The driver IC is not illustrated in the drawings. The driver IC is electrically connected to a display control circuit board via various wiring boards. The display control circuit board is not illustrated in the drawings. The display control circuit board is connected to the image converter board VC of the television receiver TV and configured to feed driving signals to the lines 16 and 17 according to output signals from the image converter circuit board VC via the driver IC.

Figure 5:
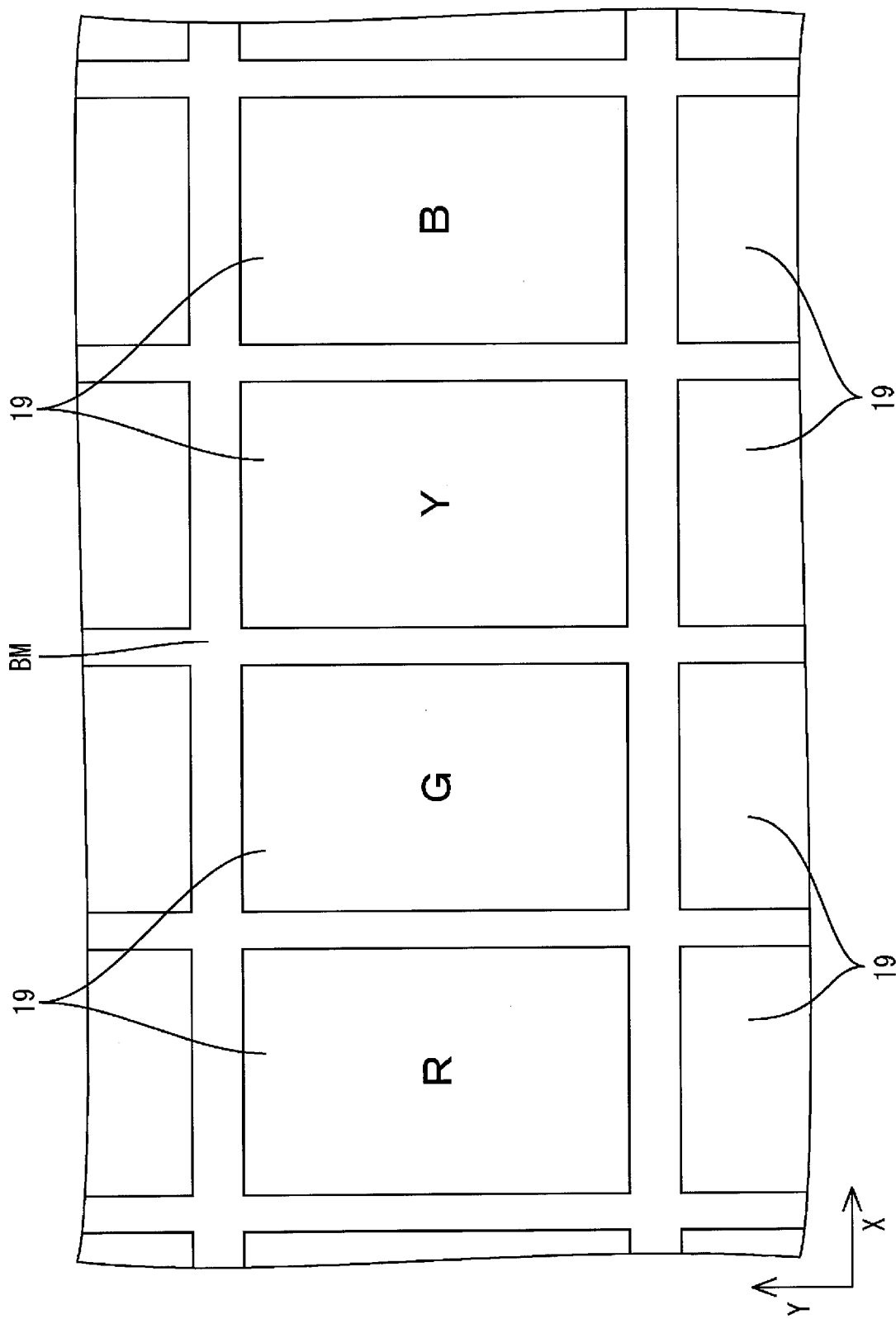
FIG. 5 is a magnified view of a CF board illustrating a plan-view configuration.

On the inner surface of the CF board 11a on the liquid crystal layer 11c side (opposite to the array board 11b), color filters 19 including a number of R, G, B and Y color portions arranged in a matrix according to the pixels on the array board 11b side, as illustrated in FIGS. 3 and 5. Each color filter 19 includes the Y color portion in yellow in addition to the R color portion in red, the G color portion in green, the B color portion in blue. Red, green and blue are three primary colors of light. The R color portion, the G color portion, the B color portion, and the Y color portion selectively pass the respective colors (or wavelengths) of light. The color filter 19 includes the R color portion in red, the G color portion in green, the Y color portion in yellow, and the B color portion in blue arranged in this sequence from the left side in FIG. 5 along the X-axis direction. Each of the R color portion, the G color portion, the B color portion, and the Y color portion has a rectangular shape with the long-side direction and the short-side direction thereof aligned with the X-axis direction and the Y-axis direction, respectively. Areas of the R color portion, the G color portion, the B color portion, and the Y color portion are all the same. A grid-like light blocking layer (a black matrix) BM is provided between the R color portion, the G color portion, the B color portion, and the Y color portion so that colors are less likely to be mixed. A counter electrode 20 and an alignment film 20 are overlaid with each other on the liquid crystal layer 11c side of the color filters 19 of the CF substrate 11a.

As described above, the liquid crystal display device 10 of this embodiment includes the liquid crystal panel 11 having the color filters 19. Color filters 19 include the color portions in four colors: the R color portions, the G color portions, the B color portions, and the Y color portions. The television receiver TV includes the designated image converter circuit board VC. The image converter circuit board VC converts television image signals from the tuner T to image signals relative to the respective colors of blue, green, red and yellow. The generated color image signals are inputted to the display control circuit board. The display control circuit board drives the TFTs 14 corresponding to the respective colors of the pixels of the liquid crystal panel 11 based on the image signals and controls the amounts of light passing through the R color portions, the G color portions, the B color portions, and the Y color portions, respectively.

Next, the configuration of the backlight unit 12 will be explained. As illustrated in FIG. 2, the backlight unit 12 includes a chassis 22 and an optical member set 23. The chassis 22 has a box-like shape and an on the light emitting side (on the liquid crystal panel 11 side). The optical member set 23 is arranged so as to cover the opening of the chassis 22. The optical member set 23 includes a diffuser plate (a light diffusing member) 23a and a plurality of optical sheets 23b arranged between the diffuser plate 23a and the liquid crystal panel 11. Light emitting diodes (LEDs) 24 are installed in the chassis 22 as light sources. Furthermore, LED boards 25 on which the LEDs 24 are mounted, a light guide member 26, and a frame 27 are arranged inside the chassis 22. The light guide member 26 is configured to guide light from the LEDs 24 to the optical member set 23 (or the liquid crystal panel 11). The frame 27 holds down the light guide member 26 from the front side. The backlight unit 12 is a so-called edge-light-type (or a side-light-type) in which the LED boards 25 having the LEDs 24 arranged at long-side edges and the light guide member 26 arranged in the middle area between the LED boards 25. Components of the backlight unit 12 will be explained in detail.

Figure 6:
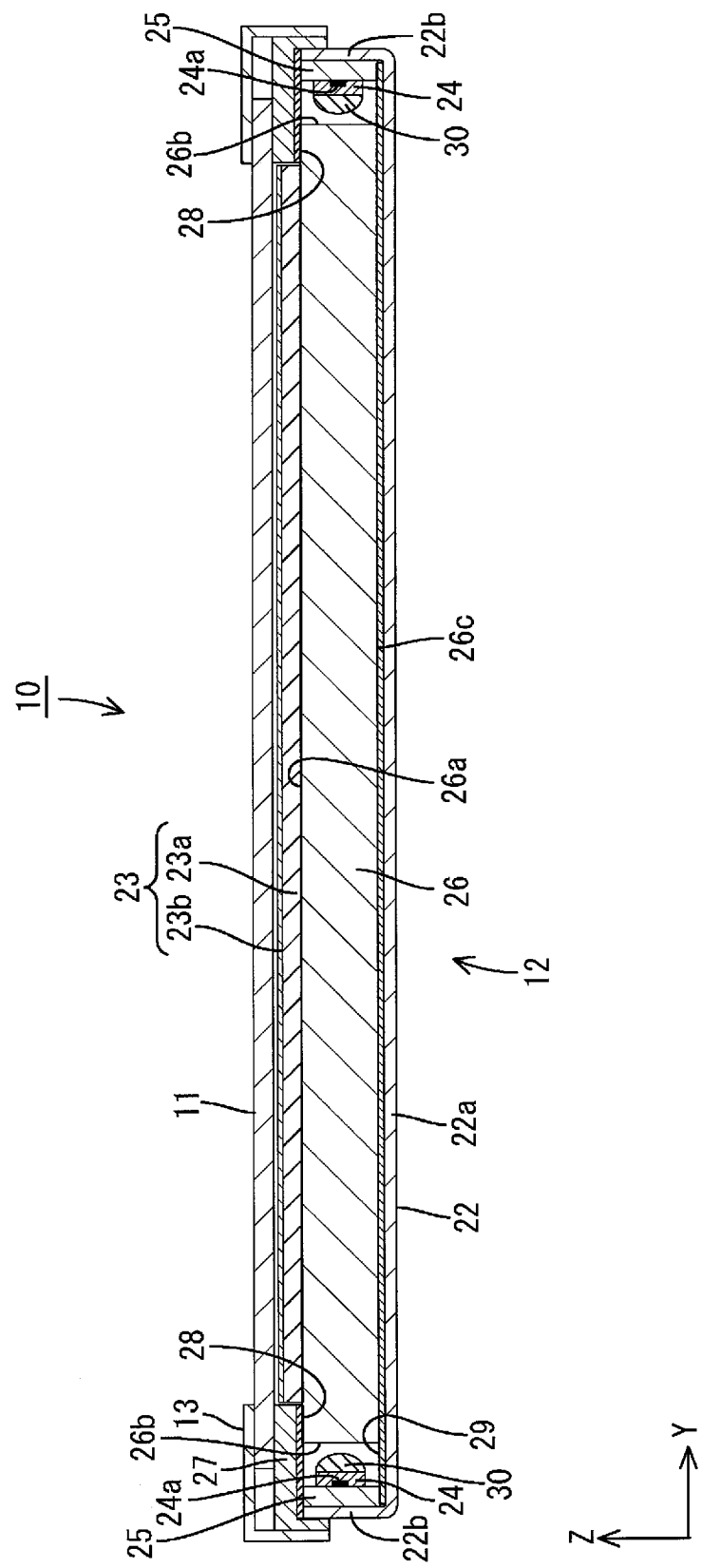
FIG. 6 is a cross-sectional view of the liquid crystal display device along the short-side direction illustrating a cross-sectional configuration.
Figure 7:
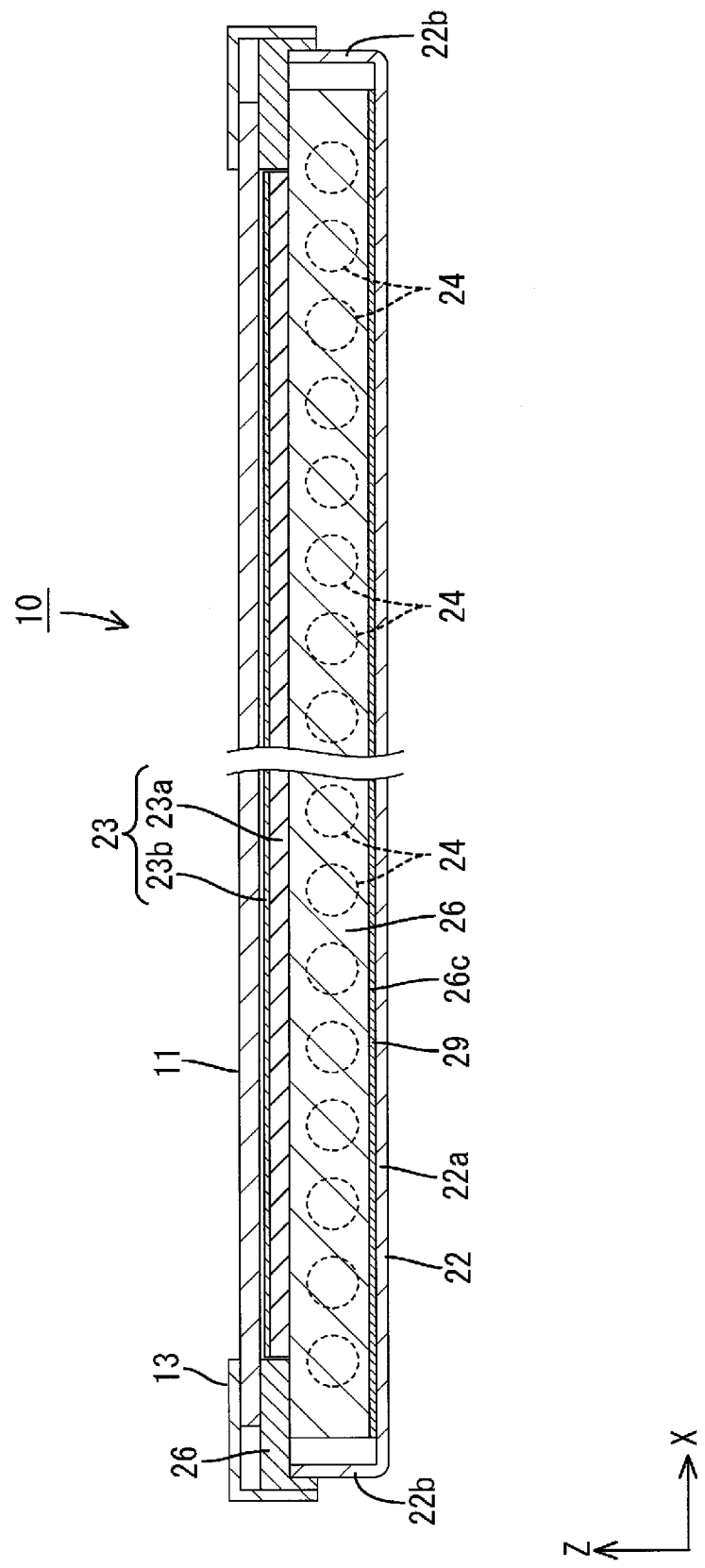
FIG. 7 is a cross-sectional view of the liquid crystal display device along the long-side direction illustrating a cross-sectional configuration.

The chassis 22 is made of metal. As illustrated in FIGS. 6 and 7, the chassis 22 includes a bottom plate 22a and side plates 22b. The bottom plate 22a has a rectangular shape similar to the liquid crystal panel 11. Each side plate 22b rises from an outer edge of the corresponding side of the bottom plate 22a. The chassis 22 has a shallow-box-like overall shape with an opening on the front side. The long-side direction and the short-side direction are aligned with the X-axis direction (the horizontal direction) and the Y-axis direction (the vertical direction), respectively. The frame 27 and the bezel 13 are fixed to the side plates 22b with screws.

As illustrated in FIG. 2, the optical member set 23 has a landscape rectangular plan-view shape similar to the liquid crystal panel 11 and the chassis 22. The optical member set 23 is arranged on the front surface of the light guide member 26 (on the light exit side) between the liquid crystal panel 11 and the light guide member 26. The optical member set 23 includes the diffuser plate 23a and the optical sheets 23b. The diffuser plate 23a is arranged on the rear side (the light guide member 26 side, an opposite side from the light exit side). The optical sheets 23b are arranged on the front side (the liquid crystal panel 11 side, the light exit side). The diffuser plate 23a is constructed of a plate-like member in a specified thickness and made of substantially transparent synthetic resin with light-scattering particles dispersed therein. Each optical sheet 23b has a sheet-like shape with a thickness smaller than that of the diffuser plate 23a. Three sheets are overlaid with each other. Examples of the optical sheets 23b are a diffuser sheet, a lens sheet and a reflection-type polarizing sheet. Each optical sheet 23b can be selected from those sheets accordingly.

As illustrated in FIG. 2, the frame 27 has a frame-like shape extending along the periphery of the light guide member 26. The frame 27 holds down substantially entire edges of the light guide member 26 from the front side. The frame 27 is made of synthetic resin. The front surface of the frame 27 may be in black so as to have a light blocking capability. As illustrated in FIG. 6, first reflection sheets 28 are mounted to the backsides of the respective long-side portions of the frame 27, that is, surfaces opposed to the light guide member 26 and the LED boards 25 (or the LEDs 24). Each first reflection sheet 28 has a dimension extending for a substantially entire length of the long-side portion of the frame 27. The first reflection sheet 28 is directly in contact with the edge of the light guide member 26 on the LED 24 side. The first reflection sheet 28 collectively covers the edge of the light guide member 26 and the LED board 25 from the front side. The frame 27 receives the outer edges of the liquid crystal panel 11 from the rear side.

Figure 8:
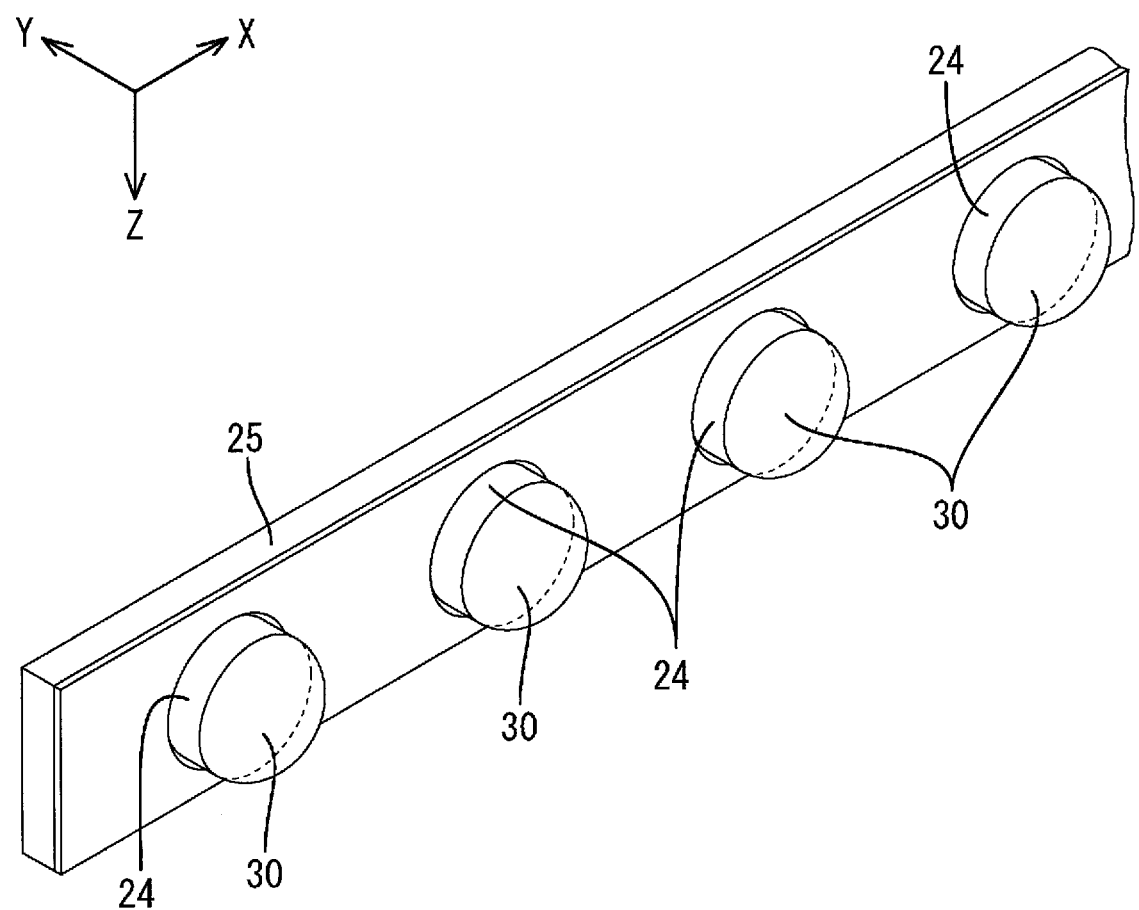
FIG. 8 is a magnified perspective view of an LED board.

As illustrated in FIG. 2, each LED 24 is mounted on the LED board 25. A surface of the LED 24 opposite from amounting surface thereof to the LED board 25 is a light emitting surface, that is, the LED 24 is a top light type. As illustrated in FIGS. 6 and 8, a lens 30 is disposed on the light emitting surface of each LED 24 for diffusing and emitting light in a wide angle. The lens 30 is arranged between the LED 24 and the light entrance surface 26b of the light guide member 26 so as to project toward the light guide member 26. A light exit surface of the LED 24 is a spherical surface. The light exit surface of the lens 30 is curved along the light entrance surface 26b of the light guide member 26 so as to form an arc-like shape in a cross-sectional view. A detailed configuration of each LED 24 will be explained later.

The LED 24 is arranged on a base board that is fixed to the LED board 25 and the LED chip 24a made of InGaN-based material is sealed thereto with a resin material. The LED chip 24a mounted on the base board has a main emission wavelength in a blue wavelength range from 420 nm to 500 nm and emits blue light having excellent chromatic purity. A green phosphor and a red phosphor are contained in a dispersed manner in the resin material that seals the LED chip at a predetermined ratio. The green phosphor is excited by the blue light emitted from the LED chip 24a and emits green light, and the red phosphor is excited by the blue light emitted from the LED chip 24a and emits red light. The LED 24 emits light entirely having a certain color such as white or bluish white from the blue light (light having a blue component) emitted from the LED chip 24a, the green light (light having a green component) emitted from the green phosphor and red light (light having a red component) emitted from the red phosphor. Yellow light is obtained by combining the light having a green component from the green phosphor and the light having a red component from the red phosphor. Therefore, it can be said that the LED 24 has both of light having a blue component and light having a yellow component from the LED chip 24a. Chromaticity of light from the LED 24 changes according to an absolute value or a relative value of content of the green phosphor and the red phosphor. Therefore, the chromaticity of light from the LED 24 is adjusted by properly adjusting the content of the green phosphor and the red phosphor. In the present embodiment, the green phosphor has a main emission wavelength in a green wavelength range from 500 nm to 570 nm and the red phosphor has a main emission wavelength in a red wavelength range from 610 nm to 780 nm.

As illustrated in FIG. 2, each LED board 25 has an elongated plate-like shape extending along the long-side direction of the chassis 22 (the X-axis direction, the long-side direction of the light entrance surface 26b of the light guide member 26). The LED board 25 is arranged with the main board surface parallel to the X-Z plane, that is, perpendicular to board surfaces of the liquid crystal panel 11 and the light guide member 26 (or the optical member 23) and housed in the chassis 22. The LED boards 25 are provided in a pair and arranged at the long inner edges of the chassis 22, respectively. The LEDs 24 are surface-mounted on the main board surface of each LED board 25, which is an inner surface opposite the light guide member 26 (the opposite surface to the light guide member 26). A plurality of the LEDs 24 are arranged in line (i.e., linearly) on the mount surface of the LED board 25 along the long side of the LED board 25 (the X-axis direction). Namely, the LEDs 24 are arranged at the long sides of the backlight unit 12 along the longitudinal direction, respectively. The LED boards 25 in a pair are arranged so as to face each other and housed in the chassis 22. Therefore, the light emitting surfaces of the LEDs 24 on one of the LED boards 25 face the light emitting surfaces of the LEDs 24 on the other LED board 25. Light axes of the LEDs 24 are substantially aligned with the Y-axis direction.

The substrate of each LED board 25 is made of metal, for instance, aluminum-contained material similar to the chassis 22. On the surface of the substrate, metal-film wiring patterns (not illustrated) including copper foil wiring patterns are formed via an insulating film. A reflection layer (not illustrated) in white having high light reflectivity is formed on the outermost surface of the substrate of each LED board 25. With the wiring patterns, the LEDS 24 arranged on the LED board 25 are connected in series. A material used for the LED boards 25 may be an insulating material including ceramic.

Next, the light guide member 26 will be explained in detail. The light guide member 26 is made of synthetic resin that is nearly transparent (i.e., capable of light transmission at a high level) and has a refraction index higher than that of the air (e.g., acrylic). As illustrated in FIG. 2, the light guide member 26 has a rectangular plan-view shape similar to the liquid crystal panel 11 and the chassis 22 with the long sides and the short sides aligned with the X-axis direction and the Y-axis direction, respectively. The light guide member 26 is arranged below the liquid panel 11 and the optical member 23 inside the chassis 22 and between the LED boards 25 arranged at the long edges of the chassis 22 with respect to the Y-axis direction. An arrangement direction of the LEDs 24 (or the LED boards 25) and the light guide member 26 is along the Y-axis direction and an arrangement direction of the optical member set 23 (or the liquid crystal panel 11) and the light guide member 26 is along the Z-axis direction. The arrangement directions are perpendicular to each other. The light guide member 26 receives light from the LEDs 24 in the Y-axis direction, passes it therethrough, and directs it to the optical member 23 (in the Z-axis direction). The light guide member 26 is slightly larger than the optical member set 23 and the thus the peripheral edges thereof project from the peripheral edges of the optical member set 23. The peripheral edges of the light guide member 26 are held down by the frame 27 described earlier (see FIGS. 6 and 7).

The light guide member 26 has a plate-like shape extending along the bottom plate 22a of the chassis 22 and the board surface of the optical member set 23. The main board surfaces of the light guide member 26 are parallel to the X-Z plane. A surface of the main board surfaces of the light guide member 26 on the front side is a light exit surface 26a through which light exits toward the optical member set 23 and the liquid crystal panel 11. Long-side peripheral edge surfaces extending along the X-axis direction among peripheral edge surfaces adjacent to the main board surfaces of the light guide member 26 are arranged so as to face the LEDs 24 (the LED boards 25) with specified distances therefrom. The long-side peripheral edge surfaces are the light entrance surfaces 26b through which light from the LEDs 24 enters. The light entrance surfaces 26b are parallel to the X-Z plane and perpendicular to the light exit surface 26a. An arrangement direction of the LEDs 24 and the light entrance surfaces 26b is aligned with the Y-axis direction and parallel to the light exit surface 26a. A second reflection sheet 29 is arranged on an opposite surface 26c of the light guide member 26 opposite from the light exit surface 26a so as to cover an entire area of the opposite surface 26c. The second reflection sheet 29 is configured to reflect light toward the front side. The second reflection sheet 29 extends to areas overlapping the LED boards 25 (or the LEDs 24) in plan view. The second reflection sheet 29 is arranged such that the LED boards 25 (or the LEDs 24) are sandwiched between the first reflection sheet 28 on the front side and the second reflection sheet 29. With this configuration, rays of light from the LEDs 24 are repeatedly reflected by the light reflection sheets 28 and 29. Therefore, the rays of light efficiently directed to the light guide member 26 through the light entrance surfaces 26b. At least one of the light exit surface 26a and the opposite surface 26c of the light guide member 26 has a reflecting portion (not illustrated) configured to reflect light inside or a scattering portion (not illustrated) configured to scatter light inside. The reflecting portion or the scattering portion may be formed by patterning with a specified in-plane distribution. With this configuration, the light exiting from the light exit surface 26a is controlled to have an even in-plane distribution.

As described above, each color filters 19 of this embodiment includes the Y color portions in addition to the R color portions, the G color portions, and the B color portions in three primary colors of light, respectively. Therefore, a color range of the display images displayed with the transmitted light is expanded and the images can be displayed with high color reproducibility. The light passed through the Y color portions in yellow has a wavelength close to a visible peak. Namely, people perceive the light as bright light even though the light is emitted with low energy. Even when the outputs of the light sources (the LEDs 24) in the backlight unit 12 are reduced, sufficient brightness still can be achieved. Therefore, the power consumption of the light sources can be reduced and the backlight unit 12 is provided with high environmental efficiency.

When the four-color-type liquid crystal panel 11 described above is used, an overall color of the display images tend to be yellowish. To solve this problem, the amounts of light passing through the R, G, G, Y color portions may be controlled by driving the TFTs 14 and the chromaticity of the display images may be corrected. An overall amount of transmitted light tends to decrease according to the correction of the chromaticity and thus the brightness may decrease. In view of such a problem, the inventor of this application has created a method for correcting the chromaticity of display images without a reduction in brightness by adjusting the chromaticity of light sources in the backlight unit 12. Specifically, types of the light sources that may be used in the backlight unit 12 are LED and cold cathode tube. Comparative experiment 1 described below was performed to what level of brightness can be achieved when the two types of the light sources are adjusted for the four-color-type liquid crystal panel described above. Results of comparative experiment 1 are provided in table 1.

Comparative Experiment 1

Comparative experiment 1 is performed on examples 1 through 4. In example 1, a three-color-type liquid crystal panel including R, G, B color portions in three primary colors of light is used and cold cathode tubes (CCFLs) are used as light sources. In example 2, a four-color-type liquid crystal panel including R, G, B, Y color portions in four colors is used and cold cathode tubes with adjusted chromaticity are used as light sources. In example 3, a three-color-type liquid crystal panel including R, G, B color portions in three primary colors of light is used and LEDs are used as light sources. In example 4, a four-color-type liquid crystal panel including R, G, B, Y color portions in four colors is used and LEDs with adjusted chromaticity are used as light sources. Table 1 includes measurements in comparative examples. The measurements include the brightness of each light source, the chromaticity of each light source, the brightness of transmitted light exiting from the liquid crystal panel (display images), and overall chromaticity of the transmitted light. The cold cathode tubes (not illustrated) used in comparative examples 1 and 2 are one kind of discharge tubes. Each cold cathode tube includes an elongated glass tube, mercury that is a luminescent material sealed in the glass tube, a phosphor applied to inner walls of the glass tube, and electrodes enclosed at ends of the glass tube. Each LED used in comparative examples 3 and 4 includes a blue LED chip as a light emitting source, a green phosphor that emits green light, and a red phosphor that emits red light. The brightness and the chromaticity of each light source and the transmitted light are obtained by measuring light passed through the R, G, B, Y color portions of the color filters 19 by a spectrophotometer. The chromaticity of each light source is adjusted such that the transmitted light exiting from the liquid crystal panel is substantially white. Specifically, the kind and the content (or the compounding ratio) of the phosphor in the light source are altered in the adjustment. In each comparative example, the area ratios and the film thicknesses of the color portions are the same. The brightness regarding comparative example 2 is a value relative to the Y value in comparative example 1, which is set to 100% as a reference. The brightness regarding comparative example 4 is a value relative to the Y value in comparative example 3, which is set to 100% as a reference.

Figure 12:
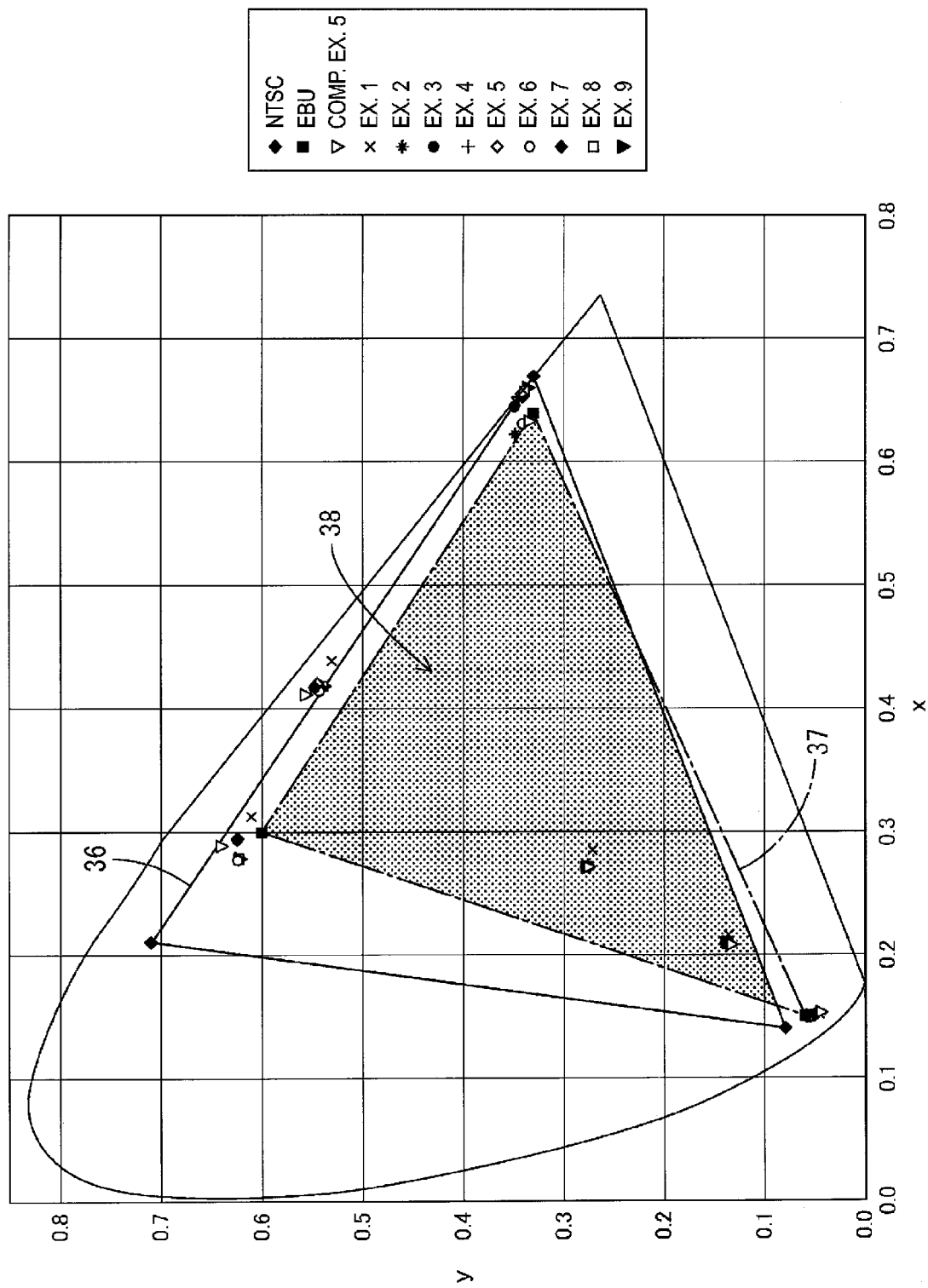
FIG. 12 is a CIE 1931 color space chromaticity diagram illustrating chromaticity coordinates regarding tables 2 and 3.
Figure 13:
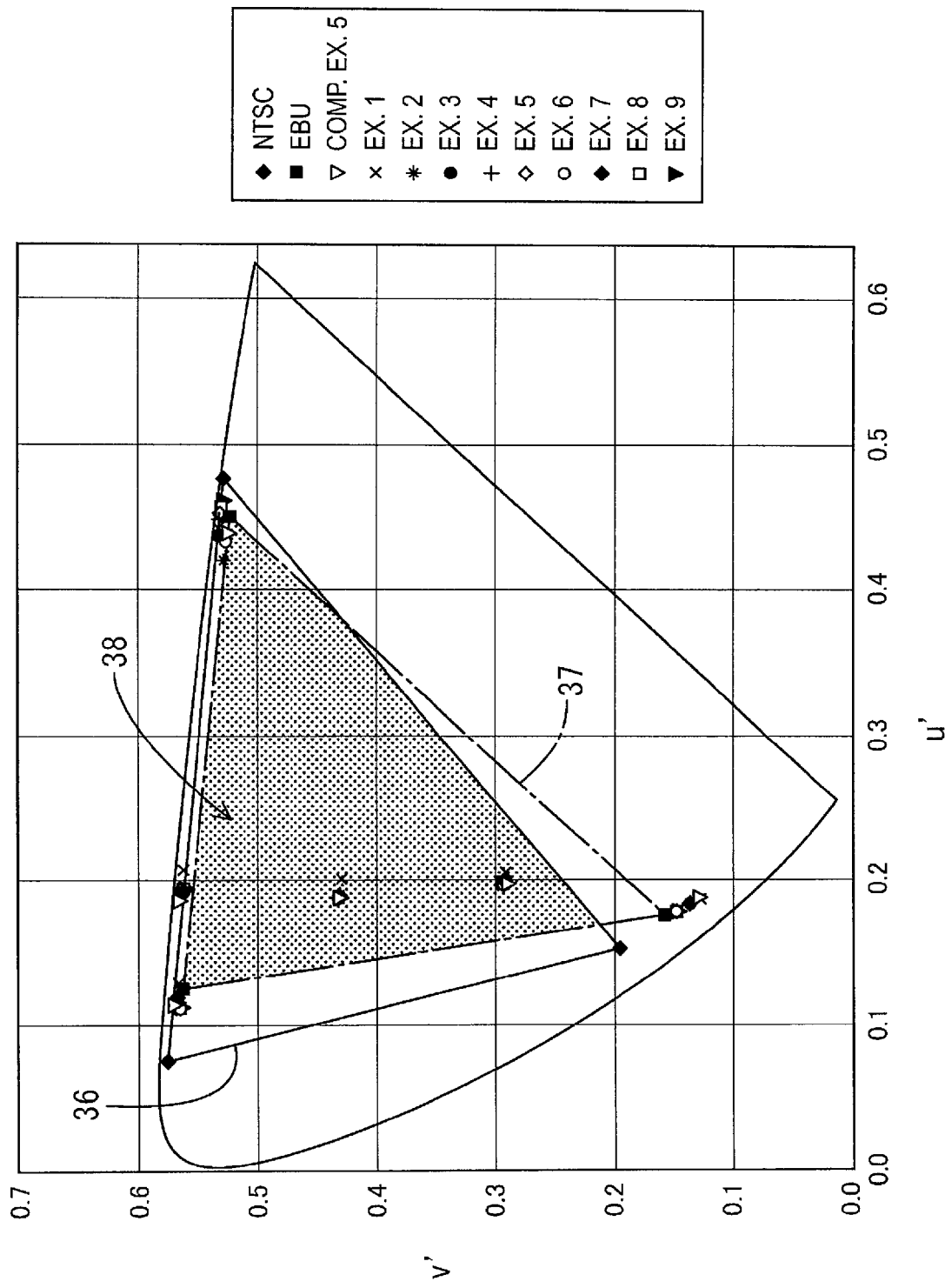
FIG. 13 is a CIE 1976 color space chromaticity diagram illustrating chromaticity coordinates regarding tables 2 and 3.

Values x and y in table 1 are chromaticity coordinates in the color space chromaticity diagram created by the International Commission on Illustration (Commission Internationale de l'Eclairage, CIE) in 1931 illustrated in FIG. 12. As illustrated in FIG. 12, the chromaticity coordinates (0.272, 0.277) in the CIE 1931 chromaticity diagram indicate a reference point for white in the experiments. The color becomes more bluish as values x and y decrease and more yellowish as x and y increase. Values u' and v' in table 1 are chromaticity coordinates in the color space chromaticity diagram created by the International Commission on Illustration (Commission Internationale de l'Eclairage, CIE) in 1976 illustrated in FIG. 13. As illustrated in FIG. 13, the chromaticity coordinates (0.1882, 0.4313) in the CIE 1976 chromaticity diagram indicate a reference point for white in the experiments. The color becomes more bluish as values v' decrease and more yellowish as v' increase.

TABLE 1

| | | COMP. EX. 1 | COMP. EX. 2 | COMP. EX. 3 | COMP. EX. 4 |
|---|---|---|---|---|---|
| TYPE OF LIGHT SOURCE | | CCPL | | LED | |
| AREA RATIO OF EACH COLOR PORTION | R | 1 | 1 | 1 | 1 |
| | Y | 0 | 1 | 0 | 1 |
| | G | 1 | 1 | 1 | 1 |
| | B | 1 | 1 | 1 | 1 |
| BRIGHTNESS OF LIGHT SOURCE | | 100.0% | 79.9% | 100.0% | 82.4% |
| BRIGHTNESS OF LIGHT | | 100.0% | 110.1% | 100.0% | 116.1% |
| CHROMATICITY OF LIGHT SOURCE | x | 0.2617 | 0.2197 | 0.2629 | 0.22 |
| | y | 0.2351 | 0.1618 | 0.2354 | 0.1576 |
| | u' | 0.1976 | 0.1952 | 0.1985 | 0.1977 |
| | v' | 0.3994 | 0.3234 | 0.3998 | 0.3187 |
| OVERALL CHROMATICITY OF TRANSMITTED LIGHT | x | 0.272 | 0.272 | 0.2723 | 0.2717 |
| | y | 0.277 | 0.277 | 0.2767 | 0.2773 |
| | u' | 0.1882 | 0.1882 | 0.1886 | 0.1879 |
| | v' | 0.4313 | 0.4313 | 0.4312 | 0.4315 |

Figure 9:
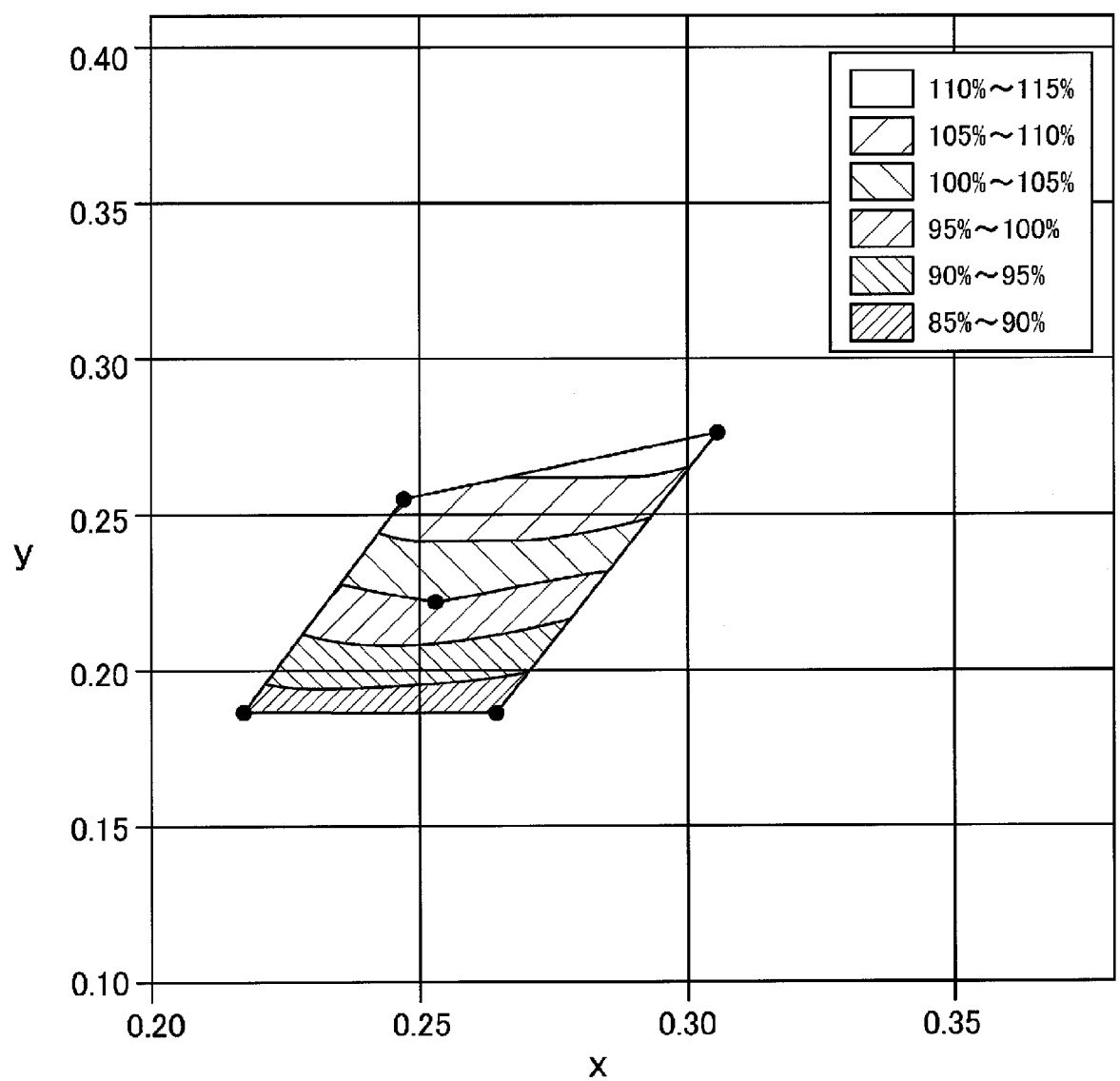
FIG. 9 is a CIE 1931 color space chromaticity diagram illustrating a chromaticity-brightness relationship regarding a cold cathode tube.
Figure 10:
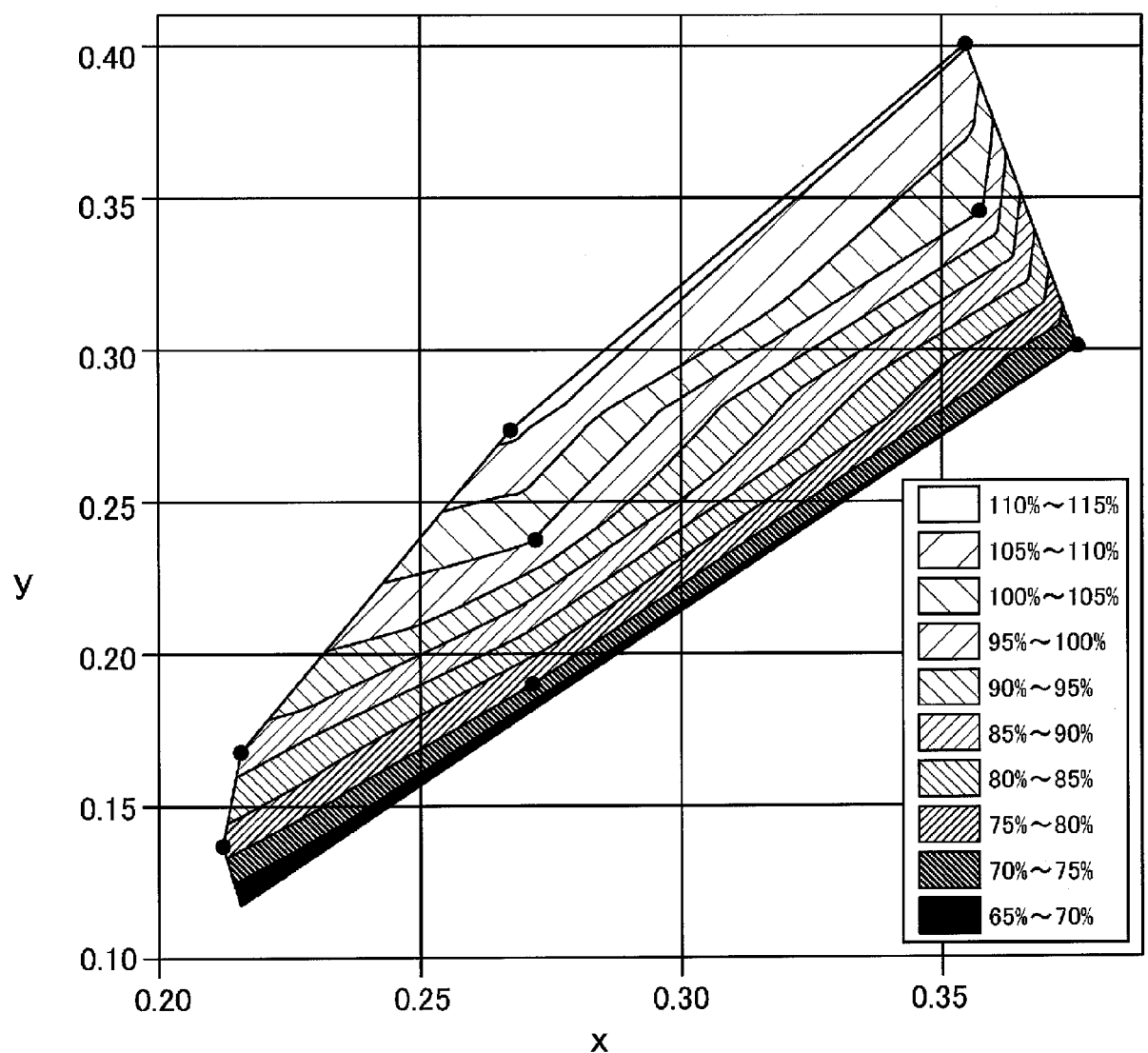
FIG. 10 is a CIE 1931 color space chromaticity diagram illustrating a chromaticity-brightness relationship regarding an LED.

Comparisons are performed between results related to examples 1 and 2 and between results related to examples 3 and 4. When the color filter is altered from three-color filters to four-color filters with adjustment of the chromaticity of the light sources, the brightness of light exiting from the liquid crystal panel increases, that is, the brightness does not decrease. Then, comparison is performed between the results related to examples 2 and 4. When the color filter is altered from three-color filters to four-color filters with adjustment of the chromaticity of the light sources, the brightness of the LEDs decreases more then that of the cold cathode tubes. Therefore, an increase in the brightness of the light exiting from the panel is relatively small. This may be because how the brightness varies according to the adjustment of the chromaticity depends on a kind of the light sources, namely, because chromaticity-brightness characteristics are different. This will be explained with reference to FIGS. 9 and 10. The isophote of chromaticity-brightness characteristics of LEDs illustrated in FIG. 10, which is a dividing line between regions having the same brightness, inclines in the x-y plane. If the chromaticity is adjusted toward the bluish side, the brightness does not significantly decrease. The isophote of chromaticity-brightness characteristics of cold cathode tubes in FIG. 9 is substantially parallel to the x-axis. If the chromaticity of the cold cathode tubes is adjusted toward the bluish side, the brightness significantly decreases in comparison to the LEDs. This may create differences in increase of the brightness of the transmitted light. Another reason may be because the cold cathode tubes do not provide good spectral characteristics with the four-color-type liquid crystal panel in comparison to the LEDs and thus the brightness of the transmitted light is relatively low. Example values (%) in FIGS. 9 and 10 indicate relative brightness values.

In this embodiment, the LEDs 24 that provide higher brightness than the cold cathode tubes are considered to be used and configurations of the LEDs 24 which can provide further higher brightness are proposed. The configuration will be explained. Each LED 24 according to this embodiment includes a YAG-based phosphor configured to emit light excited by blue light from an LED chip 24a. With this configuration, the brightness of the LED and the brightness of the transmitted light exiting from the liquid crystal panel 11 can be increased. As described earlier, high brightness and color reproducibility can be achieved in this embodiment with the Y color portions in yellow included in the color filters 19 of the liquid crystal panel 11. In combination with the LEDs 24 including the YAG-based phosphors and provide high brightness, the brightness of the transmitted light can be increased, namely, synergistic effects can be achieved.

A YAG-based phosphor expressed by $Y_3Al_5O_{12}$ is an yttrium-aluminum complex oxide having a garnet structure. The YAG-based phosphor includes rare-earth element (e.g., Ce, Tb, Eu, Nd) as an activator. The YAG-based phosphor may be provided by replacing all or a part of the Y site of $Y_3Al_5O_{12}$ with Gd or Tb. The YAG-based phosphor may be provided by replacing a part of the Al site with Ga. Through the replacement, the main emission wavelength of the YAG-based phosphor can be adjusted to a long-wavelength side or a short-wavelength side. The YAG-base phosphor may be $Y_3Al_5O_{12}:Ce$, $Y_3Al_5O_{12}:Tb$, $(Y,Gd)_3Al_5O_{12}:Ce$, $Y_3(Al,Ga)_5O_{12}:Ce$, $Y_3(Al,Ga)_5O_{12}:Tb$, $(Y,Gd)_3(Al,Ga)_5O_{12}:Ce$, $(Y,Gd)_3(Al,Ga)_5O_{12}:Tb$, $Tb_3Al_5O_{12}:Ce$.

The brightness characteristics of the YAG-based phosphor may vary according to the main emission wavelength. The chromaticity of the light emitting from the liquid crystal panel 11 can be altered when the YAG-based phosphor is used in combination with the liquid crystal panel 11 including the color filters 19 having the Y color portions in yellow. Comparative experiment 2, which will be explained later, is performed to observe how the brightness and the chromaticity of the light emitting from the liquid crystal panel 11 vary. In comparative experiment 2, the following problem and the solution for the problem are examined. When the YAG-based phosphor is used, better brightness can be achieved but the color reproducibility is lower when used with the liquid crystal panel 11 including the color filters 19 having the Y color portions in yellow in comparison to a configuration in which another kind of phosphor is used. The inventor of this application assumed that high color reproducibility can be maintained if the R color portions have larger thickness than those of the G, B and Y color portions. In comparative experiment 2, how the brightness and the chromaticity of the light emitting from the liquid crystal panel 11 vary according to variations in thickness of the R color portions in red was also examined.

Prior to explanation of comparative experiment 2, the CIE 1931 color space chromaticity diagram in FIG. 12 and the CIR 1976 color space chromaticity diagram will be explained in detail. Solid-line triangles in FIGS. 12 and 13 indicate an NTSC gamut 36 in the NTSC standard. NTSC stands for national television system committee. Chain-line triangles in FIGS. 12 and 13 indicate an EBU gamut 37 in the EBU standard. EBU stands for European broadcasting union. Hatch quadrilaterals in FIGS. 12 and 13 are a common gamut 38 of the NTSC gamut 36 and the EBU gamut 37. The NTSC gamut 36, the EBU gamut 37, and the common gamut 38 are defined by chromaticity coordinates in table 2 and will be explained later. Values x, y, u' and v' in table 2 are all similar values to those in table 1.

The NTSC gamut 36, the EBU gamut 37, and the common gamut 38 will be explained. The NTSC gamut 36 is defined by the chromaticity coordinates in table 2. The NTSC gamut 36 is a triangular region with vertices of three primary colors expressed by (x, y) coordinates in the CIE 1931 chromaticity diagram in FIG. 12, which are blue (0.14, 0.08), green (0.21, 0.71), and red (0.67, 0.33). In the CIE 1976 chromaticity diagram, the vertices of the triangular region are expressed by (u', v') coordinates of green (0.0757, 0.5757), blue (0.1522, 0.1957), and red (0.4769, 0.5285). The EBU gamut 37 is defined by the chromaticity coordinates in table 2. The EBU gamut 37 is a triangular region with vertices of three primary colors expressed by (x, y) coordinates in the CIE 1931 chromaticity diagram in FIG. 12, which are blue (0.15, 0.06), green (0.3, 0.6), and red (0.64, 0.33). In the CIE 1976 chromaticity diagram, the vertices of the triangular region are expressed by (u', v') coordinates of green (0.1250, 0.5625), blue (0.1754, 0.1579), and red (0.4507, 0.5229).

The common gamut is a quadrilateral region that is an overlap between two triangular regions of the NTSC gamut 36 and the EBU gamut 37. The common gamut 38 is a required gamut in both the NTSC standard and the EBU standard, that is, very important region for maintaining the quality of display images (or color reproducibility) higher than a certain level. Specifically, the quadrilateral region of the common region 38 is defined by the following four points expressed by x-y coordinates in the CIE 1931 chromaticity diagram in FIG. 12. Two of the points are intersections of a line between the primary color points of red and blue (RB line) in the NTSC gamut 36 and a line between the primary color points of blue and green (BG line) in the EBU gamut 37. The intersections are at (0.1579, 0.0884) and (0.3, 0.6). Other two points are intersections of the RB line in the NTSC gamut 36 and an RB line in the EBU gamut 37. The intersections are at (0.4616, 0.2317) and (0.64, 0.33). Furthermore, the quadrilateral region of the common region 38 is defined by the following four points expressed by u'-v' coordinates in the CIE 1976 chromaticity diagram in FIG. 13. One of the points is at (0.125, 0.5625). Another point is an intersection of an RB line in the NTSC gamut 36 and a BG line in the EBU gamut 37. The intersection is at (0.1686, 0.2125). Other points are intersections of the RB line in the NTSC gamut 36 and an RB line in the EBU gamut 37. The intersections are at (0.3801, 0.4293) and (0.4507, 0.5229).

TABLE 2

| | | CIE1931 CHROMATICITY DIAGRAM | | CIE1976 CHROMATICITY DIAGRAM | |
|---|---|---|---|---|---|
| | | x | y | u' | v' |
| NTSC | R | 0.670 0 | 0.330 0 | 0.478 9 | 0.528 5 |
| | G | 0.210 0 | 0.710 0 | 0.075 7 | 0.575 7 |
| | B | 0.140 0 | 0.080 0 | 0.152 2 | 0.195 7 |
| EBU | R | 0.640 0 | 0.330 0 | 0.450 7 | 0.522 9 |
| | G | 0.300 0 | 0.600 0 | 0.125 0 | 0.562 5 |
| | B | 0.150 0 | 0.560 0 | 0.175 4 | 0.157 9 |
| INTERSECTION BETWEEN NTSC AND EBU | INTERSECTION BETWEEN RB AND RG | 0.461 6 | 0.231 7 | 0.380 1 | 0.429 3 |
| | INTERSECTION BETWEEN RB AND GB | 0.157 9 | 0.088 4 | 0.168 6 | 0.212 5 |

Comparative Experiment 2

Comparative experiment 2 will be explained in detail. Example 5 in comparative experiment 2 includes β-SiAlON as a green phosphor and CaAlSiN (CaAlSiN3:Eu) as a red phosphor. The general expression of the β-SiAlON is Si6-zAlzOzN8-z:Eu, where z is a solid solubility. The first embodiment includes a YAG-based phosphor having a main emission wavelength of 554 nm as a green phosphor and does not use a red phosphor. Example 2 includes a YAG-based phosphor having a main emission wavelength of 539 nm as a green phosphor and CaAlSiN (CaAlSiN3:Eu) as a red phosphor. Example 6 includes a YAG-based phosphor having a main emission wavelength of 519 nm and CaAlSiN (CaAlSiN3:Eu) as a red phosphor. Examples 3 to 5 include LEDs having the same phosphors as those in example 2 and the R color portions in red having a film thickness larger than those of the G, B, Y color portions. Examples 7 to 9 include LEDs having the same phosphors as those in example 6 and R color portions having a film thickness larger than those of the G, B, Y color portions. In comparative example 5 and examples 1 to 9, LED chips used in the LEDs have a main emission wavelength of 451 nm. Measurements related to comparative example 5 and examples 1 to 9 are shown in table 3. The measurements include main emission wavelengths of the LED chips, kinds of the phosphors and their main emission wavelengths, the thicknesses and area ratios of the R, G, B, Y color portions, the brightness of light emitted from the liquid crystal panel (display images), NTSC ratios of the light in the chromaticity regions, the chromaticity of the LEDs, and the chromaticity of each color related to the light.

Figure 11:
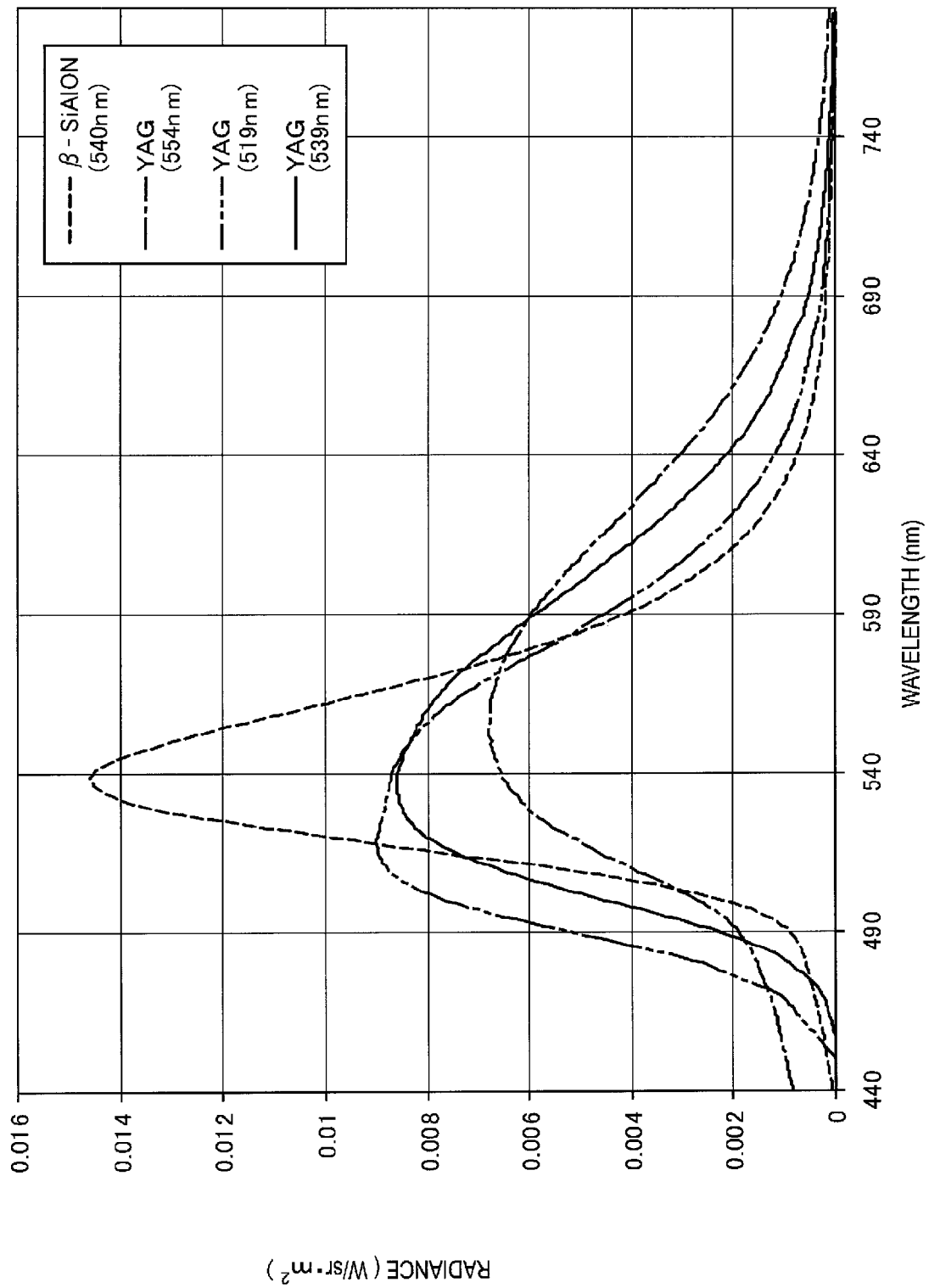
FIG. 11 is a graph illustrating emission spectra of green phosphors.

Each of the YAG-based phosphors used in Examples 1, 2 and 6 has a different main emission wavelength. To provide each of the YAG-based phosphors with a different main emission wavelength, a part of all of the Y-site in the chemical formula: Y3Al5O12 is exchanged with Gd, Tb, for example, or a part of the Al-site is exchanged with Ga (the main emission wavelength is shifted to a longer wavelength or a shorter wavelength). Examples of the YAG-based phosphors that can be used are described before. An emission spectrum of each of the green phosphors of Comparative Example 5 and Examples 1, 2 and 6 (β-SiAlON and each YAG-based phosphor) is illustrated in FIG. 11. A main emission wavelength of each of the green phosphors is a wavelength ((nm) a value on the horizontal axis) having a maximum value (peak) of radiance (W/sr·m2) that is represented on the vertical axis in FIG. 11. CaAlSiN (CaAlSiN3:Eu) that is a red phosphor has a main emission wavelength of 638 nm, for example (not illustrated). The radiance is represented on the vertical axis in FIG. 11 with considering easy validation of the measurement data. However, a physical amount related to other kinds of radiation such as radiant flux (W) or irradiance (W/m2) may be represented on the vertical axis.

Figure 14:
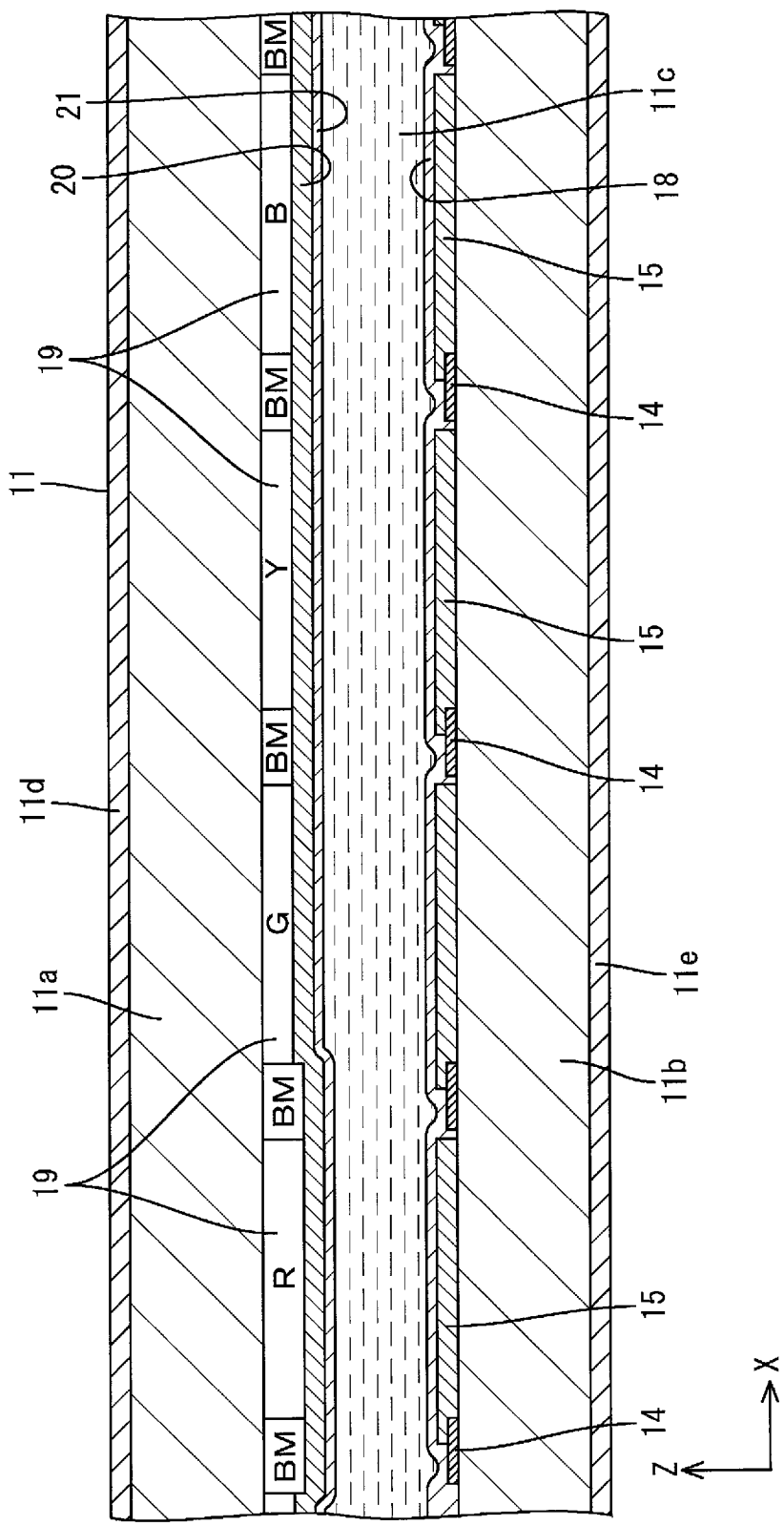
FIG. 14 is a cross-sectional view illustrating a cross-sectional configuration of color portions according to third to fifth and seventh to ninth embodiments.

In Comparative Example 5 and Examples 1, 2 and 6, the film thicknesses of the color portions R, G, B, Y are equal to be 2.1 μm as illustrated in FIG. 3 (the specific values of the film thicknesses are described in Table 3). In Examples 3 to 5 and 7 to 9, the red color portion R has a film thickness greater than other color portions G, B, Y, as illustrated in FIG. 14. Specifically, in Examples 3 and 7, the film thickness of the red color portion R is 3.0 μm that is approximately 142.86% of the film thickness of each of other color portions G, B, Y (2.1 μm). In Example 8, the film thickness of the red color portion R is 3.5 μm that is approximately 166.67% of the film thickness of each of other color portions G, B, Y. In Examples 4 and 9, the film thickness of the red color portion R is 4 μm that is approximately 190.48% of each of other color portions G, B, Y. In Example 5, the film thickness of the red color portion R is 4.5 μm that is approximately 214.29% of the film thickness of each of other color portions G, B, Y. Namely, the film thicknesses of the red color portions R of Examples 3 to 5 are within the range from 142.8% to 214.3% of the film thickness of other color portions G, B, Y, and the film thicknesses of the red color portions R of Examples 7 to 9 are within the range from 142.8% to 190.5%.

In Table 3, a NTSC ratio of transmitted light and the gamut represents an area ratio of a gamut of the transmitted light measured in Comparative Example and each of Examples with respect to the NTSC gamut 36. If the NTSC ratio has a value of 70% or more in each of the CIE1931 chromaticity diagram and the CIE1976 chromaticity diagram, sufficient color reproducibility and display quality is ensured in the liquid crystal display device 10. The NTSC ratio of the EBU gamut 37 is 72%. Therefore, if the gamut of the transmitted light preferably has the NTSC ratio of 72% or more, the gamut having a level of the EBU standard is ensured and this achieves excellent display quality. The chromaticity of each color in the transmitted light is obtained by measuring light passed through the R, G, B, Y color portions of the color filters 19 by a spectrophotometer. Each of the color portions R, G, B, Y has a constant pigment density in each Example. Therefore, the chromaticity of each of the color portions R, G, B, Y changes according to the thickness thereof. As the thickness reduces, chromatic purity reduces and a gamut is reduced and the amount of transmitted light of the object color increases. As the thickness increases, the amount of transmitted light of the object color reduces and the chromatic purity is improved and the gamut is increased. In each of the color portions R, G, B, Y, as the film thickness reduces, the color reproducibility is deteriorated and the brightness is improved, and as the film thickness increases, the brightness reduces and the color reproducibility is improved. Brightness of each of Examples 1 to 9 represents a relative value in condition that the brightness in Comparative Example 5 is 100%. Chromaticity of each LED is adjusted by controlling the content of each phosphor. Values x, values y, values u' and values v' in Table 3 are same as those explained in Table 1.

TABLE 3

|  |  | CCMP EX. 5 | EX. 1 | EX. 2 | EX. 3 | EX. 4 | EX. 5 | EX. 6 | EX. 7 | EX. 8 | EX. 9 |
|---|---|---|---|---|---|---|---|---|---|---|---|
| LED | MAIN EMISSION WAVELENGTH OF LED CHIP | 451 nm | 451 nm | 451 nm | 451 nm | 451 nm | 451 nm | 451 nm | 451 nm | 451 nm | 451 nm |
|  | GREEN PHOSPHOR (MAIN EMISSION WAVELENGH) | β-SiAlON (540 nm) | YAG (554 nm) | YAG (539 nm) | YAG (539 nm) | YAG (539 nm) | YAG (539 nm) | YAG (519 nm) | YAG (519 nm) | YAG (519 nm) | YAG (519 nm) |
|  | RED PHOSPHOR (MAIN EMISSION WAVELENGTH) | CaSiN3 (638 nm) | — | CaSiN3 (638 nm) | CaSiN3 (638 nm) | CaSiN3 (638 nm) | CaSiN3 (638 nm) | CaSiN3 (638 nm) | CaSiN3 (638 nm) | CaSiN3 (638 nm) | CaSiN3 (638 nm) |
| AREA RATIO | R | 1 | 1 | 1 | 1 | 1 | 1 | 1 | 1 | 1 | 1 |
|  | G | 1 | 1 | 1 | 1 | 1 | 1 | 1 | 1 | 1 | 1 |
|  | B | 1 | 1 | 1 | 1 | 1 | 1 | 1 | 1 | 1 | 1 |
|  | Y | 1 | 1 | 1 | 1 | 1 | 1 | 1 | 1 | 1 | 1 |
| THICKNESS | R | 2.1 μm | 2.1 μm | 2.1 μm | 3.0 μm | 4.0 μm | 4.5 μm | 2.1 μm | 3.0 μm | 3.5 μm | 4.0 μm |
|  | G | 2.1 μm | 2.1 μm | 2.1 μm | 2.1 μm | 2.1 μm | 2.1 μm | 2.1 μm | 2.1 μm | 2.1 μm | 2.1 μm |
|  | B | 2.1 μm | 2.1 μm | 2.1 μm | 2.1 μm | 2.1 μm | 2.1 μm | 2.1 μm | 2.1 μm | 2.1 μm | 2.1 μm |
|  | Y | 2.1 μm | 2.1 μm | 2.1 μm | 2.1 μm | 2.1 μm | 2.1 μm | 2.1 μm | 2.1 μm | 2.1 μm | 2.1 μm |
| BRIGHTNESS |  | 100% | 111% | 119% | 118% | 117% | 117% | 116% | 115% | 115% | 114% |
| NTSC RATIO(CIE1931) |  | 80.8% | 75.5% | 75.0% | 78.4% | 79.9% | 80.4% | 78.2% | 81.5% | 82.3% | 82.8% |
| NTSC RATIO(CIE1976) |  | 95.3% | 92.0% | 86.8% | 91.8% | 94.7% | 96.0% | 89.9% | 94.9% | 96.6% | 97.6% |
| CHROMATICITY | x | 0.2074 | 0.2155 | 0.2085 | 0.2085 | 0.2094 | 0.2102 | 0.2078 | 0.2086 | 0.2095 | 0.2095 |
|  | y | 0.1358 | 0.1361 | 0.1361 | 0.1363 | 0.1369 | 0.1375 | 0.1381 | 0.1385 | 0.1389 | 0.139 |
|  | u' | 0.1968 | 0.2051 | 0.1978 | 0.1977 | 0.1983 | 0.1988 | 0.196 | 0.1966 | 0.1973 | 0.1972 |
|  | v' | 0.29 | 0.2915 | 0.2905 | 0.2908 | 0.2917 | 0.2926 | 0.293 | 0.2937 | 0.2943 | 0.2944 |
| OVERALL CHROMATICITY (WH CHROMATICITY) | x | 0.2711 | 0.2849 | 0.2729 | 0.2714 | 0.2712 | 0.2719 | 0.2711 | 0.2711 | 0.2718 | 0.2711 |
|  | y | 0.2779 | 0.2713 | 0.2761 | 0.2761 | 0.2761 | 0.2763 | 0.2779 | 0.2779 | 0.2779 | 0.2778 |
|  | u' | 1.1872 | 0.2004 | 0.1893 | 0.1881 | 0.188 | 0.1884 | 0.1872 | 0.1872 | 0.1877 | 0.1872 |
|  | v' | 0.4318 | 0.4294 | 0.4309 | 0.4306 | 0.4306 | 0.4308 | 0.4318 | 0.4318 | 0.4319 | 0.4317 |
| RED CHROMATICITY | x | 0.6333 | 0.6495 | 0.6228 | 0.645 | 0.653 | 0.6558 | 0.6313 | 0.6533 | 0.6579 | 0.6606 |
|  | y | 0.3365 | 0.3475 | 0.3481 | 0.349 | 0.3444 | 0.3419 | 0.341 | 0.3412 | 0.3389 | 0.337 |
|  | u' | 0.4389 | 0.4425 | 0.42 | 0.4374 | 0.4483 | 0.453 | 0.4332 | 0.4515 | 0.4576 | 0.4617 |
|  | v' | 0.5247 | 0.5327 | 0.5282 | 0.5326 | 0.532 | 0.5313 | 0.5265 | 0.5306 | 0.5304 | 0.53 |
| YELLOW CHROMATICITY | x | 0.4114 | 0.439 | 0.4172 | 0.4172 | 0.419 | 0.4207 | 0.4145 | 0.4165 | 0.4186 | 0.4186 |
|  | y | 0.5587 | 0.5305 | 0.5475 | 0.5475 | 0.546 | 0.5446 | 0.5427 | 0.5411 | 0.5394 | 0.5394 |
|  | u' | 0.1853 | 0.2069 | 0.191 | 0.191 | 0.1923 | 0.1936 | 0.1909 | 0.1924 | 0.1939 | 0.1939 |
|  | v' | 0.5661 | 0.5625 | 0.5641 | 0.5641 | 0.5639 | 0.5638 | 0.5625 | 0.5623 | 0.5622 | 0.5622 |
| GREEN CHROMATICITY | x | 0.2886 | 0.3126 | 0.2938 | 0.2938 | 0.2944 | 0.2949 | 0.2771 | 0.2777 | 0.2783 | 0.2784 |
|  | y | 0.6425 | 0.6103 | 0.6242 | 0.6243 | 0.624 | 0.6237 | 0.6237 | 0.6233 | 0.6229 | 0.623 |
|  | u' | 0.1139 | 0.1289 | 0.1187 | 0.1187 | 0.119 | 0.1192 | 0.1116 | 0.1119 | 0.1122 | 0.1123 |
|  | v' | 0.5707 | 0.5664 | 0.5673 | 0.5673 | 0.5673 | 0.5673 | 0.5653 | 0.5653 | 0.5652 | 0.5653 |
| BLUE CHROMATICITY | x | 0.1524 | 0.1514 | 0.151 | 0.151 | 0.151 | 0.151 | 0.1494 | 0.1494 | 0.1494 | 0.1494 |
|  | y | 0.0468 | 0.0462 | 0.05 | 0.05 | 0.0501 | 0.0502 | 0.0553 | 0.0552 | 0.0552 | 0.0553 |
|  | u' | 0.1872 | 0.1862 | 0.1831 | 0.1831 | 0.1831 | 0.183 | 0.1776 | 0.1777 | 0.1777 | 0.1776 |
|  | v' | 0.1293 | 0.1279 | 0.1364 | 0.1364 | 0.1367 | 0.1369 | 0.1479 | 0.1477 | 0.1477 | 0.1479 |

Comparing brightness of the transmitted light in Comparative Example 5 and Examples 1, 2 and 6, the brightness is higher in Examples 1, 2 and 6 than Comparative Example 5. This implies that the green phosphor containing a YAG-based phosphor obtains higher brightness than the green phosphor containing a β-SiAlON. Comparing brightness of the transmitted light in Examples 1, 2 and 6 each of which uses a YAG-based phosphor, higher brightness is obtained in Examples 2 and 6 than in Example 1. Comparing the transmitted light in Examples 2 and 6, higher brightness is obtained in Example 2 than in Example 6. This implies that the highest brightness is obtained in the LED using the YAG-based phosphor having the main emission wavelength of 539 nm, and the brightness decreases in the LED using the YAG-based phosphor having the main emission wavelength of 519 nm and in the LED using the YAG-based phosphor having the main emission wavelength of 554 nm in this order. Comparing the NTSC ratios in Examples 1, 2 and 6, the NTSC ratio is highest in Example 6 and decreases in the Examples 1 and 2 in this order. From the results described above, the brightness is most excellent in the YAG-based phosphor having the main emission wavelength of 539 nm and the color reproducibility is most excellent in the YAG-based phosphor having the main emission wavelength of 519 nm. To obtain good results both in brightness and color reproducibility, it is preferable to use the YAG-based phosphor having the main emission wavelength of 519 nm. If the main emission wavelength of the YAG-based phosphor is less than 519 nm, the main emission wavelength is shifted to the wavelength region of blue light that is emitted from the LED chip 24a. Accordingly, it may be difficult to adjust chromaticity of light from the LED 24. If the main emission wavelength of the YAG-based phosphor is greater than 554 nm, the main emission wavelength is shifted to the wavelength region of yellow light that transmits through the yellow color portion Y included in the liquid crystal panel 11. Also, it may be difficult to adjust chromaticity of light from the LED 24. Therefore, the main emission wavelength of the YAG-based phosphor is preferably within the range from 519 nm to 554 nm.

Comparing the NTSC ratios in Comparative Example 5 and Examples 1, 2 and 6, the NTSC ratios are smaller in Examples 1, 2 and 6 than in Comparative Example 5 and it is apparent that the color reproducibility is worse in the YAG-based phosphor than β-SiAlON. To improve the color reproducibility, the film thickness of the color portion R is increased than other color portions G, B, Y in Examples 3 to 5 and 7 to 9. The effects thereof will be explained in detail with reference to Table 3. Comparing Examples 2 and 3 to 5, as the film thickness of the red color portion R increases, the NTSC ratio and value x and value u' of the red chromaticity increase and this improves color reproducibility. Comparing Examples 6, 7 to 9, as the film thickness of the red color portion R increases, the NTSC ratio and value x and value u' of the red chromaticity increase and this improves color reproducibility. Especially, Examples 3 to 5 (the YAG-based phosphor has the main emission wavelength of 539 nm and the red color portion R has a film thickness greater than other color portions G, B, Y) ensure brightness higher than Examples 1 and 6 to 9 and are more excellent in the color reproducibility than Examples 1 and 6. Therefore, Examples 3 to 5 are most excellent both in brightness and color reproducibility. Examples 7 to 9 ensure brightness higher than Example 1 and has NTSC ratio greater than Comparative Example 5. Therefore, Examples 7 to 9 are excellent in sufficient brightness and high color reproducibility. The color reproducibility is improved as the thickness of the red color portion R increases. This can be caused due to the following relationship. The amount of red light transmitting through the red color portion tends to be inversely proportional to the film thickness of the red color portion and the chromatic purity tends to be proportional to the film thickness.

The YAG-based phosphor of Example 1 has a main emission wavelength of 554 nm that is closest to the yellow wavelength region compared to Examples 2 and 6. Therefore, if the red phosphor is additionally used to improve the color reproducibility, it becomes difficult to adjust chromaticity of the LED corresponding to the liquid crystal panel including the yellow color portion Y. Therefore, the red phosphor actually cannot be additionally used. It is apparent that the red phosphor cannot be additionally used because the whole chromaticity of the transmitted light in Example 1 is shifted to the yellow side (the red side) compared to the Examples 2 to 9. Therefore, if using the YAG-based phosphor having a main emission wavelength of 554 nm as in Example 1, it is actually impossible to increase the film thickness of the red color portion R and improve the color reproducibility as in Examples 3 to 5 and 7 to 9. A preferable range of a main emission wavelength of the YAG-based phosphor is from 519 nm to 539 nm to achieve high brightness and high color reproducibility and ensure easy chromaticity adjustment.

The blue chromaticity (a primary color point of blue), the green chromaticity (a primary color point of green), the yellow chromaticity (a primary color point of yellow) and the red chromaticity (a primary color point of red) of the transmitted light of Examples 1 to 9 are outside of the common gamut 38 in each chromaticity diagram illustrated in FIGS. 12 and 13. The common gamut 38 is a quite significant area to maintain the display quality (color reproducibility) of the display images to be a certain level or higher. It is preferable that a gamut of the transmitted light occupies the common gamut 38 as large as possible. In Examples 1 to 9, the chromaticity of all colors is outside of the common gamut 38 and accordingly the gamut of the transmitted light occupies most part or an entire area of the common gamut 38. This ensures sufficient color reproducibility for listening to and watching the liquid crystal display device 10. In Examples 1 to 9, the NTSC ratio is 72% or more. Therefore, the color reproducibility same as the EBU standard or higher is achieved. The gamut here represents a quadrilateral region with four vertices of chromaticity (each primary color point) of red, blue, yellow and green of the transmitted light in Examples 1 to 9.

As is explained above, the liquid crystal display device 10 of the present embodiment includes the liquid crystal panel 11 and the backlight device 12 that emits light toward the liquid crystal panel 11. The liquid crystal panel 11 includes a pair of boards 11a, 11b and the liquid crystal layer 11c provided between the boards 11a, 11b. The liquid crystal layer 11c is formed of liquid crystals that change their optical property due to application of electric field. The color filters 19 including a red color portion R in red, a green dolor portion G in green, a blue color portion B in blue and a yellow color portion Y in yellow are formed on one of the boards 11a, 11b of the liquid crystal panel 11. The backlight device 12 includes the LEDs 24 as a light source and each of the LEDs 24 includes the LED chip 24a as a light emission source and the phosphor that is exited by the light from the LED chip 24a and emits light. The phosphor includes at least a YAG-based phosphor.

The color filters 19 are formed on one of the boards 11a, 11b of the liquid crystal panel 11 and the color filters 19 include the yellow color portion Y in addition to the red color portion R, the green color portion G and the blue color portion B. This increases a color reproducibility range or a color range that can be perceived by human beings and improves color reproducibility of physical colors existing in the natural world. This improves display quality. Among the color portions R, G, B, Y of the color filters 19, the light transmitting through the yellow color portion Y has a wavelength close to the peak of the visual sensitivity and therefore the light tends to be sensed by eyes of human beings as bright light having high brightness with small energy. Accordingly, sufficient brightness is obtained with suppressing the amount of output from the light source and this reduces consumption power of the light source and improves an environmental property. Namely, high brightness is obtained and this achieves clear contrast. This further improves the display quality.

If the color filter 19 includes a yellow color portion Y, light exiting from the liquid crystal panel 11 or the whole display image tends to be yellowish. To prevent this, the amount of light transmitting through each of the color portions R, G, B, Y may be controlled to correct the chromaticity of the display image. However, this tends to reduce the amount of light transmitting through the color portion according to the correction of the chromaticity and this may deteriorate brightness. As a result of the present inventors' earnest studies, it is concluded that the chromaticity of the display image is corrected by adjusting the chromaticity of light from the light source used in the backlight device 12 without deteriorating the brightness. According to this result, the LEDs 24 are used as the light source in the present embodiment. Compared to other types of light sources such as cold cathode tubes, the LED 24 maintains relatively high brightness if the chromaticity is adjusted corresponding to the liquid crystal panel 11 having the yellow color portion Y. The high brightness is maintained because the LED 24 and the liquid crystal panel 11 including the yellow color portion Y have a compatible spectroscopic property. Accordingly, the chromaticity of the display image is effectively corrected without deteriorating the brightness.

The present inventors further execute studies about the configuration of the LED 24 used for the light source. As a result of the studies, the inventors specify a LED 24 that achieves higher brightness. In the present embodiment, the LED 24 includes the LED chip 24a that is a light emission source and the phosphors that are excited by the light from the LED chip 24a and emit light, and the phosphor includes at least a YAG-based phosphor. Therefore, brightness of the LED 24 is improved and brightness of the transmitted light is also improved compared to an LED including a phosphor that is not the YAG-based phosphor (for example, β-SiAlON). In the present embodiment, the color filter 19 of the liquid crystal panel 11 includes the yellow color portion Y to achieve high brightness and improved color reproducibility as described before. Combination of the color filter 19 including the yellow color portion Y and the LED 24 having high brightness achieves synergetic effects of higher brightness of transmitted light. This implies that sufficient brightness is obtained even with suppressing the amount of output from the LED 24. This further reduces consumption power of the LED 24 and achieves a good environmental property.

A YAG-based phosphor expressed by $Y_3Al_5O_{12}$ is an yttrium-aluminum complex oxide having a garnet structure. The YAG-based phosphor includes rare-earth element (e.g., Ce, Tb, Eu, Nd) as an activator. The YAG-based phosphor may be provided by replacing all or a part of the Y site of $Y_3Al_5O_{12}$ with Gd or Tb. The YAG-based phosphor may be provided by replacing a part of the Al site with Ga. Through the replacement, the main emission wavelength of the YAG-base phosphor can be adjusted.

The YAG-based phosphor may be $Y_3Al_5O_{12}$:Ce, $Y_3Al_5O_{12}$:Tb, $(Y,Gd)_3Al_5O_{12}$:Ce, $Y_3(Al,Ga)_5O_{12}$:Ce, $Y_3(Al,Ga)_5O_{12}$:Tb, $(Y,Gd)_3(Al,Ga)_5O_{12}$:Ce, $(Y,Gd)_3(Al,Ga)_5O_{12}$:Tb, $Tb_3Al_5O_{12}$:Ce.

The YAG-based phosphor may have a main emission wavelength ranging from 519 nm to 554 nm. With this range, if the main emission wavelength of the YAG-based phosphor is less than 519 nm, sufficient brightness may not be obtained and the main emission wavelength is shifted to the cyan side (the blue side). Therefore, it may be difficult to adjust the chromaticity if a LED chip emitting blue light is used as the LED chip 24a. If the main emission wavelength of the YAG-based phosphor is greater than 554 nm, sufficient brightness is not obtained and the main emission wavelength is shifted to the yellow side (the red side). Therefore, it may be difficult to adjust the chromaticity of the LED 24 corresponding to the liquid crystal panel 11 including the color filter 19 including the yellow color portion Y. In the present embodiment, the YAG-based phosphor having the main emission wavelength ranging from 519 nm to 554 nm is used and this ensures easy chromaticity adjustment of the LED 24 and achieves high brightness and improved color reproducibility.

The YAG-based phosphor may have the main emission wavelength ranging from 519 nm to 539 nm. If the main emission wavelength of the YAG-based phosphor is greater than 539 nm, the brightness is relatively decreased and it may be difficult to adjust chromaticity in a case that the phosphor includes a red phosphor that emits red light to improve the color reproducibility. In the present embodiment, the YAG-based phosphor having the main emission wavelength ranging from 519 nm to 539 nm is used. This further improves brightness and also improves the color reproducibility with the phosphor including a red phosphor that emits red light and also ensures easy chromaticity adjustment.

The YAG-based phosphor may have the main emission wavelength of 539 nm. This achieves relatively higher brightness and sufficient color reproducibility compared to a case in which the main emission wavelength of the YAG-based phosphor is less than 539 nm.

The YAG-based phosphor may have the main emission wavelength of 519 nm. This achieves relatively improved color reproducibility and sufficient brightness compared to a case in which the main emission wavelength of the YAG-based phosphor is greater than 519 nm.

The phosphor includes a red phosphor that is excited by light emitted from the LED chip 24a and emits red light. The red phosphor is used in combination with the YAG-based phosphor having the main emission wavelength ranging from 510 nm to 539 nm. This ensures easy chromaticity adjustment and achieves improved color reproducibility.

The red phosphor is CaAlSiN. CaAlSiN that is nitride is used as the red phosphor. Therefore, CaAlSiN that is nitride emits red light with higher efficiency compared to a case using a red phosphor of sulfide or oxide.

The red phosphor is CaAlSiN (CaAlSiN:Eu). Accordingly, red light is emitted with high efficiency.

The red color portion R in red has a film thickness that is relatively greater than the blue color portion B in blue and the green color portion G in green. With such a configuration, compared to a case in which the film thicknesses of the color portions R, G, B are equal to each other, the amount of transmission light related to red is reduced and the gamut of transmitted light related to red is enlarged. This further improves color reproducibility.

The blue color portion B in blue and the green color portion G in green have substantially an equal thickness. Accordingly, the blue color portion B in blue and the green color portion G in green have substantially an equal capacitance generated between the boards 11a, 11b. Therefore, optical characteristics of the liquid crystal layer 11c provided between the boards 11a, 11b are controlled easily by impression of an electric field. Accordingly, transmission of light passing through the blue color portion B in blue and the green color portion G in green is easily controlled. This simplifies a design of a circuit related to the liquid crystal panel 11.

The yellow color portion Y in yellow has a film thickness that is substantially equal to a film thickness of the blue color portion B in blue and the green color portion G in green. With this configuration, the capacitance generated between the boards 11a, 11b is substantially equal to each other in the blue color portion B in blue, the green color portion G in green and the yellow color portion Y in yellow. This simplifies a design of a circuit related to the liquid crystal panel 11.

A film thickness of the red color portion R in red is 142.8% to 214.3% of the film thickness of the blue color portion B in blue and the green color portion G in green. If the film thickness of the red color portion R in red is less than 142.8% of the film thickness of the blue color portion B in blue and the green color portion G in green, difference in the film thickness between the blue and green color portions B, G and the red color portion R is too small. The gamut of the transmitted light related to red may not be sufficiently enlarged and the color reproducibility may not be sufficiently improved. If the percentage of the film thickness of the red color portion R to that of the blue and green color portions B, G is greater than 214.3%, the above-described problem of the capacitance is easily caused. In the present embodiment, the percentage of the film thickness is from 142.8% to 214.3%. Accordingly, the optical characteristic of the liquid crystal layer 11c that is provided between the boards 11a, 11b can be controlled properly by implication of an electric field and the color reproducibility is further improved.

The film thickness of each of the blue color portion B in blue and the green color portion G in green is 2.1 µm and the film thickness of the red color portion R in red is from 3.0 µm to 4.5 µm. With the above-described film thicknesses of the color portions R, G, B, the optical characteristics of the liquid crystal layer 11c provided between the boards 11a, 11b can be controlled further effectively by the implication of an electric field and the color reproducibility is further improved.

Each of the color portions R, G, B, Y has substantially a same film thickness. With this configuration, the capacitance generated between the substrates 11a, 11b is substantially equal to each other in each of the color portions R, G, B, Y of the color filter 19. Therefore, the optical characteristics of the liquid crystal layer 11c provided between the boards 11a, 11b can be easily controlled by implication of an electric field. Accordingly, light transmittance of each of the color portions R, G, B, Y is easily controlled and this greatly simplifies a design of a circuit related to the liquid crystal panel 11.

The main emission wavelength of the YAG-based phosphor is 554 nm. With this configuration, compared to a case in which the main emission wavelength of the YAG-based phosphor is smaller than 554 nm, the main emission wavelength is shifted to a yellow side (a red side). Therefore, the chromaticity can be adjusted without additionally including a red phosphor that emits red light as the phosphor. This reduces a manufacturing cost.

The main emission wavelength of the LED chip 24a is 451 nm. Accordingly, the YAG-based phosphor is excited with high efficiency and this achieves high brightness.

An area ratio of each of the color portions R, G, B, Y is equal to each other. If an area ratio of each of the color portions R, G, B, Y is different from each other, a special manufacturing device that is exclusive for manufacturing the liquid crystal panel 11 is necessary to be prepared. In the present embodiment, similar to the liquid crystal panel 11 including the color filter 19 having the color portions R, G, B of general colors of red, green and blue, the area ratio of each of the color portions R, G, B, Y of four colors is equal to each other. Therefore, a manufacturing device for manufacturing the three-color type liquid crystal panel 11 can be used for a four-color type liquid crystal panel. This sufficiently reduces a manufacturing cost of the liquid crystal panel 11 including the color filter 19 having the four color portions R, G, B, Y.

The color filter 19 may be configured to satisfy the following condition. The chromaticity of blue in the light that is emitted from the LED 24 and transmits through each of the color portions R, G, B, Y is outside of the common gamut 38 of the NTSC gamut 36 in the NTSC standard and the EBU gamut 37 in the EBU standard in at least one of the CIE 1931 chromaticity diagram and the CIE 1976 chromaticity diagram. With this configuration, the gamut related to blue in the transmitted light substantially contains the common gamut 38 and this ensures sufficient color reproducibility.

The color filter 19 may be configured to satisfy the following condition. The chromaticity of blue in the transmitted light is outside of the EBU gamut 37 in at least one of the CIE 1931 chromaticity diagram and the CIE 1976 chromaticity diagram. Accordingly, the gamut related to blue in the transmitted light is enlarged and this further improves the color reproducibility.

The color filter 19 may be configured to satisfy the following condition. The chromaticity of red in the light that is emitted from the LED 24 and transmits through each of the color portions R, G, B, Y is outside of the common gamut 38 of the NTSC gamut 36 in the NTSC standard and the EBU gamut 37 in the EBU standard in at least one of the CIE 1931 chromaticity diagram and the CIE 1976 chromaticity diagram. With this configuration, the gamut related to red in the transmitted light substantially contains the common gamut 38 and this ensures sufficient color reproducibility.

The color filter 19 may be configured to satisfy the following condition. The chromaticity of green in the light that is emitted from the LED 24 and transmits through each of the color portions R, G, B, Y is outside of the common gamut 38 of the NTSC gamut 36 in the NTSC standard and the EBU gamut 37 in the EBU standard in at least one of the CIE 1931 chromaticity diagram and the CIE 1976 chromaticity diagram. With this configuration, the gamut related to green in the transmitted light substantially contains the common gamut 38 and this ensures sufficient color reproducibility.

The color filter 19 may be configured to satisfy the following condition. The chromaticity of yellow in the light that is emitted from the LED 24 and transmits through each of the color portions R, G, B, Y is outside of the common gamut 38 of the NTSC gamut 36 in the NTSC standard and the EBU gamut 37 in the EBU standard in at least one of the CIE 1931 chromaticity diagram and the CIE 1976 chromaticity diagram. With this configuration, the gamut related to yellow in the transmitted light substantially contains the common gamut 38 and this ensures sufficient color reproducibility.

The gamut of the transmitted light occupies 70% or more of the NTSC gamut 36 in the NTSC standard. This ensures color reproducibility sufficient for display images and good display quality is obtained.

The backlight device 12 includes the light guide member 26 made of synthetic resin. The LEDs 24 face an end surface of the light guide member 26. Light from the LED 24 transmits through the light guide member 26 and is guided to the liquid crystal panel 11. The light guide member 26 made of synthetic resin generally has high transparency and is slightly yellowish. Therefore, light that is emitted from the LED 24 and transmits through the light guide member 26 also is slightly yellowish. Even in such a case, the chromaticity of light from the LED 24 is adjusted to correspond to the liquid crystal panel 11 including the yellow color portion Y and the yellowish light guide member 26. Accordingly, the chromaticity of display images can be corrected properly without deteriorating brightness.

The light guide member 26 has the elongated light entrance surfaces 26b on its ends close to the LEDs 24. The lens 30 is provided on each LED 24 to cover its light exit side and diffuse light. The lens 30 faces the light entrance surface 26b of the light guide member 26 and is curved along the longitudinal direction of the light entrance surface 26b so as to project toward the light guide member 26. With this configuration, light emitted from the LED 24 is directed to a wide range in a longitudinal direction of the light entrance surface 26b by the lens 30. Therefore, dark portions that may be formed on the light entrance surface 26b of the light guide member 26 is less likely to be formed. Even if a distance between the LED 24 and the light guide member 26 is small and the number of the LEDs 24 is small, light having even brightness enters an entire area of the light entrance surface 26b of the light guide member 26.

The backlight device 12 includes the reflection sheets 28, 29 that is provided between the LEDs 24 and the light guide member 26 and along the longitudinal direction of the light entrance surface 26b. With this configuration, light that scatters from the lens 30 to outside of the light guide member 26 reflects off the reflection sheets 28, 29 and enters the light guide member 26. This increases light entrance efficiency of the light that is emitted from the LED 24 and enters the light guide member 26.

The display panel is the liquid crystal panel 11 that uses the liquid crystal layer 11c that changes its optical characteristics by the implication of an electric field. With this configuration, the display panel can be used for various devices such as a television or a display of a personal computer and is preferably used for a large screen.

A television receiver TV of the present embodiment includes the liquid crystal display device 10 and a tuner T that is a receiving portion that receives television signals. In such a television receiver TV, the liquid crystal display device 10 displays television images according to the television signals and also properly corrects chromaticity of the display images with achieving high brightness. This achieves excellent display quality of television images.

The television receiver TV includes an image conversion circuit VC that converts television image signals that is output from the tuner T into image signals of blue, green, red and yellow. Accordingly, the image conversion circuit VC converts the television image signals into image signals of each color corresponding to each of the red color portion R, the green color portion G, the blue color portion B and the yellow color portion Y of the color filter 19. Therefore, the television images can be displayed with high display quality.

Second Embodiment

Figure 15:
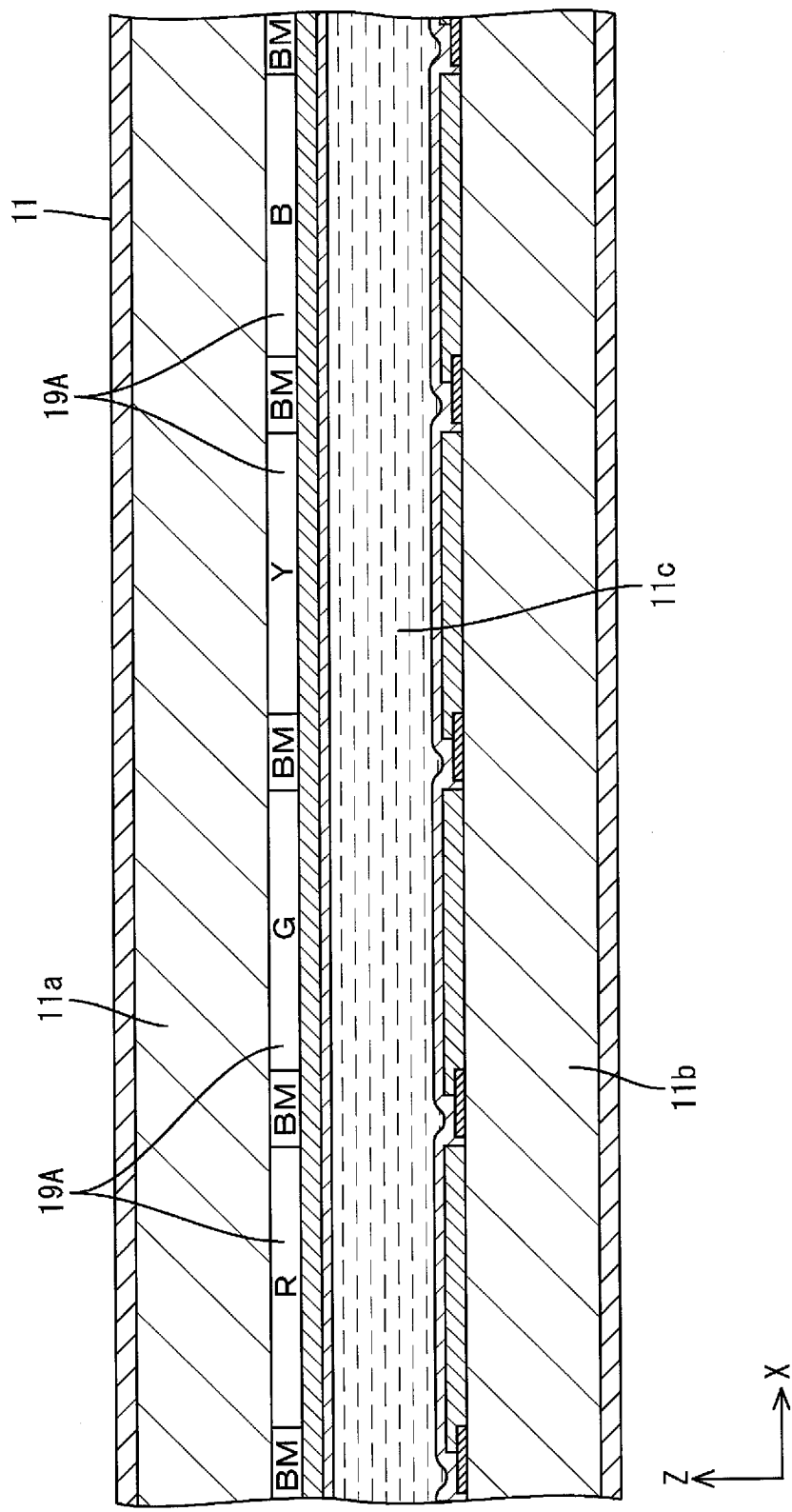
FIG. 15 is a cross-sectional view illustrating a cross-sectional configuration of color portions according to the second embodiment of the present invention.

A second embodiment of the present invention will be explained with reference to FIG. 15. In the second embodiment, a red color portion R of a color filter 19A has a pigment density that is different from other color portions G, B, Y. Structures, operations and effects same as those in the first embodiment will not be explained.

In the present embodiment, each of the color portions R, G, B, Y of the color filter 19A has a same film thickness, and the red color portion R has a pigment density that is different (higher than) from the pigment density of other color portions G, B, Y. The chromaticity of each of the color portions R, G, B, Y changes according to the pigment density thereof. As the pigment density decreases, the chromatic purity is deteriorated and the gamut is reduced and the amount of transmission light related to the object color increases. As the pigment density increases, the amount of transmission light related to the object color decreases and the chromatic purity is improved and the gamut is enlarged. In each of the color portions R, G, B, Y, the decrease of the pigment density deteriorates color reproducibility and improves brightness, and the increase of the pigment density deteriorates brightness and improves color reproducibility. Comparative Examples 2 of the first embodiment is carried out to the color filter 19A having such a configuration and Examples 3 to 5 and 7 to 9 are applied thereto and results same as the Examples are obtained.

As explained above, according to the present embodiment, each of the color portions R, G, B, Y contains pigments in a dispersed manner and the red color portion R in red contains pigments at a density higher than each of the blue color portion B in blue and the green color portion G in green. Thus, the density of the pigments contained in the red color portion R in red is relatively higher than the density of pigments contained in each of the blue color portion B in blue and the green color portion G in green. In such a case, compared to a case in which the density of pigments is same in each of the color portions R, G, B, the amount of transmission light in the transmitted light related to red decreases and the gamut related to red is enlarged. This achieves improved color reproducibility.

Each of the color portions R, G, B, Y has substantially a same film thickness. With such a configuration, the capacitance generated between the boards 11a, 11b is substantially equal to each other in each of the color portions R, G, B, Y of the color filter 19A. Accordingly, the optical characteristics of the liquid crystal layer 11c that is provided between the boards 11a, 11b can be easily controlled by the implication of an electric field. The light transmission of light transmitting through each of the color portions R, G, B, Y is easily controlled. This simplifies a design of a circuit related to the liquid crystal panel 11 with achieving high color reproducibility.

Third Embodiment

A third embodiment of the present invention will be explained with reference to FIGS. 16 and 17. In the third embodiment, a liquid crystal display device 110 includes components different from the first embodiment. The construction, operations and effects as same as the first embodiment will not be explained.

Figure 16:
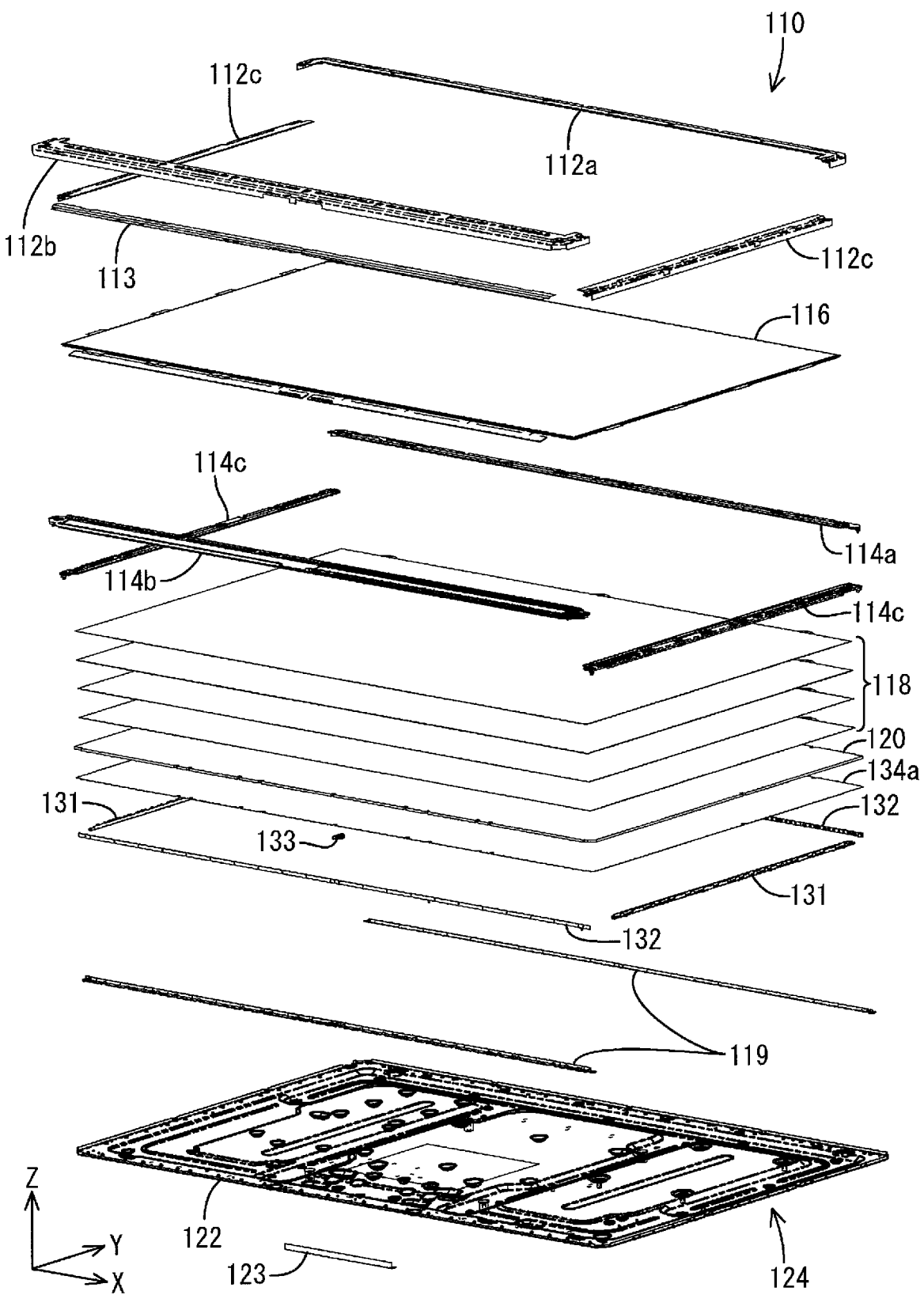
FIG. 16 is an exploded perspective view illustrating of a liquid crystal display device according to the third embodiment of the present invention.

FIG. 16 illustrates an exploded perspective view of the liquid crystal display device 110 according to the present embodiment. An upper side in FIG. 16 corresponds to a front-surface side and a lower side in FIG. 16 corresponds to a rear-surface side. The liquid crystal display device 110 is formed in a landscape rectangular. The liquid crystal display device 110 includes a liquid crystal panel 116 as a display panel, and a backlight unit 124 as an external light source. The liquid crystal panel 116 and the backlight unit 124 are integrally held by a top bezel 112a, a bottom bezel 112b, side bezels 112c (hereinafter a bezel set 112a to 112c) and the like. The construction of the liquid crystal panel 116 that is as same as the first embodiment will not be explained.

In the following, the backlight unit 124 will be explained. As illustrated in FIG. 16, the backlight unit 124 includes a backlight chassis (a holding member, a supporting member) 122, optical members 118, a top frame (a holding member) 114a, a bottom frame (a holding member) 114b, side frames (holding members) 114c (hereinafter referred to as a frame set 114a to 114c) and a reflection sheet 134a. The liquid crystal panel 116 is sandwiched between the bezel set 112a to 112c and the frame set 114a to 114c. A reference numeral 113 represents an insulating sheet that insulates a display driving circuit board 115 (see FIG. 17) for driving the liquid crystal panel 116. The backlight chassis 122 has an opening on the front-surface side (on the light exit side and the liquid crystal panel 116 side) and is formed in substantially a box shape having a bottom. The optical members 118 are provided on the front-surface side of the light guide plate 120. The reflection sheet 134a is provided on the front-surface side of the light guide plate 120. Furthermore, the backlight chassis 122 houses a pair of cable holders 131, a pair of heatsink (mounting heatsink) 119, a pair of LED units 132 and the light guide plate 120. The LED units 132, the light guide plate 120 and the reflection sheet 134a are supported each other by a rubber bushing 133. A power supply circuit board (not illustrated) supplying power to the LED units 132 and a protection cover 123 for protecting the power supply circuit board are mounted on the rear side of the backlight chassis 122. The pair of cable holders 131 is arranged in the short-side direction of the backlight chassis 122 and houses cables electrically connecting the LED units 132 and the power supply circuit board.

Figure 17:
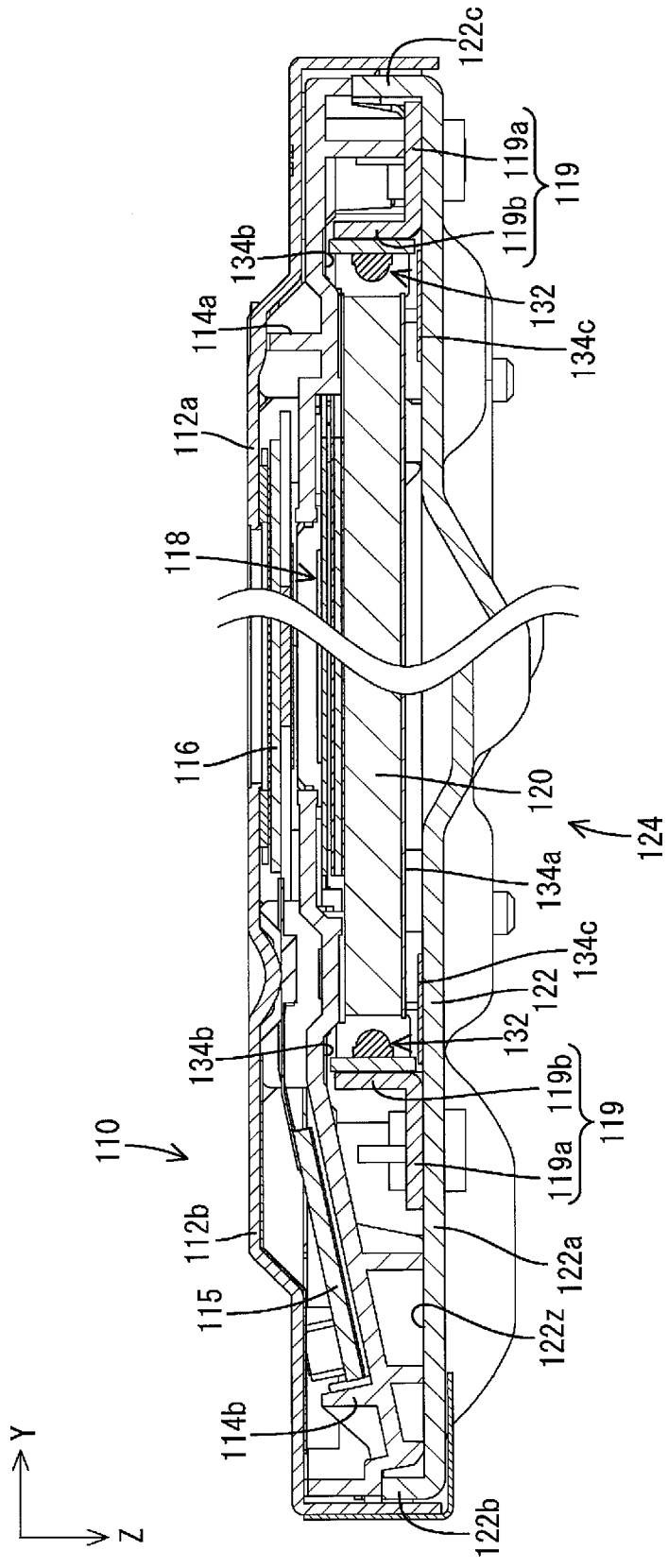
FIG. 17 is a horizontal cross-sectional view of the liquid crystal display device.

FIG. 17 illustrates a horizontal sectional view of the backlight unit 124. As illustrated in FIG. 17, the backlight chassis 122 includes a bottom plate 122a having the bottom surface 122z thereon and side plates 122b and 122c, each of which rises shallowly from an outer edge of the corresponding side of the bottom plate 122a. The backlight chassis 122 supports at least the LED unit 132 and the light guide plate 120. Furthermore, each of the mounting members 119 includes a bottom surface portion 119a and a side surface portion 119b that rises from one of outer edges of the long side of the bottom surface portion 119a. The heatsink 119 includes a bottom surface portion (a second plate) 119a and a side surface portion (a first plate) 119b that rises from a long-side outer edge of the bottom surface portion 119a. The heatsink 119 is formed in an L-shape with a horizontal sectional view and provided along the long sides of the backlight chassis 122. The bottom surface portion 119a of the heatsink 119 is fixed to the bottom plate 122a of the backlight chassis 122. The LED units 132 extend in the long-side direction of the backlight chassis 122. The bottom surface portion 119a of the heatsink 119 is fixed to the bottom plate 122a of the backlight chassis 122. The LED units 132 extend along the long sides of the backlight chassis 122 and fixed to the side surface portions 119b of the heatsink 119 such that the light exit sides of the LED units 132 face each other. The heatsink 119 dissipate heat generated in the LED units 132 outside the backlight unit 124 through the bottom plate 122a of the backlight chassis 122.

As illustrated in FIG. 17, the light guide plate 120 is provided between the pair of LED units 132. The frame set (the first holding member) 114a to 114c and the backlight chassis (the second holding member) 122 sandwich the LED units 132, the light guide plate 120 and the optical members 118. Furthermore, the frame set 114a to 114c and the backlight chassis 122 fix the light guide plate 120 and the optical members 118. The configurations of the LED unit 132, the light guide plate 120 and the optical members 118 that are same as those in the first embodiment will not be explained.

As illustrated in FIG. 17, the driving circuit board 115 is provided on the front-surface side of the bottom frame 114b. The driving circuit board 115 is electrically connected to the display panel 116 to supply image data and various control signals that are necessary to display images with the display panel 116. First reflection sheets 134b are provided on surfaces of the top frame 114a that are exposed to the LED units 132 and are provided on surfaces of the bottom frame 114b that face the LED units 132. The first reflection sheets 134b are provided along the long side of the light guide plate 120.

Fourth Embodiment

A fourth embodiment of the present invention will be explained with reference to FIGS. 18 to 24. In the fourth embodiment, a direct-type backlight unit 212 is used. The construction, operations and effects as same as the first embodiment will not be explained.

As illustrated in FIG. 18, a liquid crystal display device 210 of the present embodiment includes a liquid crystal panel 211 and a direct-type backlight unit 212 that are integrally provided by a bezel 213. The configuration of the liquid crystal panel 211 that is same as that in the first embodiment will not be explained. The configuration of the direct-type backlight unit 212 will be explained.

As illustrated in FIG. 18, the backlight unit 212 includes a substantially box-shaped chassis 222 with an opening at the light exit side (liquid crystal panel 11 side), a set of optical members 223 that are provided to cover the opening of the chassis 222, and a frame 227 that is arranged along the outer edge of the chassis 222 and holds the edge of the set of optical members 223 with the chassis 222. Further, the chassis 222 houses LEDs 224, LED boards 225 on which the LEDs 224 are mounted and diffuser lenses 31. The LEDs 224 are arranged below the optical member 222 (the liquid crystal panel 211) so as to face the optical member 222. Each of the diffuser lenses 31 is arranged on the LED board 225 so as to correspond to each of the LEDs 224. The chassis 222 further houses holding members 32 and a reflection sheet 33. The holding members 32 hold the LED boards 225 with the chassis 222 therebetween. The reflection sheet 33 reflects light within the chassis 222 toward the optical member 223 side. The direct-type backlight unit 212 of the present embodiment does not include the light guide member 26 that is included in the edge light-type backlight unit 12 of the first embodiment. The configuration of the optical members 223 that is same as that in the first embodiment will not be explained. The frame 227 does not include the first reflection sheet 28 of the first embodiment and except or this point, the configuration of the frame 227 is same as that in the first embodiment. Each component of the backlight unit 212 will be described in detail.

Figure 19:
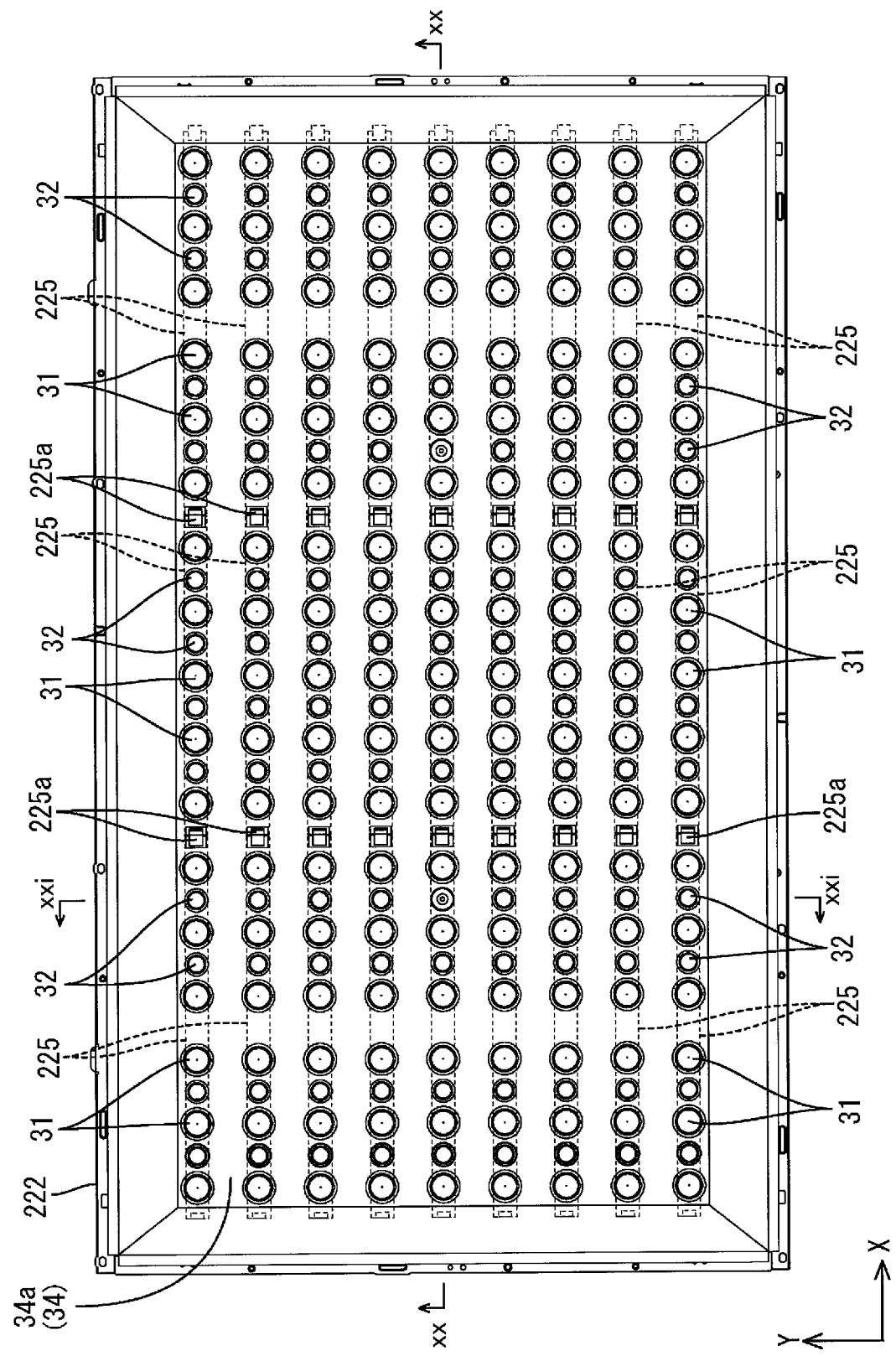
FIG. 19 is a plan view of the liquid crystal display device illustrating arrangements of a chassis, diffuser lenses, LED boards, a first reflection sheet, and holding members included in the liquid crystal display device.
Figure 20:
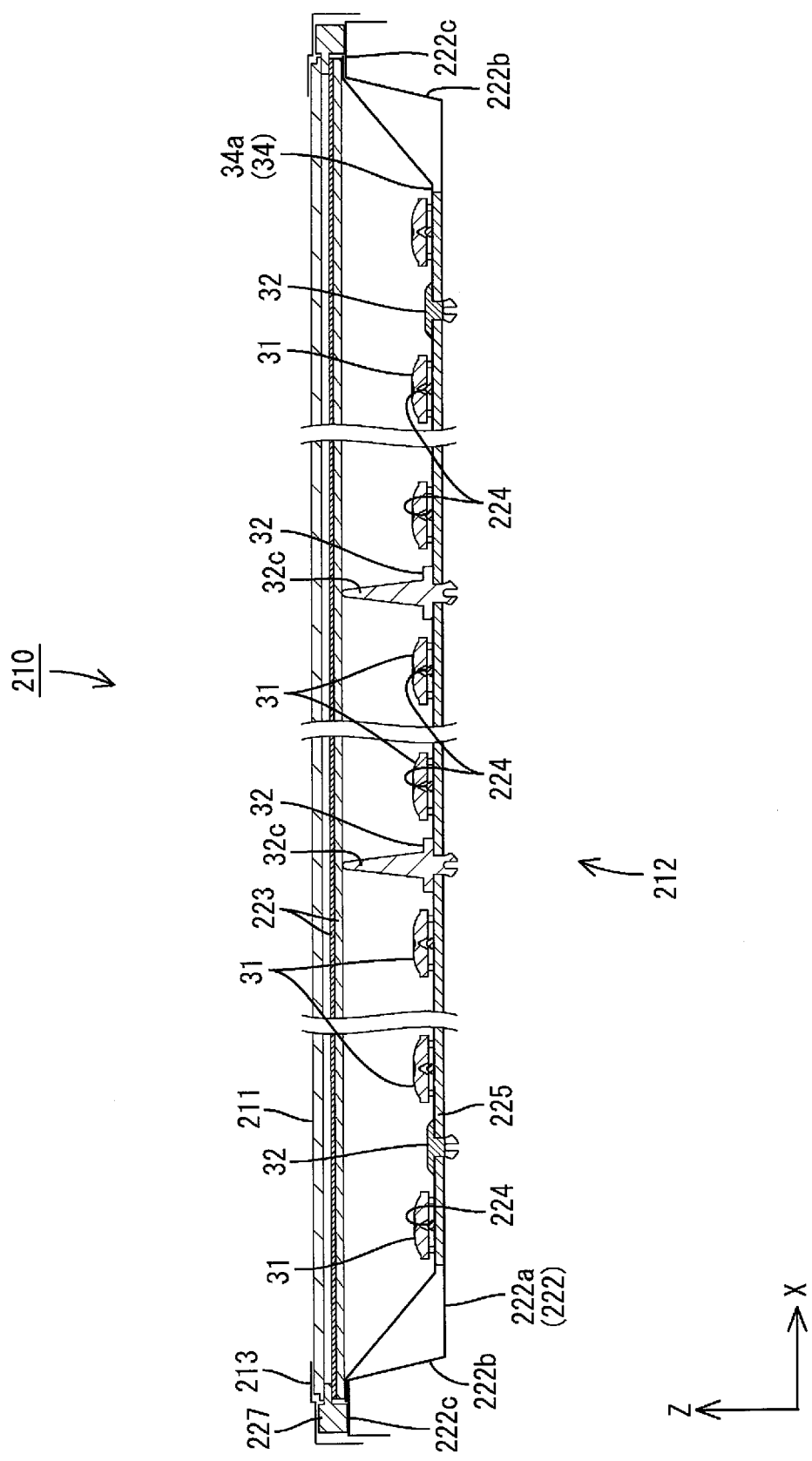
FIG. 20 is a cross-sectional view of the liquid crystal display device along line xx-xx in FIG. 19.
Figure 21:
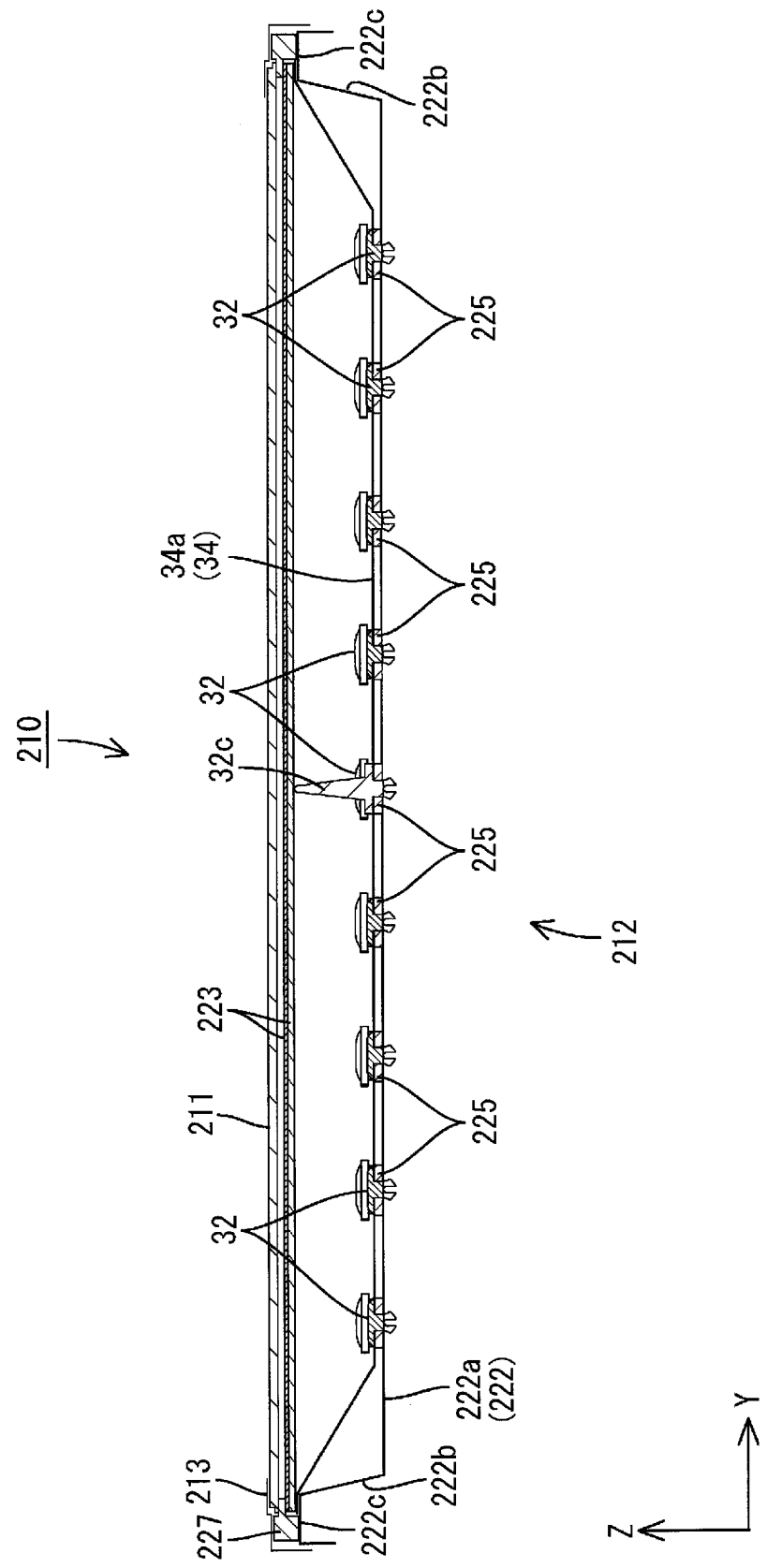
FIG. 21 is a cross-sectional view of the liquid crystal display device along line xxi-xxi in FIG. 19.

The chassis 222 is made of metal. As illustrated in FIGS. 19 to 21, the chassis 222 includes a base plate 222a having a rectangular shape like the liquid crystal panel 211, side plates 222b each rising from the outer edge of each side (long side and short side) of the base plate 222a toward the front side (light exit side), and receiving plates 222c each outwardly protruding from the edge of each side plate 222b. The chassis 222 is formed in substantially a shallow box-shape (substantially shallow plate shape) as a whole and is open toward the front side. The long side of the chassis 222 matches the X-axis (a horizontal direction) and the short side thereof matches the Y-axis (a vertical direction). The frame 227 and the optical members 223 are placed on each of the receiving plates 222c of the chassis 222 from the front-surface side. The frame 227 is fixed to the receiving plate 222c with a screw. The bottom plate 222a of the chassis 222 has mounting holes 222d with which the holding members 32 are mounted. The mounting holes 222d are arranged in the bottom plate 222a in a dispersed manner so as to correspond to the mounting positions of the holding members 32.

Next, the LED boards 225 on which the LEDs 24 are mounted will be explained. The configuration of the LED 24 that is same as that in the first embodiment will not be explained. As illustrated in FIGS. 19 and 20, each of the LED boards 225 includes a base member that has a plan view rectangular shape. The LED boards 25 are housed in the chassis 222 along the bottom plate 222a such that a long side of the LED board 225 is aligned with the X-axis direction and a short side of the LED board 225 is aligned with the Y-axis direction. On a plate surface of the base member of the LED board 25, the LEDs 224 are mounted on a surface facing the front-surface side (facing the optical members 223). The light emitting surface of each LED 224 faces the optical members 223 (the liquid crystal panel 211) and a light axis LA of light from the LED 224 matches the Z-axis direction or a direction perpendicular to a display surface of the liquid crystal panel 211. A plurality of LEDs 224 is arranged linearly along the long side direction of the LED board 225 (X-axis direction), and the LEDs 224 are connected in series by a wiring pattern formed on the LED board 225. The LEDs 224 are arranged at substantially equal intervals and the LEDs 224 are arranged equally spaced from each other. Connector portions 225a are provided at two ends of the LED board 225 in the long-side direction.

As illustrated in FIG. 19, a plurality of LED boards 225 of the above configuration is arranged such that the plurality of LED boards 18 is arranged parallel to each other in both the X-axis direction and the Y-axis direction with their long side direction and the short side direction aligned. That is, the LED boards 225 and the LEDs 224 mounted thereon are arranged in rows and columns (in a matrix, on a plane arrangement) in the chassis 222 such that the X-axis direction (the long side direction of chassis 222 and LED board 225) corresponds to a row direction and the Y-axis direction (the short side direction of the chassis 222 and the LED board 225) corresponds to a column direction. Specifically, three LED boards 225 are arranged in the X-axis direction and nine LED boards 225 are arranged in the Y-axis direction and twenty seven LED boards 225 in total are arranged parallel to each other within the chassis 222. The LED boards 225 are arranged in the X-axis direction and the adjacent connector portions 225a of the LED boards 225 included in one column are connected to each other and the LED boards 225 in one column are electrically connected to each other. The connector portions 225a close to the two ends of the chassis 222 in the X-axis direction are electrically connected to an external control circuit (not illustrated). Accordingly, the LEDs 224 mounted on the LED boards 225 included in one column are connected in series and turning on and off of the LEDs 224 included in one column is controlled collectively by one control circuit. This reduces a cost. The LED boards 225 are arranged in the Y-axis direction at substantially equal intervals. Therefore, the LEDs 224 are arranged on a plane along the bottom plate 222a in the chassis 222 at substantially equal intervals in the X-axis direction and the Y-axis direction.

Figure 22:
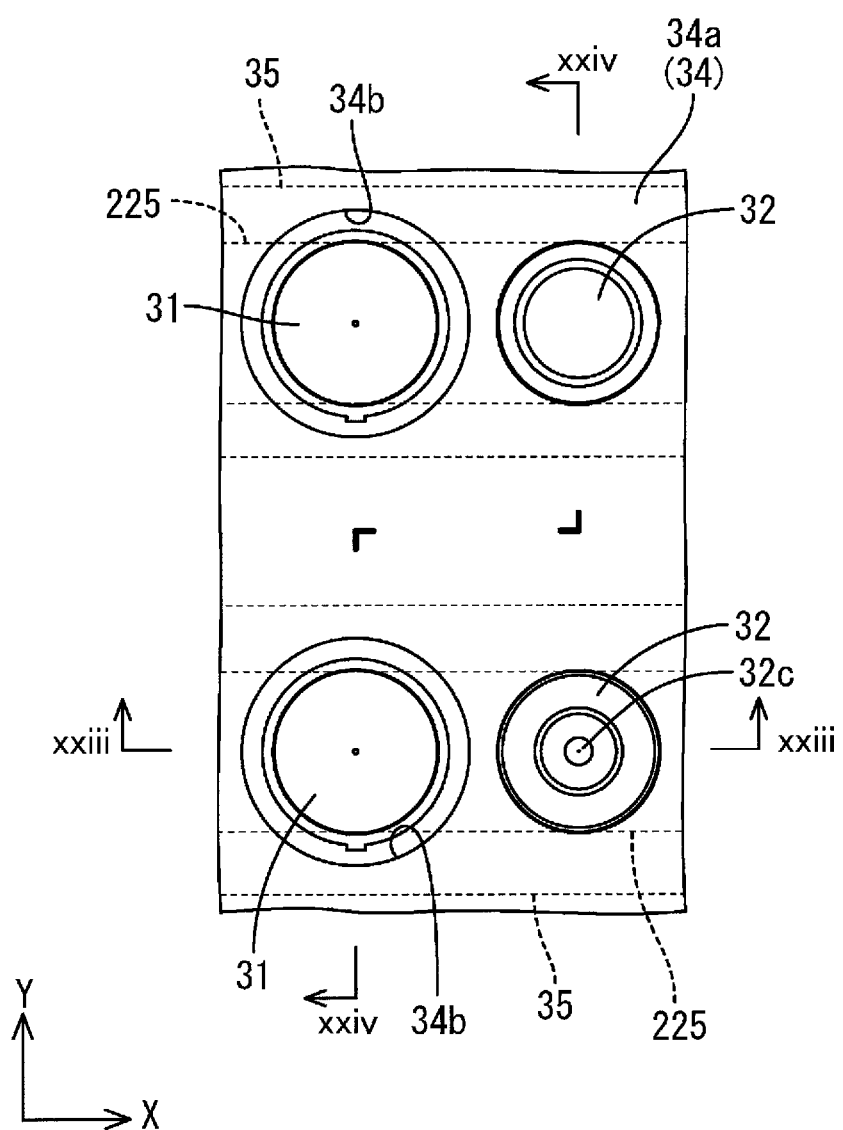
FIG. 22 is a plan view illustrating detailed arrangements of the diffuser lenses, the LED boards and the holding members.
Figure 23:
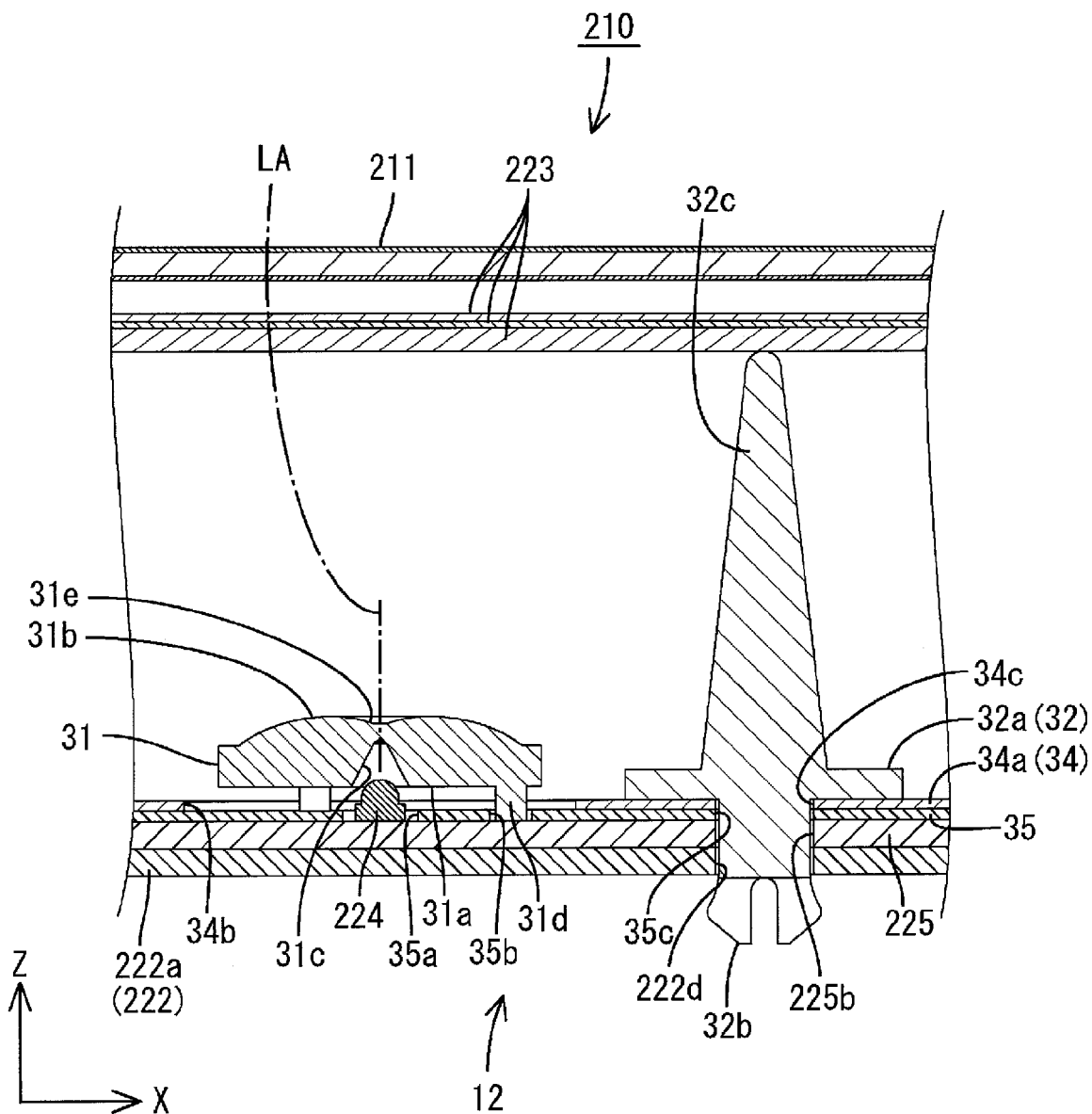
FIG. 23 is a cross-sectional view of the liquid crystal display device along line xxiii-xxiii in FIG. 22.
Figure 24:
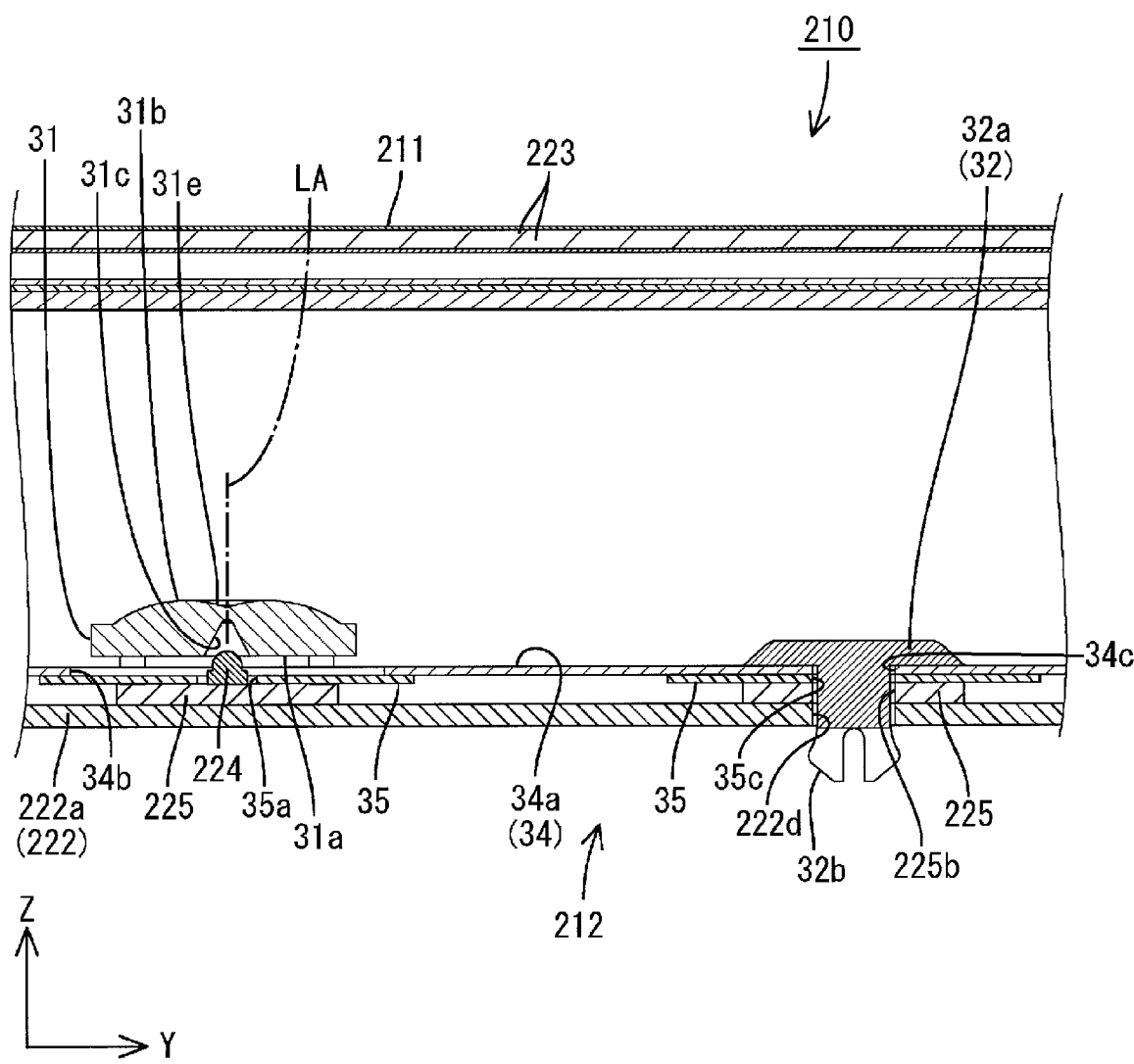
FIG. 24 is a cross-sectional view of the liquid crystal display device along line xxiv-xxiv in FIG. 22.

The diffuser lens 31 is made of synthetic resin that is substantially transparent (is capable of highly transmissive) and has a refractive index higher than air (for example, polycarbonate and acrylic). As illustrated in FIGS. 22 to 24, the diffuser lens 31 has a predetermined thickness and is formed in substantially a circular plan view shape. The diffuser lens 31 is provided on the LED board 226 so as to cover each LED 224 from the front side and to overlap each LED 224 in a plan view. Light emitted from the LED 224 and having high directivity is exited from the diffuser lens 31 with being diffused. Namely, the directivity of light emitted from the LED 224 is reduced through the diffuser lens 31. Therefore, even if a distance between the adjacent LEDs 224 is increased, the portion therebetween is less likely to be recognized as a dark region. This reduces the number of the LEDs 224 to be mounted. Each diffuser lens 31 is placed in a concentric position with the corresponding LED 224 in a plan view.

A surface of the diffuser lens 31 that faces the rear-surface side and faces the LED board 225 (the LED 224) is a light entrance surface 31a that light from the LED 224 enters. A surface of the diffuser lens 31 that faces the front-surface side and faces the optical members 223 is a light exit surface 31b. As illustrated in FIGS. 23 and 24, the light entrance surface 31a is parallel to a plate surface (a X-Y plane) of the LED board 225 as a whole. A light entrance recess 31c is formed on a portion of the light entrance surface 31a that overlaps the LED 224 in a plan view. Accordingly, the light entrance surface 31a has a sloped surface that is slanted with respect to the light axis LA of light from the LED 224. The light entrance recess 31c has a cross section of a reversed-V shape and is formed in substantially a circular cone and is formed to be substantially concentric with the diffuser lens 31. Light emitted from the LED 224 and entering a space within the light entrance recess 31c enters the diffuser lens 31 with being refracted in a wide range by the sloped surface. Legs 31d are protruded from the light entrance surface 31a. The legs 31d are a mounting mechanism for mounting the diffuser lens 31 to the LED board 225. The light exit surface 31b is formed in substantially a flat spherical shape. With this configuration, light exits from the diffuser lens 31 with being refracted in a wide range. A light exit recess 31e is formed in a portion of the light exit surface 31b that overlaps the LED 224 in a plan view. The light exit recess 31e is formed in substantially a shallow bowl shape. Most of light emitted from the LED 224 is exited from the light exit surface with being refracted in a wide range by the light exit recess 31e. Also, apart of light emitted from the LED 224 is reflected to the LED board 225 by the light exit recess 31e.

The holding member 32 will be explained. The holding member 32 is made of synthetic resin such as polycarbonate, and has a white surface with excellent light reflectivity. As illustrated in FIGS. 22 to 24, the holding member 32 includes a body 32a provided along the plate surface of the LED board 225, and a fixing portion 32b protruding from the body 32a toward a rear-surface side or toward the chassis 222 and fixed to the chassis 222. The body 32a has a plate shape having a substantially circular shape in a plan view, and is configured to hold the LED board 225 and the reflection sheet 33 (further explained below) with the bottom plate 222a of the chassis 222. The fixing portion 32b is fitted through the insertion hole 225b and the mounting hole 222d and stopped by the bottom plate 222a. The insertion hole 225b is formed in the LED board 225 and the mounting hole 222d is formed in the bottom plate 222a of the chassis 222 so as to correspond to the mounting position of the holding member 32. As illustrated in FIG. 3, the holding members 32 are arranged in rows and columns in a surface plane of the LED boards 225. Specifically, the holding members 32 are arranged between the diffuser lenses 31 (the LEDs 224) that are adjacent to each other in the X-axis direction.

A pair of holding members 32 arranged in a middle portion of the display includes a support portion 32c protruding from the body 32a toward the front-surface side, as illustrated in FIGS. 18 to 20. The optical members 223 are supported by the support portions 32c from the back-surface side. This maintains constant positional relationship between the LED2 224 and the optical members 223 in the Z-axis direction and also the inadvertent deformation of the optical members 223 is less likely to occur.

Next, a reflection sheet 33 will be explained. The reflection sheet 22 includes a first reflection sheet 23 and a second reflection sheet 35. The first reflection sheet 34 has a size that covers substantially an entire area of an inner surface of the chassis 222. The second reflection sheet 35 has a size that individually covers each LED board 225. The reflection sheets 34, 35 are made of synthetic resin and have a white surface with excellent light reflectivity. Each of the reflection sheets 34, 35 extends along the bottom plate 222a (the LED board 225) in the chassis 222.

The first reflection sheet 34 will be explained. As illustrated in FIG. 19, most middle part of the first reflection sheet 34 that extends along the bottom plate 222a of the chassis 222 is a bottom portion 34a. Lens insertion holes 34b are formed through the bottom portion 34a. Each LED 224 arranged in the chassis 222 and the diffuser lens 31 that covers each LED 224 are fitted through the lens insertion hole 23b. The lens insertion holes 34b are arranged to overlap each LED 224 and each diffuser lens 31 in a plan view and arranged in a matrix. As illustrated in FIG. 22, the lens insertion hole 34b is formed in a circular shape in a plan view and a diameter thereof is greater than that of the diffuser lens 31. Insertion holes 23c are formed through the bottom portion 34a corresponding to the fixing portions 32b of the holding members 32 and in adjacent to the lens insertion hole 34b. The fixing portion 32b of each holding member 32 is fitted through the insertion hole 23c. As illustrated in FIG. 19, the first reflection sheet 34 covers portions between adjacent diffuser lenses 31 and an outer peripheral side portions in the chassis 222. The light directing to each of the portions in the chassis is reflected by the first reflection 23 toward the optical members 223. As illustrated in FIGS. 20 and 21, the outer peripheral side portions of the first reflection sheet 34 is lifted up to cover the side surfaces 222b and the receiving plates 222c of the chassis 222. The portions of the first reflection sheet 34 placed on the receiving plates 222c are sandwiched between the chassis 222 and the optical members 223. The portion of the first reflection sheet 34 connecting the bottom portion 34a and the portion placed on the receiving plate 222c is sloped.

As illustrated in FIG. 22, the second reflection sheet 35 has an outer shape substantially same as the LED board 225, that is, is formed in a rectangular plan view shape. As illustrated in FIGS. 23 and 24, the second reflection sheet 35 is arranged to overlap a front surface of the LED board 225 and face the diffuser lenses 31. Namely, the second reflection sheet 35 is provided between the diffuser lens 31 and the LED board 225. Light may be returned from the diffuser lens 31 side toward the LED board 225 or light may enter a space between the diffuser lens 31 and the LEd board 225 from a space outside of the diffuser lens 31 in a plan view. Such light is reflected by the second reflection sheet 35 to the diffuser lens 31 side. This increases light use efficiency and improves brightness. Namely, sufficient brightness is obtained with reducing the number of the LEDs 224 and a cost.

The second reflection sheet 35 is formed in a rectangular shape similar to the corresponding LED board 225 and covers an entire area of the LED board 225 from the front-surface side. As illustrated in FIGS. 22 and 24, the second reflection sheet 35 has a short side that is longer than the LED board 225 and greater than a diameter of the diffuser lens 31 and the lens insertion hole 23b of the first reflection sheet 34. Therefore, a edge of the lens insertion hole 34b of the first reflection sheet 34 is placed on the second reflection sheet 35. With this configuration, the first reflection sheet 34 and the second reflection sheet 35 are continuously arranged in the chassis 222 with a plan view and a portion of the chassis 222 or the LED board 225 is not exposed to the front side from the lens insertion hole 34b. Accordingly, light in the chassis 222 is effectively reflected toward the optical members 223 and this effectively improves brightness. The LED insertion holes 35a, the leg insertion holes 35b and insertion holes 35c are formed through the second reflection sheet 35 so as to correspond to each LED 224, each leg 31d of the diffuser lens 31 and each fixing portion 32 of the holding member 32, respectively. Each LED 224 is fitted in the LED insertion hole 35a, each leg 31d is fitted in the leg insertion hole 35b, and each fixing portion 32 is fitted tin the insertion hole 35c.

As explained above, according to the present embodiment, the backlight device 212 includes the chassis 222 and the optical members 223. The chassis 222 houses the LEDs 224 therein and includes the bottom plate 222a that is provided on a side opposite from the light exit side with respect to the LEDs 224. The optical members 223 are provided on the light exit side to face the bottom plate 222a and the LEDs 224. With this configuration, light emitted from the LEDs 224 reaches the optical members 223 that are arranged on the light exit side to face the bottom plate 222a and the LEDs 224 and transmits through the optical members 223 and is exited to the liquid crystal panel 11.

The diffuser lens 31 is provided on the light exit side of each LED 224 to diffuser light from the LED 224. With this configuration, light emitted from the LED 224 is exited with being diffused by the diffuser lens 31. Accordingly, unevenness is less likely to be caused in exited light and the number of the LEDs 224 is reduced and this reduces a cost.

Other Embodiments

The embodiments according to the present invention have been described. The present invention is not limited to the embodiments explained in the above description with reference to the drawings. The following embodiments may be included in the technical scope of the present invention, for example.

Figure 25:
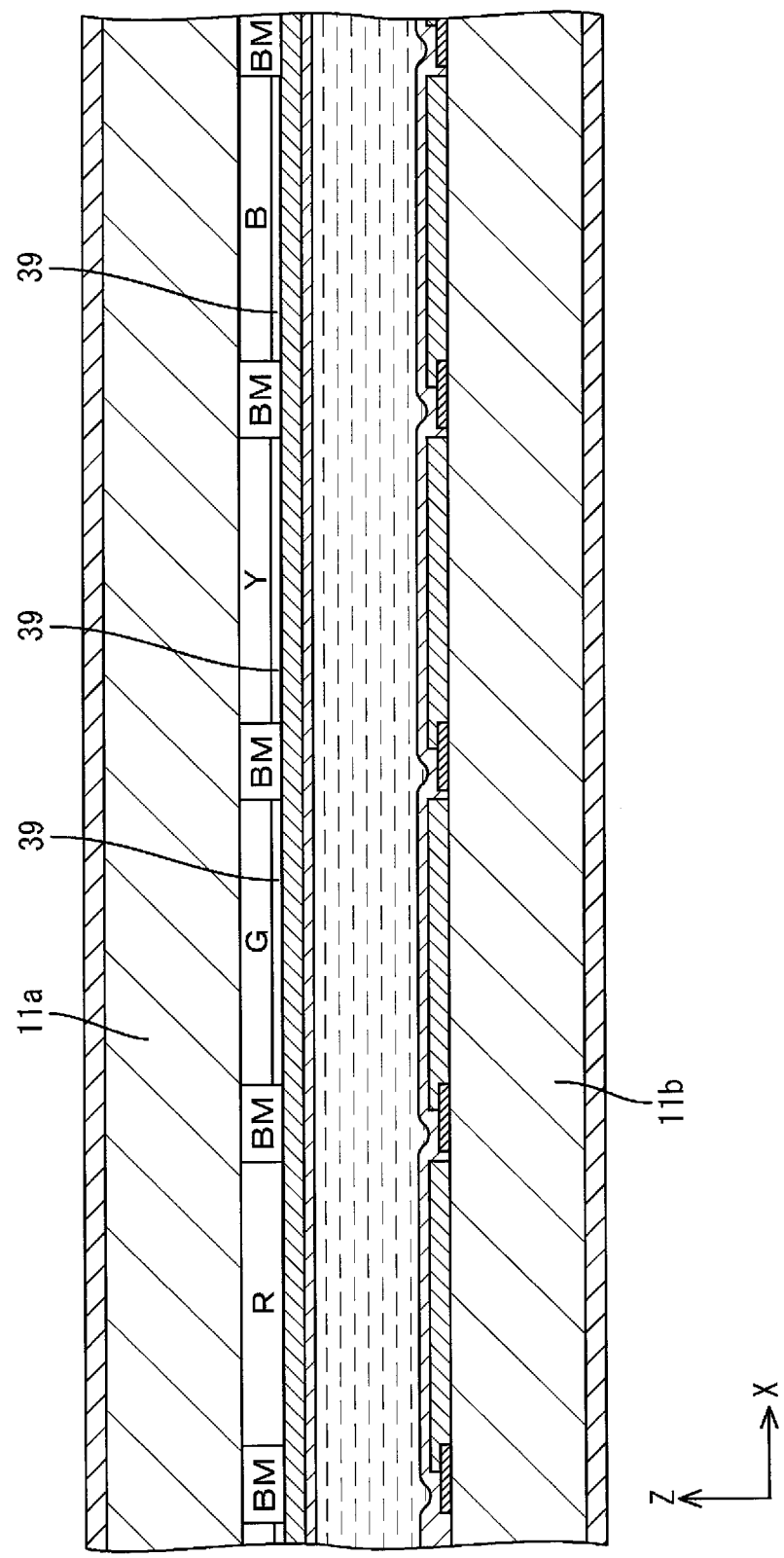
FIG. 25 is a cross-sectional view illustrating a cross-sectional configuration of color portions according to other embodiment (1).

(1) In the first embodiment, the red color portion has a film thickness that is greater than other color portions (FIG. 14). However, the following configuration may be used in a modification. As illustrated in FIG. 25, a transparent spacer 39 is provided on each of the green color portion G, the yellow color portion Y and the blue color portion B (the color portions G, B, Y other than the red color portion R). Accordingly, a total of the thickness of each color portion R, G, B, Y and a thickness of the spacer 39 is equal to the thickness of the red color portion R. With this configuration, capacitance generated between the boards 11a, 11b is equal in each of the color portions R, G, B, Y. This is effective for designing a circuit of the liquid crystal panel 11.

Figure 26:
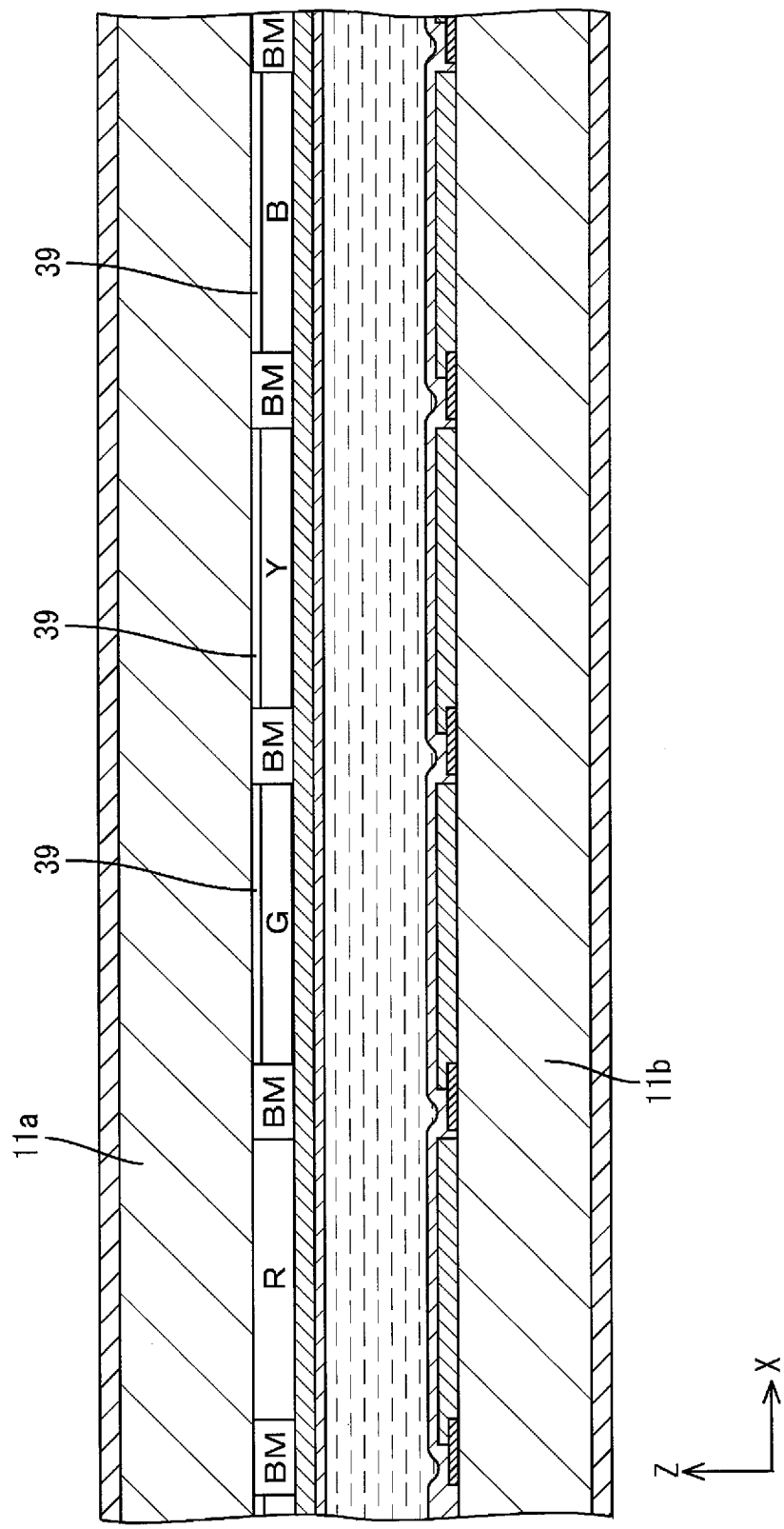
FIG. 26 is a cross-sectional view illustrating a cross-sectional configuration of color portions according to other embodiment (2).

(2) As another modification of the embodiment (1), as illustrated in FIG. 26, each color portion G, B, Y and the spacer 39 may be laminated in a reversed order from the configuration of (1).

Figure 27:
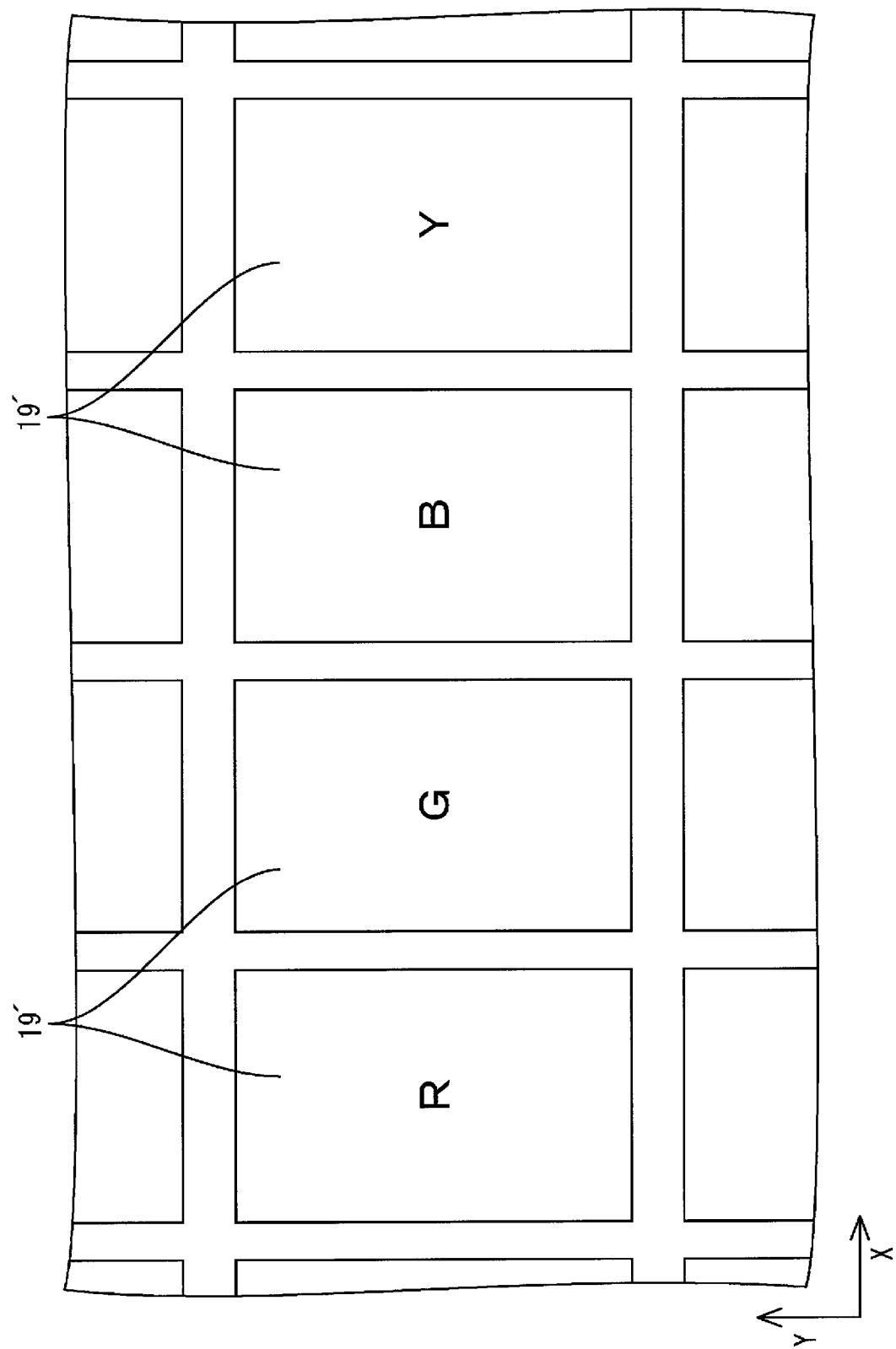
FIG. 27 is a cross-sectional view illustrating a cross-sectional configuration of color portions according to other embodiment (3).

(3) The arrangement of the color portions of the color filters of the liquid crystal panel can be altered from that in the above embodiments as appropriate. Color filters 19' illustrated in FIG. 27 may be included in the scope of the present invention. R, G, B, Y color portions of the color filters are arranged such that the R color portion in red, the green color portion in green, the blue color portion in blue, and the yellow color portion in yellow are arranged in this sequence from the left side in FIG. 27 along the X-axis direction.

Figure 28:
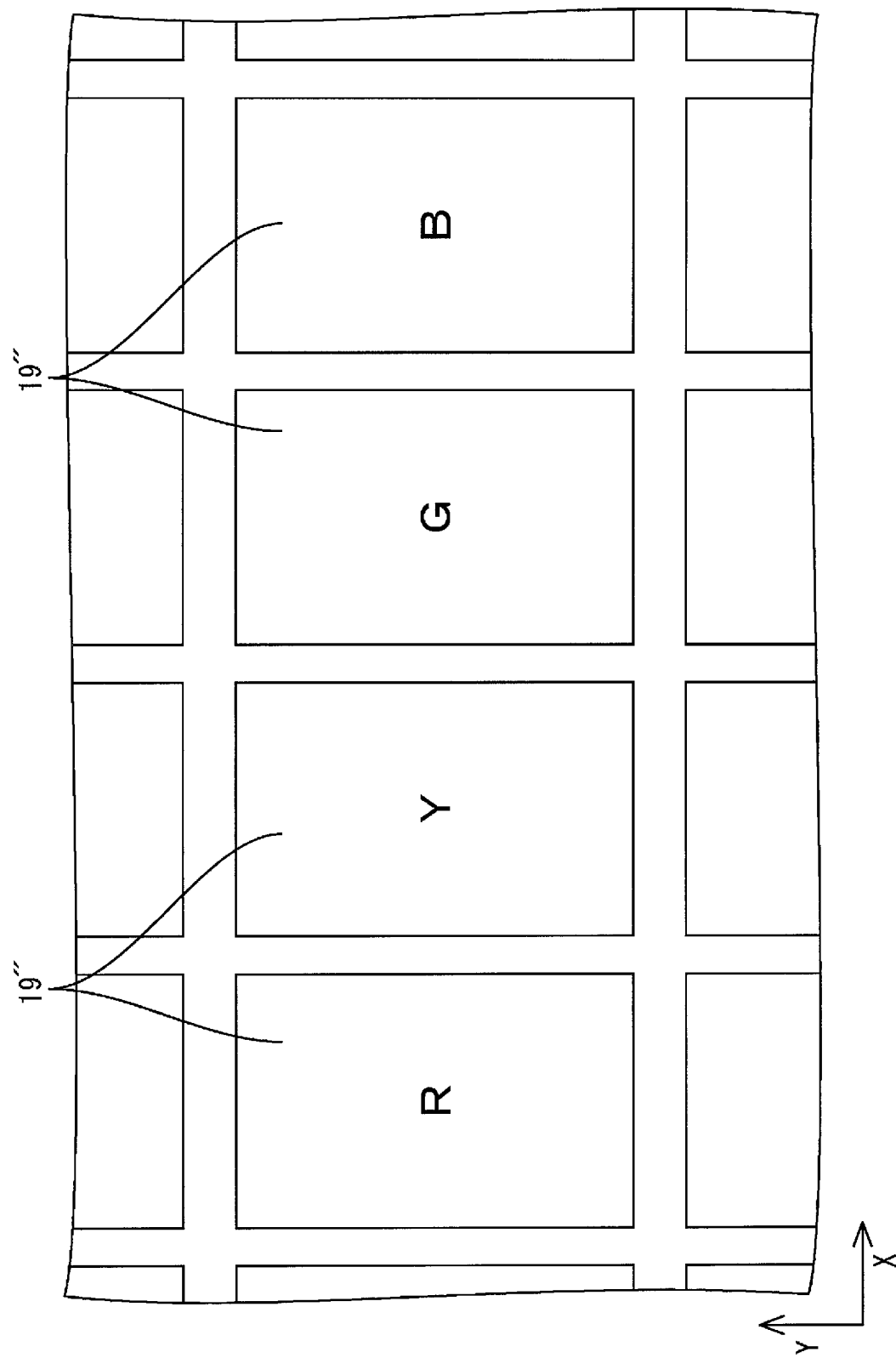
FIG. 28 is a cross-sectional view illustrating a cross-sectional configuration of color portions according to other embodiment (4).

(4) Color filters 19" in FIG. 28 may be included in the scope of the present invention other than the above embodiment (1). R, G, B, Y color portions of the color filters are arranged such that the R color portion in red, the yellow color portion in yellow, the green color portion in green, and the blue color portion in blue are arranged in this sequence from the left side in FIG. 28 along the X-axis direction.

(5) In the first embodiment, the YAG-based phosphors each having the main emission wavelength of 519 nm, 539 nm, 554 nm are used. A YAG-based phosphor having main emission wavelength of any value ranging from 519 nm to 554 nm other than 519 nm, 539 nm, 554 nm can be used.

(6) In the first embodiment, the YAG-based phosphors having the main emission wavelength ranging from 519 nm to 554 nm are used. However, a YAG-based phosphor having the main emission wavelength less than 519 nm or a YAG-based phosphor having the main emission wavelength greater than 554 nm may be used. In such a case, it is preferable to set the main emission wavelength of the YAG-based phosphor in a range from 500 nm to 570 nm that is a green wavelength region. If the main emission wavelength of the YAG-based phosphor is less than 500 nm, that is, if the main emission wavelength is in the cyan wavelength region or in the blue wavelength region, sufficient brightness may not be obtained. Also in such a case, if the LED chip emitting blue light is used, it may be quite difficult to adjust chromaticity. If the main emission wavelength of the YAG-based phosphor is greater than 570 nm, that is, if the main emission wavelength is in the yellow wavelength region or in the red wavelength region, sufficient brightness may not be obtained. Also in such a case, it may be quite difficult to adjust chromaticity of light from the LED corresponding to the liquid crystal panel including the color filter having a yellow color portion. As described above, the YAG-based phosphor having the main emission wavelength that is in the green wavelength region is used, and this makes easy to adjust chromaticity with achieving high brightness and color reproducibility.

(7) In the embodiment (6), the YAG-based phosphor has the main emission wavelength ranging from 500 nm to 570 nm. However, a YAG-based phosphor having the main emission wavelength ranging from 570 nm to 600 nm that is in the yellow wavelength region may be used.

(8) In the first embodiment, CaAlSiN (CaAlSiN3:Eu) is used as the red phosphor. Other CaAlSiN-based phosphors may be used. Other phosphors other than the CaAlSiN-based phosphors may be used as the red phosphor.

(9) In Examples 3 to 5 and 7 to 9 of Comparative Example 2 according to the first embodiment, a ratio of a film thickness of the red color portion in red to a film thickness of each of the blue color portion in blue and the green color portion in green (a film thickness ratio) is from 142.8% to 214.3%. The film thickness ratio may be smaller than 142.8% or greater than 214.3%. Especially, the film thickness ratio is preferably less than 250%. If the film thickness ratio is greater than 250%, the capacitance generated between the boards in each of the blue color portion in blue and the green color portion in green is extremely different from the capacitance in the red color portion in red. Therefore, optical characteristics of the liquid crystal layer provided between the boards are not properly controlled by implication of an electric field. The film thicknesses are adjusted such that the film thickness ratio is 250% or less. Accordingly, the optical characteristics of the liquid crystal layer provided between the boards are properly controlled by implication of an electric field and high color reproducibility is obtained.

(10) In the first embodiment, the LED chip has the main emission wavelength of 451 nm. However, the LED chip may have the main emission wavelength shifted to a longer wavelength side from 451 nm or the main emission wavelength shifted to a shorter wavelength side from 451 nm. In such cases, the main emission wavelength of the LED chip may be preferably within a range from 420 nm to 500 nm. An LED including such an LED chip emits blue light with quite high efficiency. Therefore, in correcting chromaticity of display images on the liquid crystal panel including color portions of three primary colors and a yellow color portion and adjusting chromaticity of an LED to bluish light that is a complementary color for yellow, brightness is less likely to be deteriorated and high brightness is maintained.

(11) With combination of the configurations of the first embodiment and the second embodiment, the film thickness and the pigment density of the red color portion may be set different from those of other coloring portions.

(12) In the first embodiment, the coloring portion of the color filter contains pigments. However, the coloring portion of the color filter may contain dye. In such a case, similar to the second embodiment, a density of dye contained in the red color portion (a dye density) may be set different from that in other color portions and a film thickness of each of all the color portions may be set to be equal.

(13) In the first embodiment, chromaticity of transmitted light in each of the color portions in blue, red, green, yellow is outside of the common gamut of the NTSC gamut in the NTSC standard and the EBU gamut in the EBU standard in both of the CIE1931 chromaticity diagram and the CIE1976 chromaticity diagram. However, the chromaticity in each of the color portions may be outside of the common gamut in one of the CIE1931 chromaticity diagram and the CIE1976 chromaticity diagram.

(14) In the first embodiment, the LED boards (or the LEDs) are arranged at the long edges of the chassis (or the light guide member), respectively. However, the LED boards (or the LEDs) may be arranged at the short edges of the chassis (or the light guide member), respectively.

(15) Other than the above embodiment (14), the LED boards (or the LEDs) may be arranged at the long edges and the short edges of the chassis (or the light guide member), respectively. Furthermore, the LED boards (or the LEDs) may be arranged at one of the long edges and at one of the short edges, respectively.

(16) The liquid crystal panel and the chassis are set in the vertical position with the short-side directions thereof aligned with the vertical direction. However, the liquid crystal panel and the chassis may be set in the vertical position with a long-side direction thereof aligned with the vertical direction.

(11) In the above embodiments, the TFTs are used as switching components of the liquid crystal display device. However, the technology described herein can be applied to liquid crystal display devices using switching components other than TFTs (e.g., thin film diodes (TFDs)). Furthermore, it can be applied to black-and-white liquid crystal display devices other than the color liquid crystal display device.

(18) In the above embodiments, the liquid crystal display device including the liquid crystal panel as a display panel is used. However, the present invention can be applied to display devices including other types of display panels.

(19) In the above embodiments, the television receiver including the tuner is used. However, the technology can be applied to a display device without the tuner.

EXPLANATION OF SYMBOLS

10, 110, 210: Liquid crystal display device (Display device), 11, 116, 211: Liquid crystal panel (Display panel), 11a: CF substrate, 11b: Array substrate, 11c: Liquid crystal layer (Substances, liquid crystals), 12, 124, 212: Backlight unit (Lighting unit), 19: Color filter, 24, 224: LED (Light source), 24a: LED chip (LED element), 26, 120: Light guide member, 26b: Light entrance surface, 28: First reflection sheet (Reflection member), 29: Second reflection sheet (Reflection member), 30: Lens, 31: Diffuser lens, 36: NTSC gamut, 37: EBU gamut, 38: Common gamut, 222: Chassis, 222a: Bottom plate (Bottom portion), 223: Optical member, R: Red color portion, G: Green color portion, B: Blue color portion, Y: Yellow color portion, T: tuner, TV: Television receiver, VC: Image converter circuit.

The invention claimed is:
1. A display device comprising:
 a display panel, the display panel including:
 a pair of boards;
 a material provided between the boards, the material changing its optical characteristics by implication of an electric field; and
 a color filter provided in one of the boards and including color portions each in blue, green, red, yellow; and
 a lighting device, the lighting device including LEDs as a light source, the LEDs exiting light toward the display panel, each LED including:
 an LED element as a light emission source; and
 a phosphor that is excited by light from the LED element and emits light, the phosphor including at least a YAG-based phosphor, wherein
 the YAG-based phosphor has a main emission wavelength from 519 nm to 539 nm.

2. The display device according to claim 1, wherein the YAG-based phosphor has a main emission wavelength of 539 nm.

3. The display device according to claim 1, wherein the YAG-based phosphor has a main emission wavelength of 519 nm.

4. A display device comprising:
a display panel, the display panel including:
a pair of boards;
a material provided between the boards, the material changing its optical characteristics by implication of an electric field; and
a color filter provided in one of the boards and including color portions each in blue, green, red, yellow; and
a lighting device, the lighting device including LEDs as a light source, the LEDs exiting light toward the display panel, each LED including:
an LED element as a light emission source; and
a phosphor that is excited by light from the LED element and emits light, the phosphor including at least a YAG-based phosphor, wherein
the phosphor includes a red phosphor that is excited by light emitted from the LED element and emits red light.

5. The display device according to claim 4, wherein the red phosphor is a CaAlSiN-based phosphor.

6. The display device according to claim 5, wherein the CaAlSiN-based phosphor of the red phosphor is expressed by CaAlSiN3:Eu.

7. The display device according to claim 1, wherein the red color portion in red has a film thickness that is relatively greater than a film thickness of each of the blue color portion in blue and the green color portion in green.

8. The display device according to claim 7, wherein the blue color portion in blue and the green color portion in green have substantially an equal film thickness.

9. The display device according to claim 8, wherein the yellow color portion in yellow has a film thickness that is substantially equal to the film thickness of each of the blue color portion in blue and the green color portion in green.

10. The display device according to claim 7, wherein the red color portion in red has a film thickness of 250% or less of a film thickness of each of the blue color portion in blue and the green color portion in green.

11. The display device according to claim 10, wherein the red color portion in red has a film thickness of 142.8% to 214.3% of the film thickness of each of the blue color portion in blue and the green color portion in green.

12. The display device according to claim 11, wherein each of the blue color portion in blue and the green color portion in green has a film thickness of 2.1 μm and the red color portion in red has a film thickness of 3.0 μm to 4.5 μm.

13. The display device according to claim 1, wherein each of the color portions is substantially equal to each other.

14. The display device according to claim 1, wherein each of the color portions contains pigments in a dispersed manner and a density of pigments in the red color portion in red is higher than that in each of the blue color portion in blue and the green color portion in green.

15. The display device according to claim 14, wherein each of the color portions has substantially an equal film thickness.

16. The display device according to claim 1, wherein the LED element has a main emission wavelength from 420 nm to 500 nm.

17. The display device according to claim 16, wherein the LED element has a main emission wavelength of 451 nm.

18. The display device according to claim 1, wherein an area ratio of each of the color portions is equal to each other.

19. The display device according to claim 1, wherein the color filter is configured such that chromaticity of blue in light that is emitted from the LED and transmitted through each of the color portions is outside of a common gamut of an NTSC gamut in an NTSC standard and an EBU gamut in an EBU standard in at least one of a CIE1931 chromaticity diagram and a CIE1976 chromaticity diagram.

20. The display device according to claim 19, wherein the color filter is configured such that the chromaticity of blue in the transmitted light is outside of the EBU gamut in at least one of the CIE1931 chromaticity diagram and the CIE1976 chromaticity diagram.

21. The display device according to claim 1, wherein the color filter is configured such that chromaticity of red in light that is emitted from the LED and transmitted through each of the color portions is outside of a common gamut of an NTSC gamut in an NTSC standard and an EBU gamut in an EBU standard in at least one of a CIE1931 chromaticity diagram and a CIE1976 chromaticity diagram.

22. The display device according to claim 1, wherein the color filter is configured such that chromaticity of green in light that is emitted from the LED and transmitted through each of the color portions is outside of a common gamut of an NTSC gamut in an NTSC standard and an EBU gamut in an EBU standard in at least one of a CIE1931 chromaticity diagram and a CIE1976 chromaticity diagram.

23. The display device according to claim 1, wherein the color filter is configured such that chromaticity of yellow in light that is emitted from the LED and transmitted through each of the color portions is outside of a common gamut of an NTSC gamut in an NTSC standard and an EBU gamut in an EBU standard in at least one of a CIE1931 chromaticity diagram and a CIE1976 chromaticity diagram.

24. The display device according to claim 1, wherein the gamut of the exited light occupies 70% or more in the NTSC gamut in the NTSC standard.

25. A display device comprising:
a display panel, the display panel including:
a pair of boards;
a material provided between the boards, the material changing its optical characteristics by implication of an electric field; and
a color filter provided in one of the boards and including color portions each in blue, green, red, yellow; and
a lighting device, the lighting device including LEDs as a light source, the LEDs exiting light toward the display panel, each LED including:
an LED element as a light emission source; and
a phosphor that is excited by light from the LED element and emits light, the phosphor including at least a YAG-based phosphor, wherein
the lighting device further includes a light guide member made of synthetic resin and having an end portion, the light guide member being provided such that the end portion faces the LEDs;
light emitted from the LEDs transmits through the light guide member and is guided to the display panel;
the lighting device further includes a lens covering a light exit side of the LED and diffusing light;
the light guide member includes an elongated light entrance surface on a side close to the LEDs; and
the lens is provided to face the light entrance surface of the light guide member and the lens is curved along a longitudinal direction of the light entrance surface so as to be projected toward the light guide member.

26. The display device according to claim 25, wherein the lighting device further includes a reflection sheet provided between the LED and the light guide member and along the longitudinal direction of the light entrance surface.

27. The display device according to claim 1, wherein:
the lighting device further includes:
a chassis housing the LEDs and including a bottom portion provided on a side opposite to the light exit side with respect to the LEDs; and
an optical member provided on the light exit side from the bottom portion and the LEDs so as to face the bottom portion and the LEDs.

28. The display device according to claim 27, wherein the lighting device further includes a diffuser lens provided on the light exit side of the LED and diffusing light from the LED.

29. The display device according to claim 1, wherein the display panel is a liquid crystal panel including liquid crystals as substances that vary optical characteristics according to an application of electric field.

30. A television receiver comprising:
the display device according to claim 1; and
a receiver configured to receive a television signal.

31. The television receiver according to claim 30, further comprising an image converter circuit configured to convert a television signal output from the receiver into blue, green, red and yellow image signals.

* * * * *